United States Patent
Tsukagoshi

(10) Patent No.: US 10,812,838 B2
(45) Date of Patent: Oct. 20, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 16/077,572

(22) PCT Filed: Feb. 27, 2017

(86) PCT No.: PCT/JP2017/007572
§ 371 (c)(1),
(2) Date: Aug. 13, 2018

(87) PCT Pub. No.: WO2017/154646
PCT Pub. Date: Sep. 14, 2017

(65) Prior Publication Data
US 2019/0037255 A1 Jan. 31, 2019

(30) Foreign Application Priority Data
Mar. 9, 2016 (JP) ................................. 2016-046002

(51) Int. Cl.
*H04N 21/234* (2011.01)
*H04N 21/238* (2011.01)
(Continued)

(52) U.S. Cl.
CPC ..... *H04N 21/23424* (2013.01); *H04N 21/238* (2013.01); *H04N 21/2353* (2013.01);
(Continued)

(58) Field of Classification Search
CPC ......... H04N 21/23424; H04N 21/2353; H04N 21/23605; H04N 21/2362; H04N 21/2368;
(Continued)

(56) References Cited

U.S. PATENT DOCUMENTS 6,347,117 B1 * 2/2002 Kato ................ H04N 21/23406
375/240.05
7,020,824 B2 * 3/2006 Tanaka .................. H03M 13/00
714/755
(Continued)

FOREIGN PATENT DOCUMENTS

| JP | 2003-204275 A | 7/2003 |
| JP | 2010-118949 A | 5/2010 |

(Continued)

OTHER PUBLICATIONS

International Search Report dated Apr. 11, 2017, in PCT/JP2017/007572 filed Feb. 27, 2017.

*Primary Examiner* — Nasser M Goodarzi
*Assistant Examiner* — Adil Ocak
(74) *Attorney, Agent, or Firm* — Oblon, McClelland, Maier & Neustadt, L.L.P.

(57) ABSTRACT

It is possible to satisfactorily insert predetermined information into a media encoded stream and transmit the stream. Divided portions obtained by dividing the predetermined information are sequentially inserted into a predetermined number of unit portions of the media encoded stream as adding sequential information for reconstruction. In this case, the predetermined information is divided so that a bit rate of the predetermined information falls within a predetermined bit rate. A container with a predetermined format including the media encoded stream to which the predetermined information is inserted is transmitted.

13 Claims, 41 Drawing Sheets

(51) Int. Cl.
  *H04N 21/2362*   (2011.01)
  *H04N 21/235*    (2011.01)
  *H04N 21/236*    (2011.01)
  *H04N 21/2368*   (2011.01)
  *H04N 21/2662*   (2011.01)
  *H04N 21/434*    (2011.01)
  *H04N 21/435*    (2011.01)

(52) U.S. Cl.
  CPC ..... *H04N 21/2362* (2013.01); *H04N 21/2368* (2013.01); *H04N 21/23605* (2013.01); *H04N 21/2662* (2013.01); *H04N 21/435* (2013.01); *H04N 21/4341* (2013.01); *H04N 21/4343* (2013.01)

(58) Field of Classification Search
  CPC ............ H04N 21/238; H04N 21/2662; H04N 21/4341; H04N 21/4343; H04N 21/435
  See application file for complete search history.

(56) References Cited

U.S. PATENT DOCUMENTS

| | | |
|---|---|---|
| 2003/0084180 A1 | 5/2003 | Azami et al. |
| 2004/0088739 A1* | 5/2004 | Shimoji ............... H04N 5/4401 725/135 |
| 2008/0285579 A1* | 11/2008 | Vare ...................... H04H 20/16 370/412 |
| 2014/0211025 A1* | 7/2014 | Hiramatsu ......... H04N 1/00307 348/207.1 |
| 2015/0156519 A1 | 6/2015 | Watanabe et al. |
| 2016/0295257 A1 | 10/2016 | Iguchi et al. |

FOREIGN PATENT DOCUMENTS

| | | |
|---|---|---|
| JP | 2012-10311 A | 1/2012 |
| JP | 2015-119477 A | 1/2016 |
| JP | 2016-12831 A | 1/2016 |
| JP | 2016-29816 A | 3/2016 |
| WO | WO 2014/010501 A1 | 1/2014 |

* cited by examiner

FIG. 8

| MHASPacketType | Value |
|---|---|
| FILLDATA | 0 |
| MPEGH3DACFG | 1 |
| MPEGH3DAFRAME | 2 |
| SYNC | 6 |
| METADATA | 128    (EXAMPLE) |

FIG. 9

| user_data_registered_itu_t_t35( payloadSize ) { | Descriptor |
|---|---|
| itu_t_t35_country_code | b(8) |
| if( itu_t_t35_country_code != 0xFF ) | |
|     i = 1 | |
| else { | |
|     itu_t_t35_country_code_extension_byte | b(8) |
|     i = 2 | |
| } | |
| do { | |
|     itu_t_t35_payload_byte | b(8) |
|     i++ | |
| } while( i < payloadSize ) | |
| } | |

FIG. 10 generic_data syntax

| Syntax | No. of Bits | Format |
|---|---|---|
| generic_data(){ | | |
|   start_flag | 1 | bslbf |
|   end_flag | 1 | bslbf |
|   joint_delivery_flag | 1 | bslbf |
|   fcounter | 13 | uimsbf |
|   data_id | 8 | uimsbf |
|   payload_length | 8 | uimsbf |
|   if (start_flag ){ | | |
|     data_type | 8 | uimsbf |
|     payload_identifier | 8 | uimsbf |
|     target_data_size | 16 | uimsbf |
|     payload_length -= 4 | | |
|   } | | |
|   for (j= 0 ; j< payload_length ; j++) { | | |
|     data_payload_byte | 8 | bslbf |
|   } | | |
| } | | |

FIG. 11 generic_data semantics

| Field | Description |
|---|---|
| start_flag (1bit) | INDICATE START OF CONTAINER TARGET DATA. |
| end_flag (1bit) | INDICATE END OF CONTAINER TARGET DATA. |
| joint_delivery_flag (1bit) | INDICATE THAT DIVIDED CONTAINER TARGET DATA IS INSERTED INTO A PLURALITY OF MEDIA ENCODED STREAMS. |
| fcounter (13bits) | INDICATE DIVISION POSITION OF DIVIDED CONTAINER TARGET DATA BY THE NUMBER OF COUNTS IN ASCENDING ORDER. |
| data_id (8bits) | INDICATE ID OF CONTAINER TARGET DATA. |
| payload_length (8bits) | INDICATE SIZE OF DATA PAYLOAD BY THE NUMBER OF BYTES. |
| data_type (8bits) 0x01 | INDICATE TYPE OF DATA. INDICATE USE IN NETWORK ACCESS. |
| payload_identifier (8bits) 0x01 0x02 | INDICATE KIND OF CONTAINER TARGET DATA. URL data timestamp |
| target_data_size (16 bits) | INDICATE SIZE OF CONTAINER TARGET DATA. |
| data_payload_byte (N * 8 bits) | INDICATE ARRANGEMENT REGION OF CONTAINER TARGET DATA. |

FIG. 12 time_information syntax

| Syntax | No. of Bits | Type |
|---|---|---|
| time_information(){ | | |
| absolute_time_flag | 1 | bslbf |
| reserved | 7 | 0x7f |
| if (absolute_time_flag) { | | |
| exec_time_msw | 32 | uimsbf |
| exec_time_lsw | 32 | uimsbf |
| } else { | | |
| reference_UTC_msw | 32 | uimsbf |
| reference_UTC_lsw | 32 | uimsbf |
| offset_exec_time_msw | 32 | uimsbf |
| offset_exec_time_lsw | 32 | uimsbf |
| } | | |
| } | | |

FIG. 13

| | |
|---|---|
| absolute_time_flag (1bit) | INDICATE WHETHER EXECUTION TIME IS UTC ABSOLUTE TIME OR DIFFERENCE VALUE FROM REFERENCE TIME |
| | '1'  INDICATE UTC ABSOLUTE TIME |
| | '0'  INDICATE DIFFERENCE VALUE FROM REFERENCE TIME |
| exec_time (64bits) | INDICATE UTC ABSOLUTE TIME THAT IS DATA EXECUTION TIME |
| reference_UTC (64bits) | INDICATE REFERENCE TIME |
| offset_exec_time(64bits) | INDICATE DIFFERENCE VALUE FROM REFERENCE TIME THAT IS DATA EXECUTION TIME |

FIG. 14 data_container_descriptor syntax

| Syntax | No. of Bits | Type |
|---|---|---|
| data_container descriptor(){ | | |
|   desccriptor_tag | 8 | bslbf |
|   desccriptor_length | 8 | uimsbf |
|   data_insertion_flag | 1 | bslbf |
|   joint_stream_delivery_flag | 1 | bslbf |
|   media_stream_id | 6 | uimsbf |
|   if (joint_stream_delivery_flag) | | |
|     number_of_joint_streams | 8 | uimsbf |
|   } | | |
|   for ( i = 0 ; i < numer_of_joint_streams ; i++ ){ | | |
|     media_stream_id | 8 | uimsbf |
|     data_bitrate | 8 | uimsbf |
|     data_insertion_ratio | 8 | uimsbf |
|   } | | |
| } | | |

FIG. 15 data_container descriptor semantics data_insertion_flag (1bit): INDICATE WHETHER PREDETERMINED INFORMATION IS INSERTED INTO THE STREAM.
"1" INSERTED.
"0" NOT INSERTED.

joint_stream_delivery_flag (1bit): INDICATE WHETHER CONTAINER TARGET DATA IS INSERTED INTO THE OTHER STREAM IN ADDITION TO THE STREAM.
"1" DATA IS INSERTED INTO THE OTHER STREAM.
"0" DATA IS NOT INSERTED INTO THE OTHER STREAM.

media_stream_id (6bits): INDICATE IDENTIFICATION NUMBER OF THE STREAM.

data_bitrate (8bits): INDICATE bitrate(target_bitrate) AFTER DATA INSERTION BY VALUE IN 1000 bps UNIT.

data_insertion_ratio (8bits): INDICATE RATIO OF BIT RATE (AVR) OF INSERTION DATA WITH BIT RATE (CR) OF MEDIA ENCODED STREAM AS REFERENCE.
Ratio = inserted_data_bitrate / compressed_media_data_bitrate numer_of_joint_streams (8bits): INDICATE THE NUMBER OF STREAMS (EQUAL TO OR MORE THAN ONE) TO WHICH CONTAINER TARGET DATA IS INSERTED.

(2) IN A CASE WHERE CONTAINER TARGET DATA (PREDETERMINED INFORMATION) IS TRANSMITTED AS SINGLE PIECE OF generic_data (3) IN A CASE WHERE A PLURALITY OF PIECES OF CONTAINER TARGET DATA (PREDETERMINED INFORMATION) IS DIVIDED INTO A PLURALITY OF PIECES OF generic_data AND TRANSMITTED

FIG. 41

EXEMPLARY DESCRIPTION IN MPD FILE (DATA INSERTION STREAMS ARE TWO AUDIO STREAMS)

```
<MPD>
  <Period>
    <AdaptationSet mimeType="audio/mp4" group="1">
      <SupplementaryDescriptor schemeIdUri="urn:brdcst:codecType" value="ac4" or "mpegh"/>
      <SupplementaryDescriptor schemeIdUri="urn:brdcst:genericdataContained" value="true"/>
      <SupplementaryDescriptor schemeIdUri="urn:brdcst:jointstreamdelivery" value="true"/>
      <SupplementaryDescriptor schemeIdUri="urn:brdcst:netlink:metaInsertionFrequency" value="1"/>
      <SupplementaryDescriptor schemeIdUri="urn:brdcst:type" value="netlink"/>
      <SupplementaryDescriptor schemeIdUri="urn:brdcst:databitrate" value="value"/>
      <SupplementaryDescriptor schemeIdUri="urn:brdcst:datainsertionratio" value="value"/>
      <Representation id="11" bandwidth="64000">
        <baseURL>audio/jp/64.mp4</BaseURL>
      </Representation>
    </AdaptationSet>
    <AdaptationSet mimeType="audio/mp4" group="2">
      <SupplementaryDescriptor schemeIdUri="urn:brdcst:codecType" value="ac4" or "mpegh"/>
      <SupplementaryDescriptor schemeIdUri="urn:brdcst:genericdataContained" value="true"/>
      <SupplementaryDescriptor schemeIdUri="urn:brdcst:jointstreamdelivery" value="true"/>
      <SupplementaryDescriptor schemeIdUri="urn:brdcst:netlink:metaInsertionFrequency" value="1"/>
      <SupplementaryDescriptor schemeIdUri="urn:brdcst:type" value="netlink"/>
      <SupplementaryDescriptor schemeIdUri="urn:brdcst:databitrate" value="value"/>
      <SupplementaryDescriptor schemeIdUri="urn:brdcst:datainsertionratio" value="value"/>
      <Representation id="21" bandwidth="96000">
        <baseURL>audio/jp/96.mp4</BaseURL>
      </Representation>
    </AdaptationSet>
  </Period>
</MPD>
```

FIG. 42

EXEMPLARY DESCRIPTION IN MPD FILE (DATA INSERTION STREAMS ARE AUDIO STREAM AND VIDEO STREAM)

```xml
<MPD>
  <Period>
    <AdaptationSet mimeType="audio/mp4" group="1">
      <SupplementaryDescriptor schemeIdUri="urn:brdcst:codecType" value="mpegh"/>
      <SupplementaryDescriptor schemeIdUri="urn:brdcst:genericdataContained" value="true"/>
      <SupplementaryDescriptor schemeIdUri="urn:brdcst:jointstreamdelivery" value="true"/>
      <SupplementaryDescriptor schemeIdUri="urn:brdcst:netlink:metaInsertionFrequency" value="1"/>
      <SupplementaryDescriptor schemeIdUri="urn:brdcst:type" value="netlink"/>
      <SupplementaryDescriptor schemeIdUri="urn:brdcst:databitrate" value="value"/>
      <SupplementaryDescriptor schemeIdUri="urn:brdcst:datainsertionratio" value="value"/>
      <Representation id="11" bandwidth="128000">
        <BaseURL>audio/jp/128.mp4</BaseURL>
      </Representation>
    </AdaptationSet>
    <AdaptationSet mimeType="video/mp4" group="2">
      <SupplementaryDescriptor schemeIdUri="urn:brdcst:codecType" value="hevc"/>
      <SupplementaryDescriptor schemeIdUri="urn:brdcst:genericdataContained" value="true"/>
      <SupplementaryDescriptor schemeIdUri="urn:brdcst:jointstreamdelivery" value="true"/>
      <SupplementaryDescriptor schemeIdUri="urn:brdcst:metaInsertionFrequency" value="1"/>
      <SupplementaryDescriptor schemeIdUri="urn:brdcst:type" value="netlink"/>
      <SupplementaryDescriptor schemeIdUri="urn:brdcst:databitrate" value="value"/>
      <SupplementaryDescriptor schemeIdUri="urn:brdcst:datainsertionratio" value="value"/>
      <Representation id="21" bandwidth="20000000">
        <BaseURL>video/jp/20000.mp4</BaseURL>
      </Representation>
    </AdaptationSet>
  </Period>
</MPD>
```

FIG. 43

SchemeIdUri IS DEFINED AS FOLLOWS BY SupplementaryDescriptor.

schemeIdUri="urn:brdcst:codecType" INDICATES KIND OF CODEC.
    value: DESCRIBED AS "mpegh", "AAC", "AC3", "AC4", "hevc" AND THE LIKE schemeIdUri="urn:brdcst:netlink:genericdataContained" INDICATES THAT generic DATA IS INCLUDED.
    value: "true"    generic DATA IS INCLUDED.
    value: "false"    generic DATA IS NOT INCLUDED.

schemeIdUri="urn:brdcst:jointstreamdelivery" INDICATES THAT INFORMATION NECESSARY FOR INTERNET CONNECTION IS COOPERATIVELY SUPPLIED BETWEEN A PLURALITY OF MEDIA STREAMS.
    value: "true"    INTERNET CONNECTION INFORMATION IS SUPPLIED COOPERATIVELY WITH OTHER Adaptation Set STREAM.
    (FOR EXAMPLE, INTERNET CONNECTION INFORMATION IS SUPPLIED WITH audio stream AND video stream)
    value: "false"    INTERNET CONNECTION INFORMATION IS SUPPLIED ONLY WITH Adaptation Set STREAM.

schemeIdUri="urn:brdcst:netlink:metaInsertionFrequency" INDICATES FREQUENCY OF SUPPLYING META INFORMATION PER ACCESS UNIT.
    value: "1"    SINGLE USER DATA entry OCCURS IN SINGLE ACCESS UNIT.
    value: "2"    A PLURALITY OF USER DATA entry OCCURS IN SINGLE ACCESS UNIT.
    value: "3"    ONE OR MORE USER DATA entry OCCURS IN PERIOD SEPARATED BY RANDOM ACCESS POINTS.

schemeIdUri="urn:brdcst:type"
    value: "netlink"    KIND OF SERVICE BY META IS INTERNET CONNECTION.

schemeIdUri="urn:brdcst:databitrate"
    value="value"    INDICATE bitrate(target_bitrate) AFTER DATA INSERTION BY VALUE IN 1000 bps UNIT.

schemeIdUri="urn:brdcst:datainsertionratio"
    value="value" /    INDICATE RATIO OF BIT RATE (AVR) OF INSERTION DATA WITH BIT RATE (CR) OF MEDIA ENCODED STREAM AS REFERENCE.

Ratio = inserted_data_bitrate / compressed_media_data_bitrate

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and particularly, to a transmission device and the like for inserting predetermined information to a media encoded stream such as a video and an audio and transmitting the same.

BACKGROUND ART

For example, in Patent Document 1, it has been proposed that predetermined information is inserted into an audio compression data stream from a broadcasting station, a distribution server, and the like and is transmitted, a set top box of a reception side transmits the audio compression data stream to a television receiver via an HDMI digital interface, and the television receiver performs information processing using the predetermined information.

CITATION LIST

Patent Document

Patent Document 1: Japanese Patent Application Laid-Open No. 2012-010311

SUMMARY OF THE INVENTION

Problems to be Solved by the Invention

An object of the present technology is to satisfactorily insert predetermined information into a media encoded stream and transmit the same.

Solutions to Problems

A concept of the present technology is a transmission device including:

an information insertion unit that sequentially inserts divided portions obtained by dividing predetermined information into a predetermined number of unit portions of a media encoded stream as adding sequential information for reconstruction; and a transmission unit that transmits a container with a predetermined format including the media encoded stream into which the predetermined information is inserted, in which the information insertion unit divides the predetermined information so that a bit rate of the predetermined information falls within a predetermined bit rate.

In the present technology, the information insertion unit sequentially inserts the divided portions obtained by dividing the predetermined information into the predetermined number of unit portions of the media encoded stream. The sequential information for reconstruction is added to each divided portion. In this case, the predetermined information is divided so that the bit rate of the predetermined information falls within the predetermined bit rate. Then, the transmission unit transmits the container with the predetermined format including the media encoded stream into which the predetermined information is inserted.

For example, the information insertion unit may divide the predetermined information so that a data size of the divided portion is a fixed size. In this case, for example, the information insertion unit may calculate the fixed size by dividing an allowable bit rate obtained by subtracting a bit rate of the media encoded stream from a target bit rate by the number of unit portions generated in one second.

Furthermore, for example, the information insertion unit may divide the predetermined information so that a data size of each unit portion into which the divided portion is inserted is a fixed size. In this case, for example, the information insertion unit may calculate the fixed size by adding a first size obtained by dividing the allowable bit rate obtained by subtracting the bit rate of the media encoded stream from the target bit rate by the number of unit portions generated in one second to a second size obtained by dividing the bit rate of the media encoded stream by the number of unit portions generated in one second. In addition, the target bit rate and a bit rate ratio relative to a media encoding of the data to be inserted may be transmitted as identification information so as to be recognized by a receiver.

As described above, in the present technology, the divided portions obtained by dividing the predetermined information are inserted into the predetermined number of unit portions of the media encoded stream so that the bit rate falls within the predetermined bit rate, and the media encoded stream is transmitted. Therefore, a bit rate of the whole including the media encoded stream can fall within a target bit rate, and the media encoded stream can be satisfactorily transmitted as inserting the predetermined information into the media encoded stream.

Note that in the present technology, for example, the information insertion unit may sequentially insert the divided portions obtained by dividing the predetermined information into the predetermined number of unit portions of one or more media encoded streams as adding the sequential information for reconstruction and may add identification information to identify whether the divided portion is inserted into the other media encoded stream to each of the divided portions to be inserted into the predetermined number of unit portions of the one or more media encoded streams. By transmitting each divided portion obtained by dividing the predetermined information by using a large number of media encoded streams, a time required for transmission of the entire predetermined information can be shortened. In this case, the reception side can easily recognize that the divided portion is inserted into the other media encoded stream on the basis of the identification information added to each divided portion, and all the divided portions of the predetermined information can be efficiently extracted.

In this case, for example, the identification information insertion unit may be further included that inserts identification information indicating that the divided portions of the predetermined information are inserted in correspondence with each of the one or more media encoded streams into the container. With this structure, the reception side can easily identify the media encoded stream into which the divided portion of the predetermined information is inserted. Then, in this case, the identification information insertion unit may further insert identification information indicating whether the other media encoded stream into which the divided portion of the predetermined information is inserted exists in correspondence with each of the one or more media encoded streams, and identification information indicating the other media encoded stream when the other media encoded stream exists into the container.

In addition, another concept of the present technology is a transmission device including:

an information insertion unit that sequentially inserts divided portions obtained by dividing predetermined information into a predetermined number of unit portions of one or more media encoded streams as adding sequential information for reconstruction; and a transmission unit that transmits a container with a predetermined format including the one or more media encoded streams into which the divided portions of the predetermined information are inserted.

In the present technology, the divided portions obtained by dividing the predetermined information are sequentially inserted into the predetermined number of unit portions of the one or more media encoded streams. The sequential information for reconstruction is added to each divided portion. The transmission unit transmits the container with the predetermined format including the one or more media encoded streams into which the divided portions of the predetermined information are inserted.

As described above, in the present technology, the divided portions obtained by dividing the predetermined information are inserted into the predetermined number of unit portions of the one or more media encoded streams and transmitted. Therefore, with transmission by using a large number of media encoded streams, a time required for transmitting the entire predetermined information can be shortened.

Note that, in the present technology, for example, the information insertion unit may add identification information indicating whether the divided portion is inserted into the other media stream to each divided portion to be inserted into each of the one or more media encoded streams. In this case, the reception side can easily recognize that the divided portion is inserted into the other media encoded stream on the basis of the identification information added to each divided portion, and all the divided portions of the predetermined information can be efficiently extracted.

Furthermore, in the present technology, for example, the identification information insertion unit may be further included that inserts identification information indicating that the divided portions of the predetermined information are inserted in correspondence with each of the one or more media encoded streams in the container. With this structure, the reception side can easily identify the media encoded stream into which the divided portion of the predetermined information is inserted. Then, in this case, the identification information insertion unit may further insert identification information indicating whether the other media encoded stream into which the divided portion of the predetermined information is inserted exists in correspondence with each of the one or more media encoded streams, and identification information indicating the other media encoded stream when the other media encoded stream exists in the container.

In addition, still another concept of the present technology is a reception device including:

a stream reception unit that receives one or more media encoded streams, in which divided portions obtained by dividing predetermined information are sequentially inserted into a predetermined number of unit portions of the one or more media encoded streams as adding sequential information for reconstruction, and the reception device further includes:

a control unit that controls processing for extracting the divided portions of the predetermined information from the predetermined number of unit portions of the one or more media encoded streams and reconstructing the predetermined information on the basis of the sequential information and information processing using the reconstructed predetermined information.

In the present technology, the reception unit receives the one or more media encoded streams. For example, the stream reception unit may receive the one or more media encoded streams from an external device via a digital interface.

Each divided portion of the predetermined information is extracted from the predetermined number of unit portions of the one or more media encoded streams, and the predetermined information is reconstructed on the basis of the sequential information. Then, the information processing using the reconstructed predetermined information is performed.

For example, it is preferable that identification information to identify whether the divided portion is inserted into the other media encoded stream be added to each of the divided portions inserted into the predetermined number of unit portions of the one or more media encoded streams, and in the processing of reconstructing the predetermined information, the each of the divided portions of the predetermined information be extracted from the predetermined number of unit portions of the one or more media encoded streams.

As described above, in the present technology, each divided portion of the predetermined information is extracted from the predetermined number of unit portions of one or more media encoded streams, the predetermined information is reconstructed on the basis of the sequential information, and the information processing using the reconstructed predetermined information is performed. Therefore, it is possible to appropriately reconstruct predetermined information and satisfactorily perform the information processing.

In addition, yet another concept of the present technology is a reception device including:

a reception unit that receives a container with a predetermined format including one or more media encoded streams, in which divided portions obtained by dividing predetermined information are sequentially inserted into a predetermined number of unit portions of the one or more media encoded streams as adding sequential information for reconstruction, and identification information indicating that the divided portion of the predetermined information is inserted in correspondence with each of the one or more media encoded streams is inserted into the container, and the reception device further includes:

a transmission unit that transmits the one or more media encoded streams into which the divided portions of the predetermined information are inserted to the external device via a digital interface on the basis of the identification information.

In the present technology, the reception unit receives the container with the predetermined format including the one or more media encoded streams. The divided portions obtained by dividing the predetermined information are sequentially inserted into the predetermined number of unit portions of the one or more media encoded streams as adding the sequential information for reconstruction. Furthermore, into the container, the identification information is inserted that indicates that the divided portion of the predetermined information is inserted in correspondence with each of the one or more media encoded streams. The transmission unit transmits the one or more media encoded streams into which the divided portions of the predetermined information are respectively inserted to the external device via the digital interface on the basis of the identification information.

As described above, in the present technology, the one or more media encoded streams into which the divided portions of the predetermined information are inserted are transmitted to the external device via the digital interface on the basis of the identification information inserted into the container. Therefore, the external device can extract all the divided portions of the predetermined information from the one or more media encoded streams and reconstruct and use the predetermined information.

Effects of the Invention

According to the present technology, it is possible to satisfactorily insert predetermined information into a media encoded stream and transmit the stream. Note that the effects described herein are only exemplary and not limited to these. Furthermore, there may be an additional effect.

BRIEF DESCRIPTION OF DRAWINGS

FIG. 8 is a diagram of a correspondence relationship between a packet type and a value for the packet type.

FIG. 9 is a diagram of an exemplary structure of an entry used to arrange generic data (generic_data) in a METADATA packet.

FIG. 10 is a diagram of an exemplary structure of the generic data (generic_data).

FIG. 11 is a diagram of a content of main information in the exemplary structure of the generic data (generic_data).

FIG. 12 is a diagram of an exemplary structure of time information (time_information).

FIG. 13 is a diagram of a content of main information in the exemplary structure of the time information (time_information).

FIG. 14 is a diagram of an exemplary structure of data container descriptor (data_container descriptor).

FIG. 15 is a diagram of a content of main information in the exemplary structure of the data container descriptor (data_container descriptor).

FIG. 41 is a diagram of an exemplary description in an MPD file in a case where a data insertion stream includes two audio streams.

FIG. 42 is a diagram of an exemplary description in an MPD file in a case where a data insertion stream includes an audio stream and a video stream.

FIG. 43 is a diagram of a content of main information in the exemplary description in the MPD file.

MODE FOR CARRYING OUT THE INVENTION

A mode for carrying out the present invention (referred to as "embodiment") will be described below. Note that the description will be made in the following order.
1. Embodiment
2. Modification 1. Embodiment

[Exemplary Configuration of Transmission/Reception System]

Figure 1:
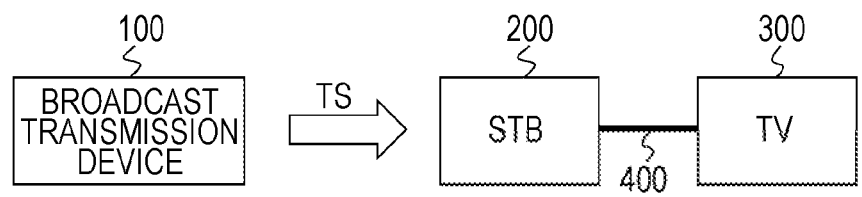
FIG. 1 is a block diagram of an exemplary configuration of a transmission/reception system as an embodiment.

FIG. 1 is an exemplary configuration of a transmission/reception system 10 as an embodiment. The transmission/reception system 10 includes a broadcast transmission device 100, a set top box (STB) 200, and a television receiver (TV) 300. The set top box 200 and the television receiver 300 are connected to each other via a HDMI cable 400. In this case, the set top box 200 is a source, and the television receiver 300 is a destination. Note that the "HDMI" is a registered trademark.

The broadcast transmission device 100 transmits an MPEG-2 transport stream (simply referred to as "transport stream TS" below) as a container (multiplexed stream) on a broadcast wave. The transport stream TS includes a video stream and an audio stream as media encoded streams.

Furthermore, the broadcast transmission device 100 sequentially inserts divided portions obtained by dividing predetermined information into a predetermined number of unit portions of one or more media encoded streams, that is, one or more audio streams in the present embodiment as adding sequential information for reconstruction. Note that the predetermined number includes one. When the predetermined number is one, the predetermined information is not actually divided, and the entire information is inserted into a single unit portion. The predetermined information is network access information, command information, a media file, and the like. By transmitting each divided portion obtained by dividing the predetermined information by using a large number of media encoded streams, a time required for transmission of the entire predetermined information can be shortened.

Here, the unit portion is, for example, an access unit. The access unit means an audio frame in which a predetermined number of pieces of audio sample data are bundled in a case where the media encoded stream is an audio stream and means a picture in a case where the media encoded stream is a video stream.

Furthermore, the broadcast transmission device 100 divides the predetermined information so that a bit rate of the predetermined information falls within a predetermined bit rate. By dividing the predetermined information in this way, a bit rate of the whole including the media encoded stream can be suppressed to a target bit rate, and the media encoded stream can be satisfactorily transmitted as inserting the predetermined information into the media encoded stream.

For example, the predetermined information is divided so that a data size of each divided portion is a fixed size. In this case, for example, the fixed size is calculated by dividing an allowable bit rate obtained by subtracting the bit rate of the media encoded stream from the target bit rate by the number of unit portions generated in one second.

Furthermore, for example, the predetermined information is divided so that a data size of each unit portion into which the divided portion is inserted is a fixed size. At this time, the data sizes of the divided portions vary. In this case, for example, the fixed size is calculated by adding a first size obtained dividing the allowable bit rate obtained by subtracting the bit rate of the media encoded stream from the target bit rate by the number of unit portions generated in one second to a second size obtained by dividing the bit rate of the media encoded stream by the number of unit portions generated in one second.

In addition, the broadcast transmission device 100 adds identification information for identifying whether the divided portion is inserted into the other media encoded stream to each divided portion to be inserted into each of the predetermined number of unit portions of one or more media encoded streams. In this case, the reception side can easily recognize that the divided portion is inserted into the other media encoded stream on the basis of the identification information added to each divided portion, and all the divided portions of the predetermined information can be efficiently extracted.

In addition, the broadcast transmission device 100 inserts identification information, indicating that the divided portion of the predetermined information is inserted in correspondence with each of the one or more media encoded streams into the transport stream TS as a container. By inserting the identification information in this way, the reception side can easily identify the media encoded stream into which the divided portion of the predetermined information is inserted.

In addition, the broadcast transmission device 100 inserts the identification information indicating whether the other media encoded stream into which the divided portion of the predetermined information is inserted exists in correspondence with each of the one or more media encoded streams and identification information indicating the other media encoded stream when the other media encoded stream exists into the transport stream TS as a container.

The set top box 200 receives the transport stream TS transmitted from the broadcast transmission device 100 on the broadcast wave. As described above, the transport stream TS includes the media encoded streams (video stream and audio stream). Then, in the present embodiment, the divided portions obtained by dividing the predetermined information are sequentially inserted into the predetermined number of unit portions of the one or more audio streams as adding the sequential information for reconstruction.

The set top box 200 transmits uncompressed video data obtained by decoding the received video stream and the received one or more audio streams to the television receiver 300 via the HDMI cable 400. As described above, the identification information is inserted, which indicates that the divided portion of the predetermined information is inserted in correspondence with each of the one or more audio streams, into the transport stream TS.

The set top box 200 transmits all of one or more audio streams into which the divided portions of the predetermined information are respectively inserted to the television receiver 300 on the basis of the identification information. Even in a case where the television receiver 300 has a decoding capability to decode only a part of one or more audio streams, the set top box 200 transmits not only a part of the audio streams but also all of one or more audio streams into which the divided portions of the predetermined information are respectively inserted to the television receiver 300. With this operation, the television receiver 300 can extract all the divided portions of the predetermined information from the one or more media encoded streams and can reconstruct and use the predetermined information.

The television receiver 300 receives uncompressed video data and one or more audio streams into which the divided portions of the predetermined information are respectively inserted from the set top box 200 to the HDMI cable 400. The television receiver 300 displays an image on the basis of the uncompressed video data. Furthermore, the television receiver 300 decodes all or a part of one or more audio streams to obtain uncompressed audio data according to the decoding capability and outputs sounds on the basis of the audio data.

Furthermore, the television receiver 300 extracts the divided portion of the predetermined information from the one or more audio streams and reconstructs the predetermined information on the basis of the sequential information. Then, the television receiver 300 obtains media data by information processing using the reconstructed predetermined information, for example, media access information and performs processing such as image display or audio output by the media data.

[Stream Generation Unit of Broadcast Transmission Device]

Figure 2:
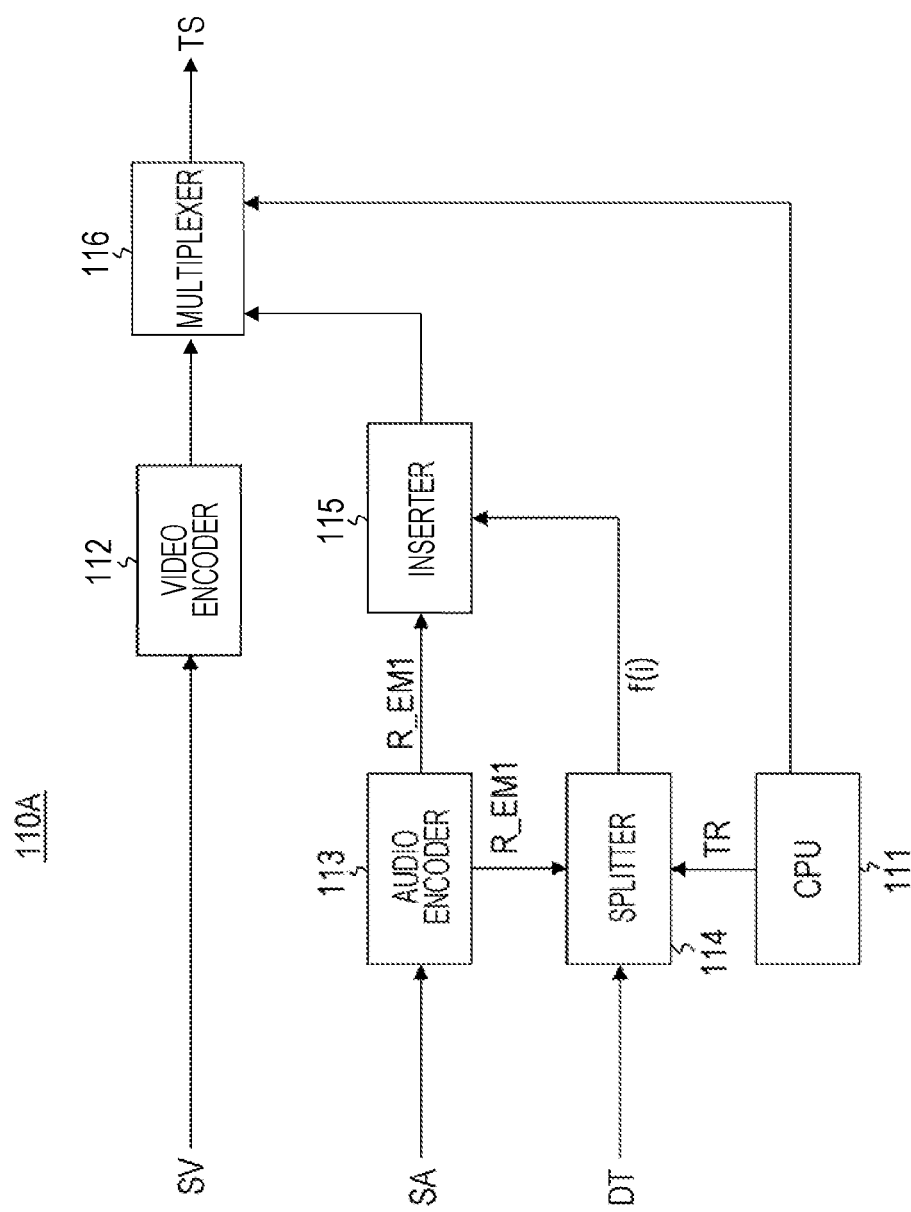
FIG. 2 is a block diagram of an exemplary configuration of a stream generation unit included in a broadcast transmission device.

In FIG. 2, an exemplary configuration of a stream generation unit 110A included in the broadcast transmission device 100 is illustrated. In the stream generation unit 110A, a single audio stream is generated, and each divided portion obtained by dividing the predetermined information (inserted data) is inserted into each of the predetermined number of audio frames. The stream generation unit 110A includes a CPU 111, a video encoder 112, an audio encoder 113, a splitter 114, an inserter 115, and a multiplexer 116. Note that the splitter 114 and the inserter 115 may be included as a part of the audio encoder 113 or the CPU 111.

The CPU 111 controls each unit of the stream generation unit 110A. The video encoder 112 performs encoding such as MPEG2, H.264/AVC, and H.265/HEVC on video data (image data) SV to generate a video stream (video elementary stream). The video data SV is, for example, video data reproduced from a recording medium such as a hard disk drive (HDD), live video data obtained by a video camera, or the like.

The audio encoder 113 encodes audio data (sound data) SA with an MPEG-H 3D Audio compression format to generate an audio stream (audio elementary stream). The audio data SA corresponds to the video data SV and is audio data reproduced from a recording medium such as an HDD, live audio data obtained by a microphone, or the like.

The splitter 114 divides the inserted data DT included in the predetermined information and obtains a predetermined number of divided portions f(i). The inserter 115 sequentially inserts the predetermined number of divided portions obtained by dividing the inserted data DT by the splitter 114 into a predetermined number of audio frames of an audio stream as adding sequential information for reconstruction. The sequential information includes, for example, information indicating that the divided portion is a first divided portion, a final divided portion or indicating a number of divided portions and the like.

The splitter 114 divides the inserted data DT so that a bit rate of the inserted data DT falls within a predetermined bit rate, here, an allowable bit rate.

In this case, the splitter 114 divides the inserted data DT by, for example, the following method (1) or (2).

(1) The inserted data DT is divided so that the data size of each divided portion is a fixed size.

(2) The inserted data DT is divided so that the data size of the audio frame into which each divided portion is inserted is a fixed size.

A case of the division by the method in (1) will be described. In this case, the splitter 114 calculates an allowable bit rate AVR (=TR−CR) by subtracting a bit rate CR of an audio stream recognized from an audio stream R_EM1 generated by the audio encoder 113 from a target bit rate TR specified by the CPU 111. Note that the allowable bit rate AVR may be calculated as specifying a ratio with the bit rate of the audio encoded stream or the allowable bit rate AVR may be specified.

Then, the splitter 114 calculates a fixed size AIS by dividing the allowable bit rate AVR by the number of audio frames AU_frec generated in one second by the following formula (1). Note that a unit of the fixed size obtained by the formula (1) is byte.

$$AIS = AVR/8/AU\_frec \qquad (1)$$

Figure 3:
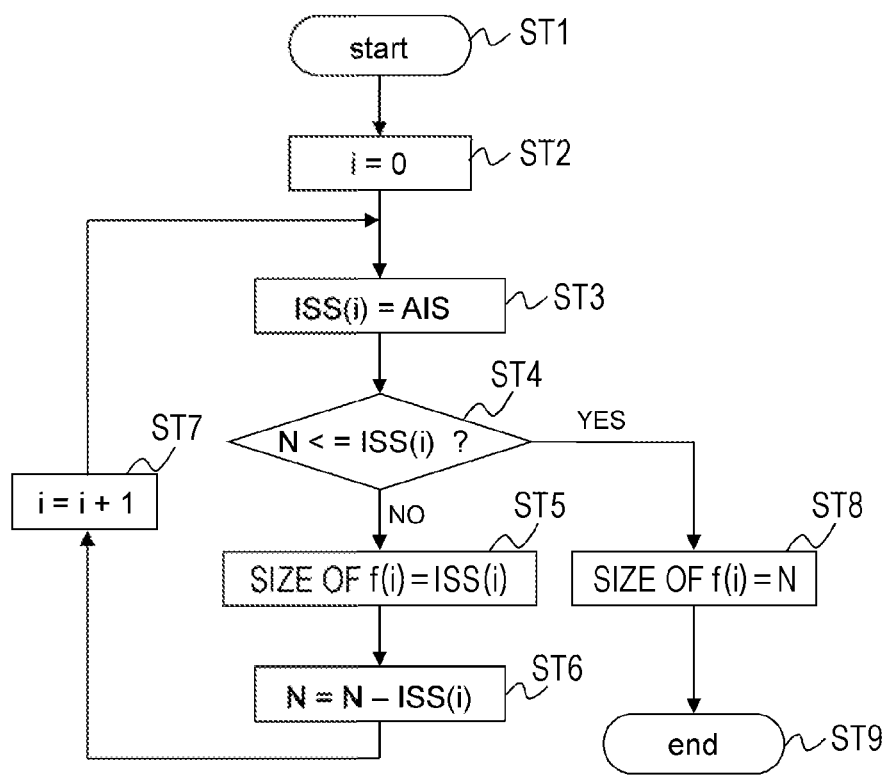
FIG. 3 is a flowchart of an exemplary processing procedure to determine a size of each divided portion to be inserted into each of a predetermined number of audio frames.

A flowchart in FIG. 3 illustrates an exemplary processing procedure to determine a size of the respective divided portions to be inserted into the predetermined number of audio frames in a case of the division by the method in (1). The splitter 114 starts processing in step ST1. Then, the splitter 114 sets i=0 in step ST2, further sets ISS(i)=AIS in step ST3. After that, the procedure proceeds to processing in step ST4.

In step ST4, the splitter 114 determines whether a remaining size N of the inserted data DT is equal to or less than ISS(i). The start of the remaining size N coincides with that of a size N_Origin of the inserted data DT. When N is not equal to or less than ISS(i), the splitter 114 sets the size of the divided portion f(i) to be inserted into an i-th audio frame to ISS(i) in step ST5.

Next, the splitter 114 sets N=N−ISS(i) in step ST6 and further sets i=i+1 in step ST7. Then, the procedure returns to the processing in step ST3, and the procedure shifts to processing for determining the size of the divided portion f(i) to be inserted into the next audio stream.

When N is equal to or less than ISS(i) in step ST4, the splitter 114 sets the size of the divided portion f(i) to be inserted into an i-th audio frame to N in step ST8. After the processing in step ST8, the splitter 114 terminates the processing in step ST9.

Figure 4:
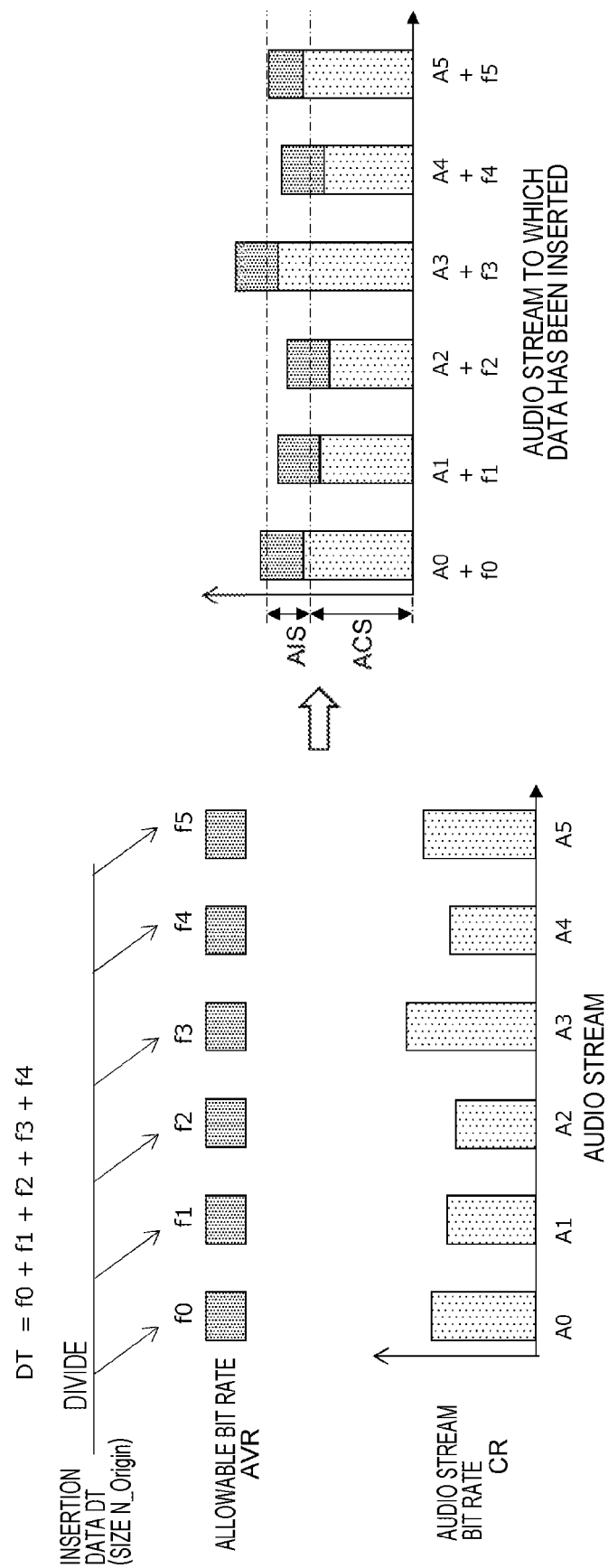
FIG. 4 is a diagram of an example of division of inserted data DT and an example of transition of the size of each audio frame in a case where each divided portion f(i) is inserted into the corresponding audio frame of an audio stream.

FIG. 4 is a diagram of an example of division of the inserted data DT in a case of the division by the method in (1) and an example of transition of the size of each audio frame in a case where each divided portion f(i) is inserted into the corresponding audio frame of the audio stream. In the illustrated example, the inserted data DT is divided into six divided portions, i.e., f0, f1, f2, f3, f4, and f5, and the divided portions are respectively inserted into audio frames A0, A1, A2, A3, A4, and A5 of an audio stream.

In this case, a change in the data size of each audio frame before being inserted is reflected to the data size of each inserted audio frame. Note that, as will be described later, "ACS" indicates a data size obtained by dividing the bit rate CR of the audio stream by the number of audio frames AU_frec generated in one second, that is, an average data size of the audio frames of the audio stream.

Next, a case of division by the method in (2) will be described. In this case, the splitter 114 calculates an allowable bit rate AVR (=TR−CR) by subtracting a bit rate CR of an audio stream recognized from an audio stream R_EM1 generated by the audio encoder 113 from a target bit rate TR specified by the CPU 111. Then, the splitter 114 calculates a first size AIS by dividing the allowable bit rate AVR by the number of audio frames AU_frec generated in one second by the above formula (1).

Furthermore, the splitter 114 calculates a second size ACS by dividing the bit rate CR of the audio stream by the number of audio frames AU_frec generated in one second by the following formula (2). The second size indicates the average data size of the audio frames of the audio stream. Then, the splitter 114 calculates a fixed size by adding the first size AIS and the second size ACS.

$$ACS=CR/8/AU\_\text{frec} \qquad (2)$$

Figure 5:
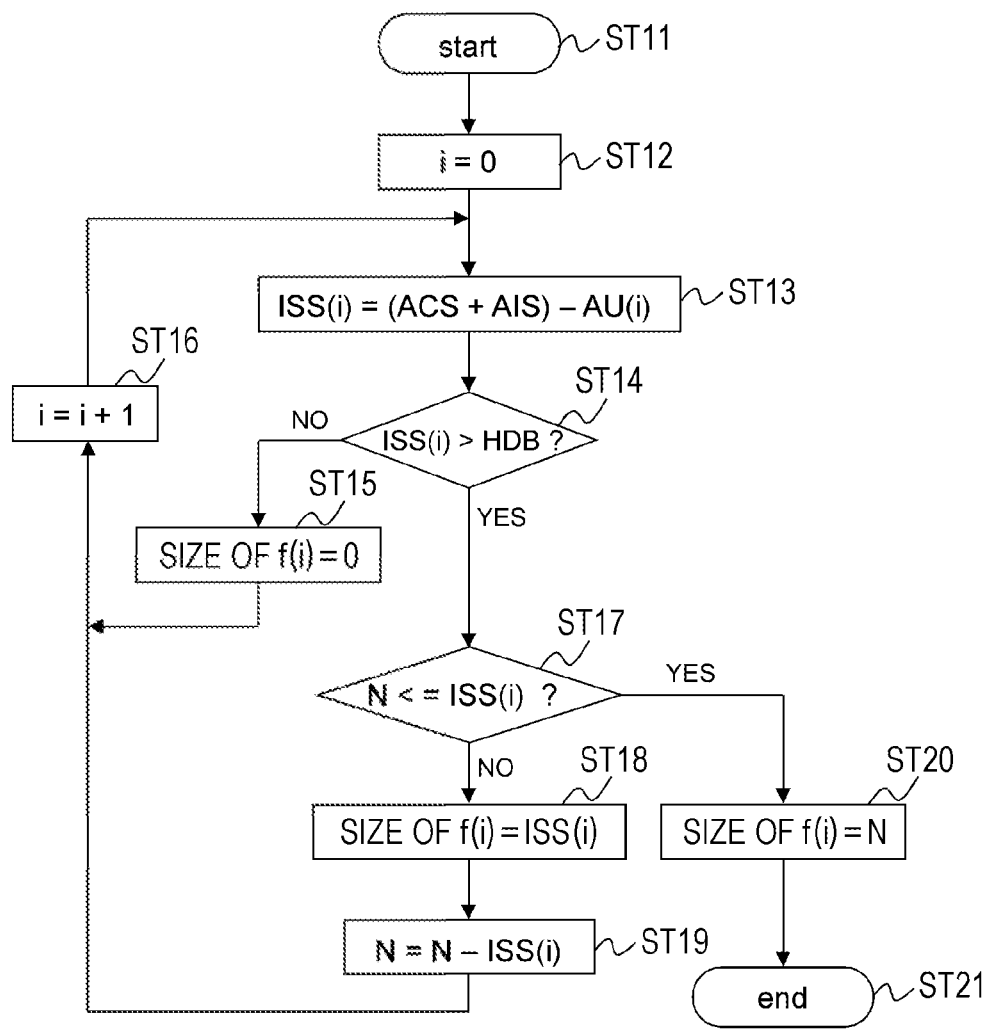
FIG. 5 is a flowchart of an exemplary processing procedure to determine a size of each divided portion to be inserted into each of a predetermined number of audio frames.

FIG. 5 illustrates an exemplary processing procedure to determine a size of the each of the divided portions to be inserted into the predetermined number of audio frames in a case of the division by the method in (2). The splitter 114 starts processing in step ST11. Then, the splitter 114 sets i=0 in step ST12 and further sets ISS(i)=(ACS+AIS)−AU(i) in step ST13. After that, the procedure proceeds to processing in step ST14. Here, AU(i) is a data size of the i-th audio frame into which the divided portion of the inserted data DT is inserted.

In step ST14, the splitter 114 determines whether the ISS(i) is larger than the number of bytes (HDB) corresponding to a header of syntax illustrated in FIG. 10. When the ISS(i) is equal to or less than the HDB, the splitter 114 sets the size of the divided portion f(i) to be inserted into the i-th audio frame to zero in step ST15. After the processing in step ST15, the splitter 114 sets i=i+1 in step ST16, and the procedure returns to the processing in step ST13. The procedure shifts to processing for determining the size of the divided portion f(i) to be inserted into the next audio stream.

When ISS(i) is larger than the HDB in step ST14, the splitter 114 determines in step ST17 whether the remaining size N of the inserted data DT is equal to or less than ISS(i). The start of the remaining size N coincides with that of a size N_Origin of the inserted data DT. When N is not equal to or less than ISS(i), the splitter 114 sets the size of the divided portion f(i) to be inserted into the i-th audio frame to ISS(i) in step ST18.

Next, the splitter 114 sets N=N−ISS(i) in step ST19 and further sets i=i+1 in step ST16. Then, the procedure returns to the processing in step ST13, and the procedure shifts to processing for determining the size of the divided portion f(i) to be inserted into the next audio stream.

When N is equal to or less than ISS(i) in step ST17, the splitter 114 sets the size of the divided portion f(i) to be inserted into the i-th audio frame to N in step ST20. After the processing in step ST20, the splitter 114 terminates the processing in step ST21.

Figure 6:
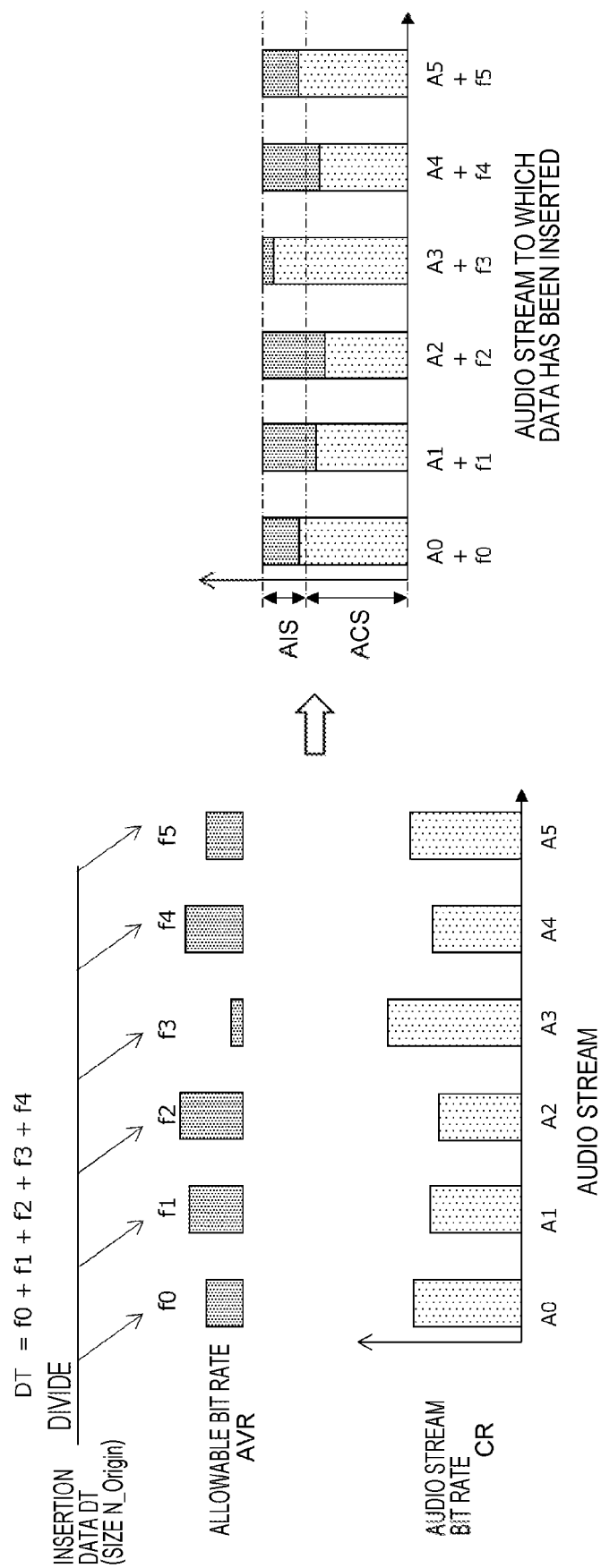
FIG. 6 is a diagram of an example of division of inserted data DT and an example of transition of the size of each audio frame in a case where each divided portion f(i) is inserted into the corresponding audio frame of an audio stream.

FIG. 6 is a diagram of an example of division of the inserted data DT in a case of the division by the method in (2) and an example of transition of the size of each audio frame in a case where each divided portion f(i) is inserted into the corresponding audio frame of the audio stream. In the illustrated example, the inserted data DT is divided into six divided portions, i.e., f0, f1, f2, f3, f4, and f5, and the divided portions are respectively inserted into audio frames A0, A1, A2, A3, A4, and A5 of an audio stream.

In this case, the data size of each audio frame to which the data has been inserted does not depend on the change in the data size of each audio frame before insertion and is constant except for an audio frame into which the final divided portion of the inserted data DT is inserted. Note that, in the illustrated example, the size of the audio frame into which the final divided portion of the inserted data DT is inserted has a constant data size of (ACS+AIS).

Figure 7:
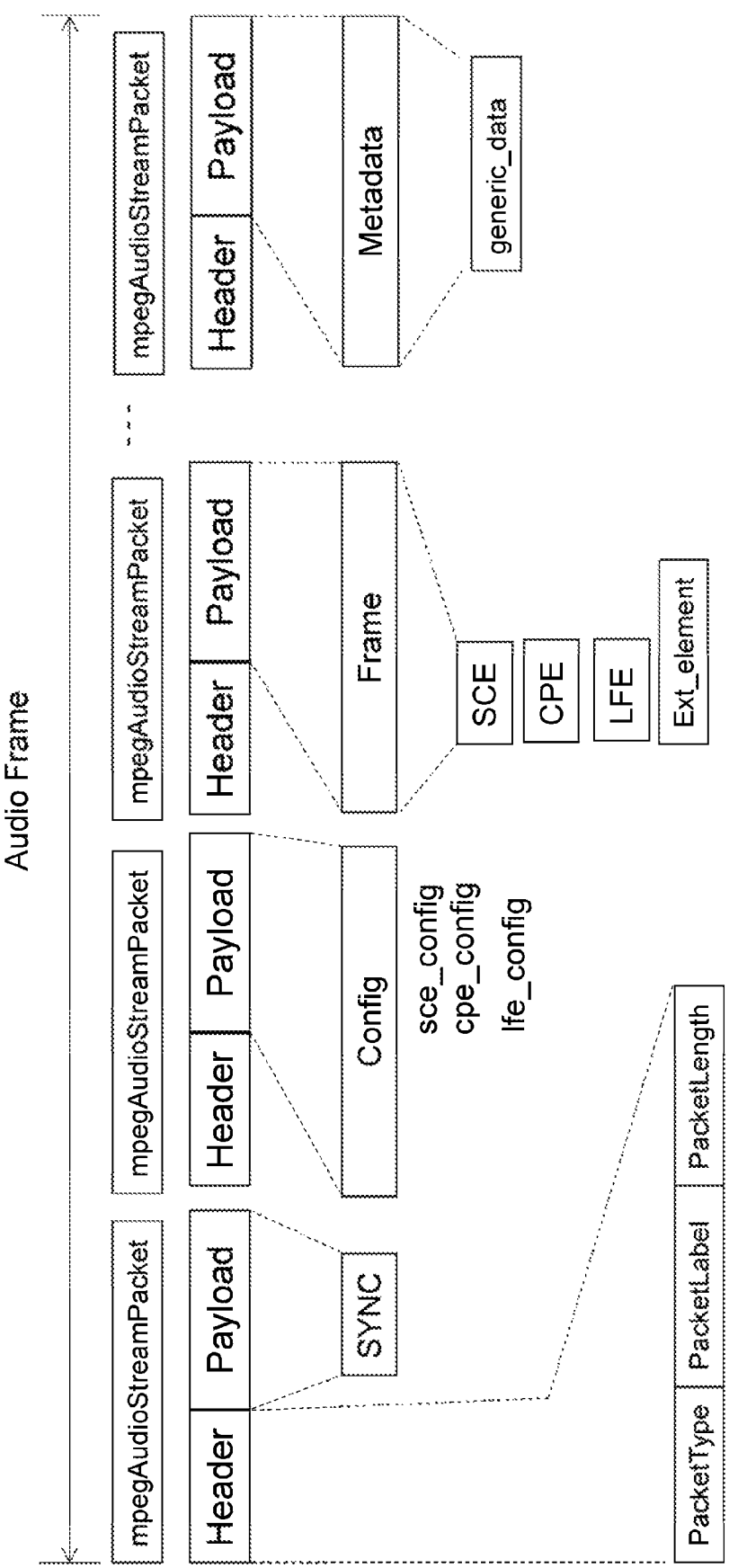
FIG. 7 is a diagram of an exemplary structure of an audio frame in transmission data of MPEG-H 3D Audio.

FIG. 7 is a diagram of an exemplary structure of an audio frame in transmission data of MPEG-H 3D Audio. The audio frame includes a plurality of MPEG audio stream packets (mpeg Audio Stream Packet). Each MPEG audio stream packet includes a header (Header) and a payload (Payload).

The header has information such as a packet type (Packet Type), a packet label (Packet Label), and a packet length (Packet Length). In the payload, information defined by the packet type of the header is arranged. In the payload information, "SYNC" corresponding to a synchronous start code, "Frame" that is actual data of 3D audio transmission data, and "Config" indicating the configuration of "Frame" exist.

"Frame" includes channel encoded data and object encoded data included in the 3D audio transmission data. Here, the channel encoded data includes encoded sample data such as a Single Channel Element (SCE), a Channel Pair Element (CPE), and a Low Frequency Element (LFE). Furthermore, the object encoded data includes the encoded sample data of the Single Channel Element (SCE) and metadata for making a speaker located at an arbitrary position map the encoded sample data and performing rendering. The metadata is included as an extension element (Ext_element).

In the present embodiment, it is assumed that "Metadata" be specified by the packet type (Packet Type) similarly to "SYNC", "Config", "Frame", and the like, and in the packet, generic data (generic_data) having a divided portion of predetermined information is newly defined.

FIG. 8 illustrates a type of the packet identified by the value of the packet type (Packet Type). "FILLDATA" is defined as "zero", "MPEGH3DACFG" is defined as "one", "MPEGH3DAFRAME" is defined as "two, and "SYNC" is defined as "six", for example. In addition, for example, "METADATA" can be defined as "128".

A format of a packet of the metadata is arranged by using, for example, an entry of which an exemplary structure is illustrated in FIG. 9. Specifically, the generic data (generic_data) is arranged in a field of "itu_t_t135_payload_byte".

FIG. 10 illustrates an exemplary structure (syntax) of the generic data (generic_data), and FIG. 11 illustrates a content (semantics) of main information in the exemplary structure. A one-bit field of "start_flag" indicates whether the container target data (predetermined information=inserted data DT) is started, that is, the inserted divided portion includes a first byte of the container target data. A one-bit field of "end_flag" indicates whether the container target data is ended, that is, whether the inserted divided portion includes a final byte of the container target data.

A one-bit field of "joint_delivery_flag" indicates whether the divided container target data (divided portion) is inserted into the plurality of media encoded streams, that is, whether the divided portion is inserted to the other media encoded streams. A 13-bit field of "fcounter" indicates a division position of the divided container target data (inserted divided portion) by the number of counts in ascending order. Together with "start_flag" and "end_flag", the "fcounter" configures the sequential information of the divided portion. An eight-bit field of "data_id" indicates an ID of the container target data. An eight-bit field of "payload_length" indicates the size of the payload by the number of bytes.

When "start_flag" is "1" and indicates the start of the container target data, an eight-bit field of "data_type", an eight-bit field of "payload_identifier", and 16-bit field of "target_data_size" exist. The field of "data_type" indicates a type of the data. For example, "0x01" indicates that the data is used for network access. The field of "payload_identifier" indicates a kind of the container target data. For example, "0x01" indicates that the data is URL data, and "0x02" indicates that the data is a timestamp. The field of "target_data_size" indicates a size of the container target data. The field of "data_payload_byte" indicates an arrangement region of the container target data. In the arrangement region, the divided portion of the container target data is arranged.

FIG. 12 illustrates an exemplary structure (syntax) of time information (time_information) that is container target data in a case where "payload_identifier" is "0x02", and FIG. 13 illustrates a content (semantics) of main information in the exemplary structure.

A one-bit field of "absolute_time_flag" indicates whether an execution time is an UTC absolute time or a difference value from a reference time. The value "1" indicates that the execution time is the UTC absolute time. The value "0" indicates that the execution time is the difference value from the reference time.

When "absolute_time_flag" is "1", a 32-bit field of "exec_time_msw" and a 32-bit field of "exec_time_lsw" exist. The field "exec_time_msw" indicates upper 32 bits of the UTC absolute time that is the execution time of the data, and the field of "exec_time_lsw" indicates 32 bits lower than the field of "exec_time_msw".

When "absolute_time_flag" is "0", a 32-bit field of "reference_UTC_msw", a 32-bit field of "reference_UTC_lsw", a 32-bit field of "offset_exec_time_msw", and a 32-bit field of "offset_exec_time_lsw" exist. The field of "reference_UTC_msw" indicates upper 32 bits of the reference time, and the field of "reference_UTC_lsw" indicates lower 32 bits of the reference time. The field of "offset_exec_time_msw" indicates upper 32 bits of the difference value from the reference time that is the execution time of the data, and the field of "offset_exec_time_lsw" indicates 32 bits lower than the field of "offset_exec_time_msw".

Returning to FIG. 2, the multiplexer 116 multiplexes the video stream output from the video encoder 112 and the audio stream, into which each divided portion of the predetermined information (inserted data DT) is inserted, output from the inserter 115 by PES packetizing and transport packetizing them to obtain a transport stream TS as a multiplexed stream.

In addition, the multiplexer 114 inserts, for example, the identification information indicating that the predetermined information is inserted in correspondence with the audio stream to the transport stream TS. Specifically, a data container descriptor (data_container descriptor) is inserted into an audio elementary stream loop under a program map table (PMT).

FIG. 14 illustrates an exemplary structure (Syntax) of the data container descriptor. Furthermore, FIG. 15 illustrates a content (Semantics) of main information in the exemplary structure. An eight-bit field of "descriptor_tag" indicates a descriptor type. Here, in the field, the data container descriptor is indicated. An eight-bit field of "descriptor_length" indicates a length (size) of the descriptor and indicates the number of subsequent bytes as the length of the descriptor.

A one-bit field of "data_insertion_flag" indicates whether the predetermined information is inserted in the stream. The value "1" indicates that the predetermined information is inserted, and the value "0" indicates that the predetermined information is not inserted. A one-bit field of "joint_stream_delivery_flag" indicates whether the content target data (predetermined information) is inserted into the other streams in addition to the above stream. The value "1" indicates that the data is inserted into the other streams, and the value "0" indicates that the data is not inserted into the other streams.

A six-bit field of "media_stream_id" indicates an identification number of the stream. When "joint_stream_delivery_flag" is "1", an eight-bit field of "number_of_joint_streams" exists. This field indicates the number (one or more) of the other streams into which the content target data (predetermined information) is inserted. Eight-bit fields of "media_stream_id", eight-bit fields of "data_bitrate", and eight-bit fields of "data_insertion_ratio" as many as the number of the other streams exist. The field of "media_stream_id" indicates an identification number of the stream. In the field of "data_bitrate", a bit rate after data insertion (target bit rate) is indicated by a value in unit of 1000 bps. The field of "data_insertion_ratio" indicates a ratio (Ratio) of a bit rate of the inserted data (AVR:inserted_data_bitrate) with the bit rate of the media encoded stream (CR:compressed media_data_bitrate) as a reference. In this case, the ratio is calculated as indicated by the following formula.

$$Ratio = inserted\_data\_bitrate / compressed\_media\_data\_bitrate$$

An operation of the stream generation unit 110A illustrated in FIG. 2 will be briefly described. The video data SV is supplied to the video encoder 112. The video encoder 112 performs encoding such as H.264/AVC and H.265/HEVC to the video data SV and generates a video stream including encoded video data.

Furthermore, the audio data SA is supplied to the audio encoder 113. The audio encoder 113 encodes the audio data SA with an MPEG-H 3D Audio compression format and generates an audio stream R_EM1.

Furthermore, the inserted data DT as the predetermined information is supplied to the splitter 114. In this splitter 114, the inserted data DT is divided to obtain a predetermined number of divided portions f(i). In this case, the inserted data DT is divided so that a bit rate of the inserted data DT falls within the allowable bit rate AVR. The allowable bit rate AVR is calculated by subtracting the bit rate CR of the audio stream R_EM1 from the target bit rate TR specified from the CPU 111.

The audio stream R_EM1 obtained by the audio encoder 113 is supplied to the inserter 115, and the predetermined number of divided portions f(i) of the inserted data DT obtained by the splitter 114 are supplied to the inserter 115. The inserter 115 sequentially inserts the predetermined number of divided portions f(i) of the inserted data DT into a predetermined number of audio frames of the audio stream as adding sequential information for reconstruction.

The video stream generated by the video encoder 112 is supplied to the multiplexer 116. Furthermore, the audio stream into which the inserted data DT is inserted by the inserter 115 is supplied to the multiplexer 116. The multiplexer 116 packetizes and multiplexes each stream to obtain the transport stream TS as transmission data.

Furthermore, the descriptor 116 inserts the data container descriptor (refer to FIG. 14) into the audio elementary stream loop under the program map table (PMT). The descriptor includes the identification information indicating that the predetermined information (inserted data DT) is inserted into the corresponding audio stream and the like.

Figure 16:
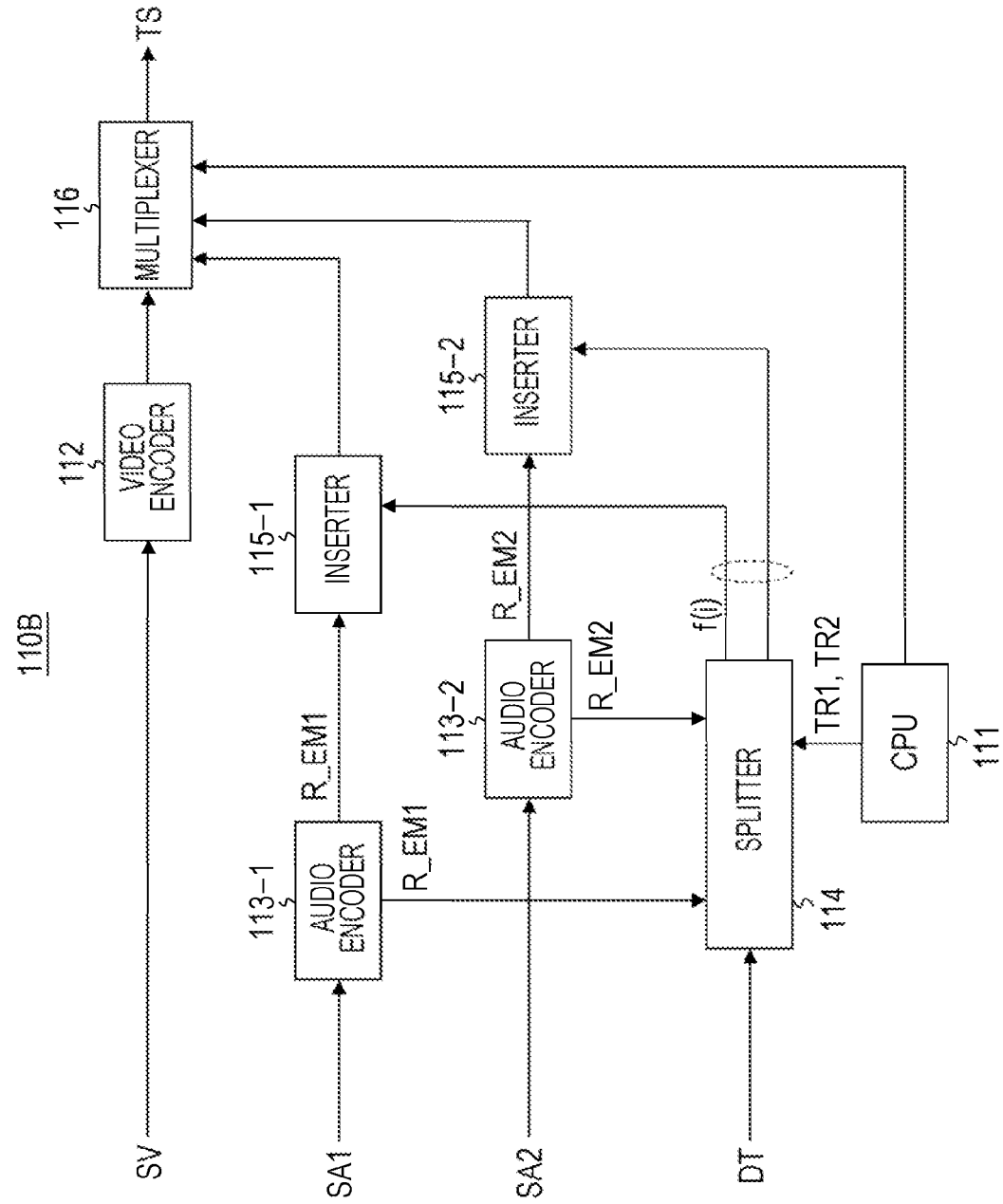
FIG. 16 is a block diagram of another exemplary configuration of the stream generation unit included in the broadcast transmission device.

In FIG. 16, an exemplary configuration of a stream generation unit 110B included in the broadcast transmission device 100 is illustrated. In the stream generation unit 110B, two audio streams are generated, and each divided portion obtained by dividing the predetermined information (inserted data) is inserted into each of the predetermined number of audio frames. In FIG. 16, components corresponding to those in FIG. 2 are denoted with the same reference numerals.

The stream generation unit 110B includes a CPU 111, a video encoder 112, audio encoders 113-1 and 113-2, a splitter 114, inserters 115-1 and 115-2, and a multiplexer 116. Note that the splitter 114 and the inserters 115-1 and 115-2 may be included as a part of the audio encoders 113-1 and 113-2 or the CPU 111.

The CPU 111 controls each unit of the stream generation unit 110B. The video encoder 112 performs encoding such as MPEG2, H.264/AVC, and H.265/HEVC on video data SV to generate a video stream (video elementary stream). The video data SV is, for example, video data reproduced from a recording medium such as a hard disk drive (HDD), live video data obtained by a video camera, or the like.

The audio encoders 113-1 and 113-2 respectively encode the audio data SA1 and SA2 with an MPEG-H 3D Audio compression format to generate audio streams (audio elementary stream). Various combinations of the audio data SA1 and SA2 are considered.

For example, the audio data SA1 is channel data, and the audio data SA2 is object data. Furthermore, for example, the audio data SA1 is stereo data, and the audio data SA2 is data of other channels. The audio data SA1 and SA2 corresponds to the video data SV and is audio data reproduced from a recording medium such as an HDD, live audio data obtained by a microphone, or the like.

Although detailed description of the splitter 114 is omitted, similarly to the splitter 114 of the stream generation unit 100A in FIG. 2, the inserted data DT including the predetermined information is divided, and the predetermined number of divided portions f(i) are obtained. In this case, the inserted data DT is divided by the method of (1) or (2) so that the bit rate of the inserted data DT to be inserted into each audio stream falls within the allowable bit rate.

Although detailed description of the inserters 115-1 and 115-2 is omitted, similarly to the inserter 115 in the stream generation unit 100A in FIG. 2, the predetermined number of divided portions f(i) obtained by dividing the inserted data DT by the splitter 114 are sequentially inserted into the predetermined number of audio frames R_EM1 and R_EM2 respectively generated by the audio encoders 113-1 and 113-2 as adding the sequential information for reconstruction.

Figure 17:
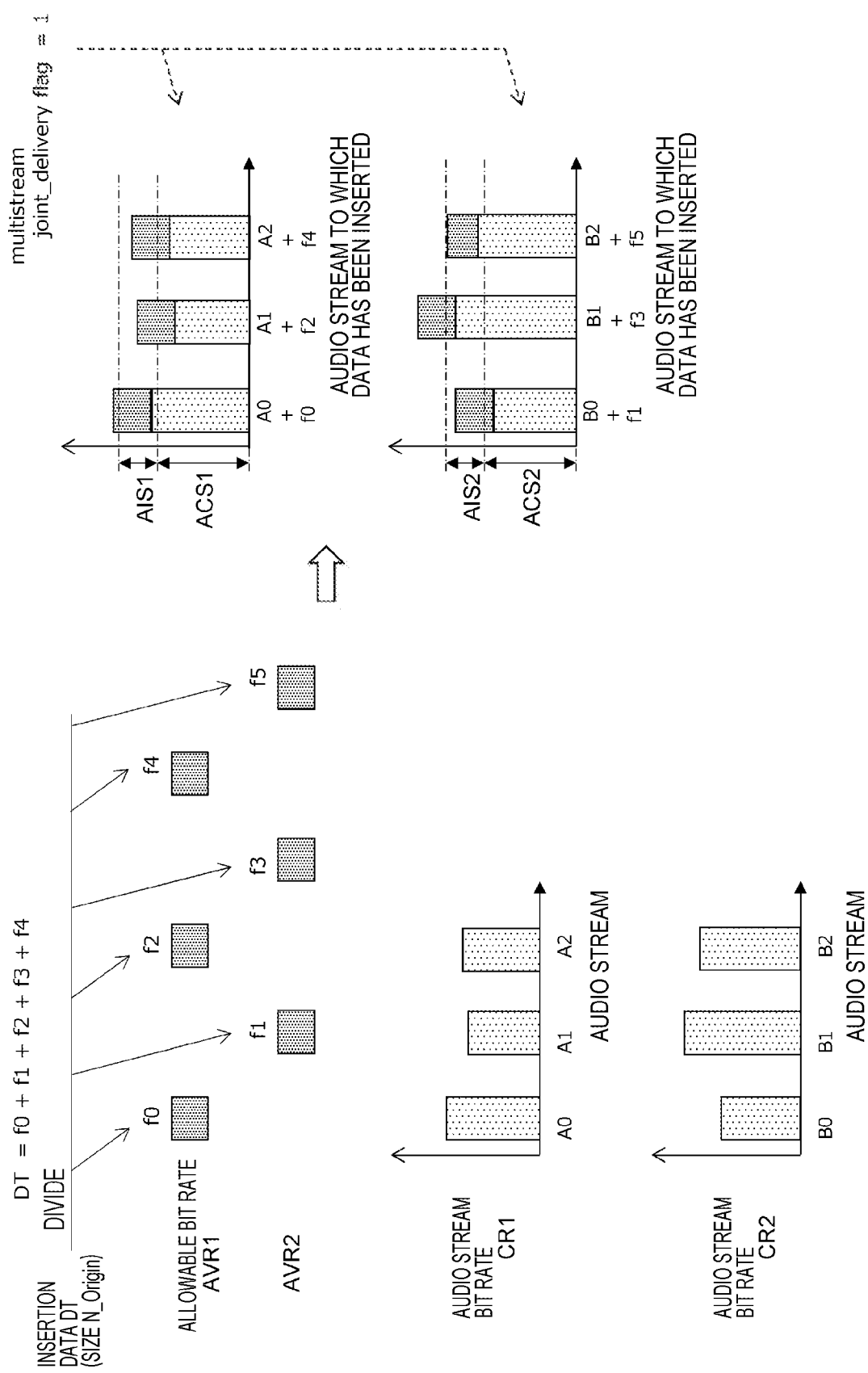
FIG. 17 is a diagram of an example of division of inserted data DT and an example of transition of the sizes of respective audio frames in a case where divided portions f(i) are inserted into the corresponding audio frames of two audio streams.

FIG. 17 is a diagram of an example of division of the inserted data DT in a case of the division by the method in (1) and an example of transition of the size of each audio frame in a case where the divided portions f(i) are respectively inserted into the corresponding audio frames of two audio streams. In the illustrated example, the inserted data DT is divided into six divided portions, i.e., f0, f1, f2, f3, f4, and f5.

Then, the three divided portions f0, f2, and f4 are respectively inserted into the audio frames A0, A1, and A2 of the audio stream R_EM1 generated by the audio encoder 113-1. Furthermore, the three divided portions f1, f3, and f5 are respectively inserted into the audio frames B0, B1, and B2 of the audio stream R_EM2 generated by the audio encoder 113-2.

Here, the splitter 114 calculates an allowable bit rate AVR1 by subtracting a bit rate CR1 of the audio stream R_EM1 from a target bit rate TR1 specified by the CPU 111. Then, the splitter 114 divides the allowable bit rate AVR1 by the number of audio frames AU_frec generated in one second and determines a fixed size AIS1, that is, the sizes of f0, f2, and f4. In this case, a change in the data size of each audio frame before insertion is reflected to the data size of each inserted audio frame.

Furthermore, the splitter 114 calculates an allowable bit rate AVR2 by subtracting a bit rate CR2 of the audio stream R_EM2 from a target bit rate TR2 specified by the CPU 111. Then, the splitter 114 divides the allowable bit rate AVR2 by the number of audio frames AU_frec generated in one second and determines a fixed size AIS2, that is, the sizes of f0, f2, and f4. In this case, a change in the data size of each audio frame before insertion is reflected to the data size of each inserted audio frame.

Figure 18:
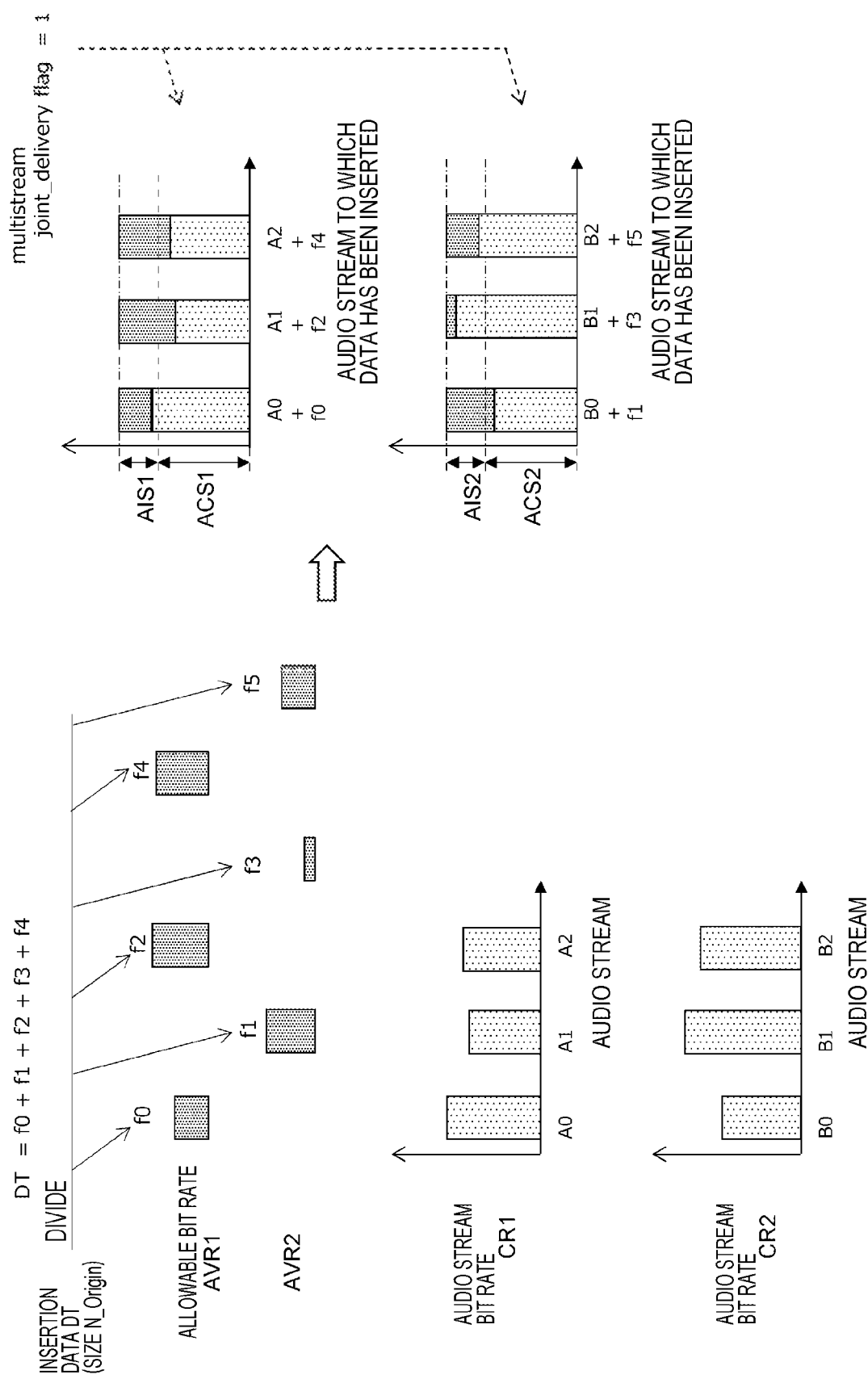
FIG. 18 is a diagram of an example of division of inserted data DT and an example of transition of the sizes of respective audio frames in a case where divided portions f(i) are inserted into the corresponding audio frames of two audio streams.

FIG. 18 is a diagram of an example of division of the inserted data DT in a case of the division by the method in (2) and an example of transition of the size of each audio frame in a case where the divided portions f(i) are respectively inserted into the corresponding audio frames of two audio streams. In the illustrated example, the inserted data DT is divided into six divided portions, i.e., f0, f1, f2, f3, f4, and f5.

Then, the three divided portions f0, f2, and f4 are respectively inserted into the audio frames A0, A1, and A2 of the audio stream R_EM1 generated by the audio encoder 113-1. Furthermore, the three divided portions f1, f3, and f5 are respectively inserted into the audio frames B0, B1, and B2 of the audio stream R_EM2 generated by the audio encoder 113-2.

Here, the splitter 114 calculates an allowable bit rate AVR1 by subtracting a bit rate CR1 of the audio stream R_EM1 from a target bit rate TR1 specified by the CPU 111. Then, the splitter 114 calculates the first size AIS1 by dividing the allowable bit rate AVR1 by the number of audio frames AU_frec generated in one second. Furthermore, the splitter 114 calculates the second size ACS1 by dividing the bit rate CR1 of the audio stream R_EM1 by the number of audio frames AU_frec generated in one second.

The splitter 114 obtains a fixed size (AIS1+ACS1) by adding the first size AIS1 to the second size ACS1 and determines the sizes of f0, f2, and f4 by subtracting the data size of the audio frame that is an insertion destination from the fixed size. In this case, the data size of each audio frame to which the data has been inserted does not depend on the change in the data size of each audio frame before insertion and is constant except for an audio frame into which the final divided portion of the inserted data DT is inserted.

Furthermore, the splitter 114 calculates an allowable bit rate AVR2 by subtracting a bit rate CR2 of the audio stream R_EM2 from a target bit rate TR2 specified by the CPU 111.

Then, the splitter 114 calculates a first size AIS2 by dividing the allowable bit rate AVR2 by the number of audio frames AU_frec generated in one second. Furthermore, the splitter 114 calculates a second size ACS2 by dividing the bit rate CR2 of the audio stream R_EM2 by the number of audio frames AU_frec generated in one second.

The splitter 114 obtains a fixed size (AIS2+ACS2) by adding the first size AIS2 to the second size ACS2 and determines the sizes of f1, f3, and f5 by subtracting the data size of the audio frame that is an insertion destination from the fixed size. In this case, the data size of each audio frame to which the data has been inserted does not depend on the change in the data size of each audio frame before insertion and is constant except for an audio frame into which the final divided portion of the inserted data DT is inserted.

Furthermore, the values AIS1, ACS1, AIS2, and ACS2 are respectively calculated by the following formulas (4) to (7).

$$AIS1 = AVR1/8/AU\_frec \quad (4)$$

$$ACS1 = CR1/8/AU\_frec \quad (5)$$

$$AIS2 = AVR2/8/AU\_frec \quad (6)$$

$$ACS2 = CR1/8/AU\_frec \quad (7)$$

Returning to FIG. 16, the multiplexer 116 multiplexes the video stream output from the video encoder 112 and the two audio streams, into which the divided portions of the predetermined information (inserted data DT) are inserted, respectively output from the inserters 115-1 and 115-2 by PES packetizing and transport packetizing them to obtain a transport stream TS as a multiplexed stream.

In addition, the multiplexer 116 inserts, for example, the identification information indicating that the predetermined information is inserted in correspondence with two audio streams to the transport stream TS. Specifically, the data container descriptor (refer to FIG. 14) is inserted into each of two audio elementary stream loops under the program map table (PMT).

An operation of the stream generation unit 110B illustrated in FIG. 16 will be briefly described. The video data SV is supplied to the video encoder 112. The video encoder 112 performs encoding such as H.264/AVC and H.265/HEVC to the video data SV and generates a video stream including encoded video data.

Furthermore, the audio data SA1 and the audio data SA2 are respectively supplied to the audio encoders 113-1 and 113-2. The audio encoders 113-1 and 113-2 encode the audio data SA1 and the audio data SA2 with an MPEG-H 3D Audio compression format and respectively generate audio streams R_EM1 and R_EM2.

Furthermore, the inserted data DT as the predetermined information is supplied to the splitter 114. In this splitter 114, the inserted data DT is divided to obtain a predetermined number of divided portions f(i). In this case, the inserted data DT is divided so that the bit rate of the inserted data DT falls within the allowable bit rates AVR1 and AVR2 of the two respective audio streams R_EM1 and R_EM2. The allowable bit rates AVR1 and AVR2 are respectively calculated by subtracting the bit rates CR1 and CR2 of the audio streams R_EM1 and R_EM2 from the target bit rates TR1 and TR2 specified by the CPU 111.

The audio streams R_EM1 and R_EM2 obtained by the audio encoders 113-1 and 113-2 are respectively supplied to the inserters 115-1 and 115-2, and in addition, the predetermined number of divided portions f(i) of the inserted data DT obtained by the splitter 114 are supplied to the inserters 115-1 and 115-2. The inserters 115-1 and 115-2 sequentially insert the predetermined number of divided portions f(i) of the inserted data DT into the predetermined number of audio frames of the audio streams R_EM1 and R_EM2 as adding the sequential information for reconstruction.

The video stream generated by the video encoder 112 is supplied to the multiplexer 116. Furthermore, the audio stream into which the inserted data DT is inserted by each of the inserters 115-1 and 115-2 is supplied to the multiplexer 116. The multiplexer 116 packetizes and multiplexes each stream to obtain the transport stream TS as transmission data.

In addition, the descriptor 116 inserts the data container descriptor (refer to FIG. 14) into each of the two audio elementary stream loops corresponding to the two audio streams under the program map table (PMT). The descriptor includes the identification information indicating whether predetermined information (inserted data DT) is inserted into the corresponding audio stream, the identification information indicating whether the predetermined information (inserted data DT) is inserted into the other streams in addition to the stream, and the like.

[Insertion of Container Target Data (Predetermined Information)]

Figure 19:
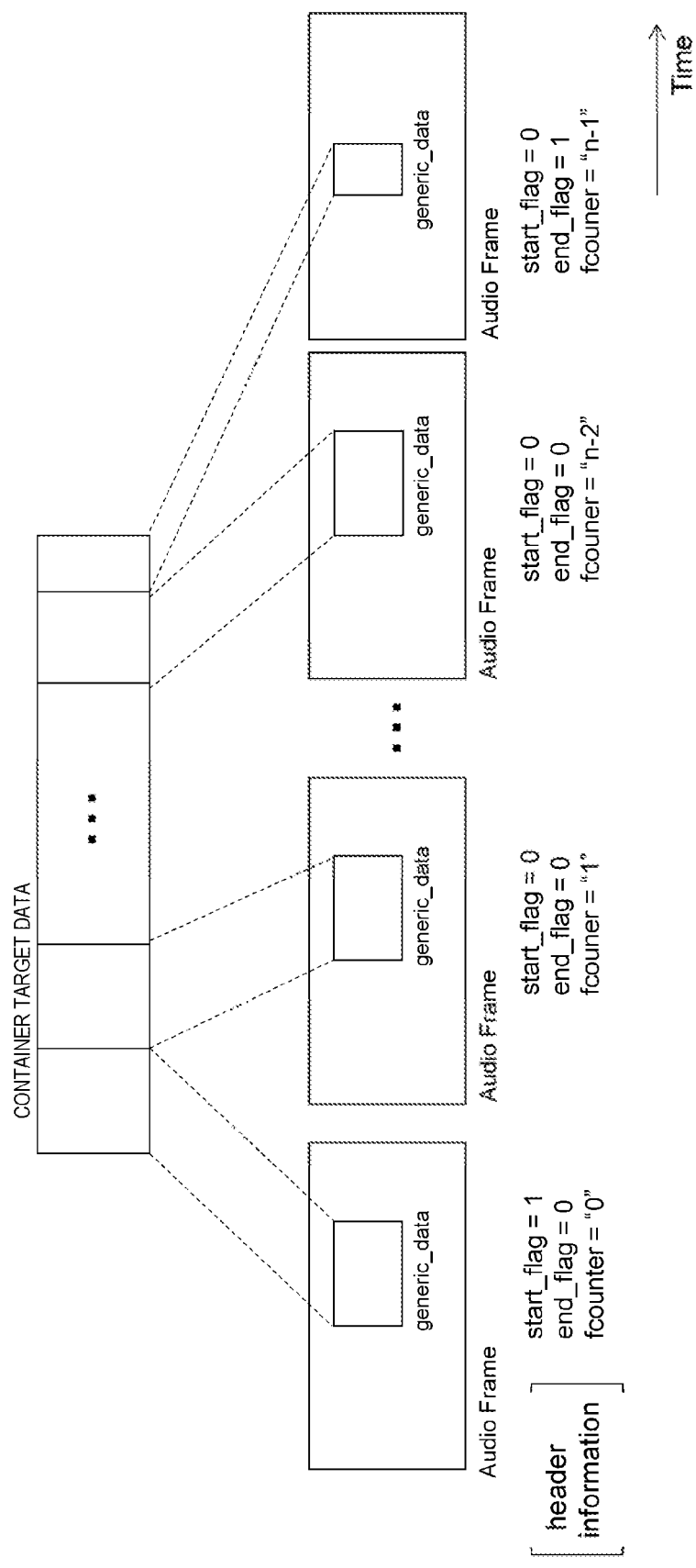
FIG. 19 is a diagram of an example of a case where container target data is transmitted with a plurality of pieces of generic data (generic_data).

The insertion of the container target data (predetermined information=inserted data DT) into the audio stream will be further described. FIG. 19 illustrates an example of a case where the container target data is transmitted with a plurality of pieces of generic data (generic_data) (refer to FIG. 10).

In this case, the container target data is divided into a plurality of pieces, and each of the plurality of divided portions is allocated to the plurality of pieces of generic data and inserted into the field of "data_payload_byte". Here, "start_flag" corresponding to the first divided portion is set to "1", which indicates the first divided portion. Furthermore, "fcounter" corresponding to the first divided portion is set to "0". Furthermore, in correspondence with the first divided portion, the field of "target_data_size" exists and indicates the overall size of the container target data.

The field of "start_flag" corresponding to the second and subsequent divided portions is set to "0", which indicates that the divided portion is not the first divided portion. The field of "fcounter" corresponding to the second and subsequent divided portions is set to the number of counts that is sequentially incremented. When the number of divided portions is n, "fcounter" corresponding to the final divided portion is "n−1". The field of "end_flag" corresponding to the final divided portion is set to "1", which indicates that the divided portion is the final divided portion.

Figure 20:
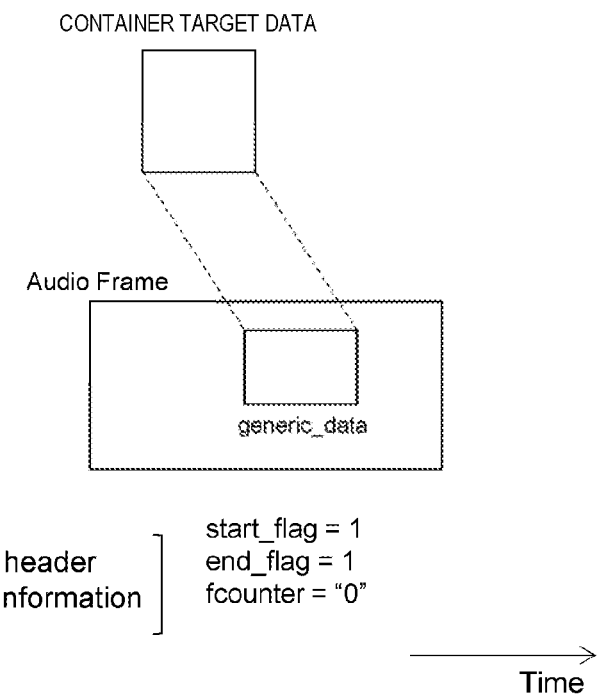
FIG. 20 is a diagram of an example of a case where the container target data is transmitted with a single piece of generic data (generic_data).

FIG. 20 illustrates an example of a case where the container target data is transmitted with a single piece of generic data (generic_data). In this case, the container target data is not divided and is inserted into the field of "data_payload_byte" of the single piece of generic data. Here, "start_flag" is set to "1", which indicates the first divided portion. Furthermore, "end_flag" is set to "1", which indicates the final divided portion. Therefore, these information indicates that the container target data is not divided. Furthermore, in correspondence with the divided portion, the field of "target_data_size" exists and indicates the overall size of the container target data.

Figure 21:
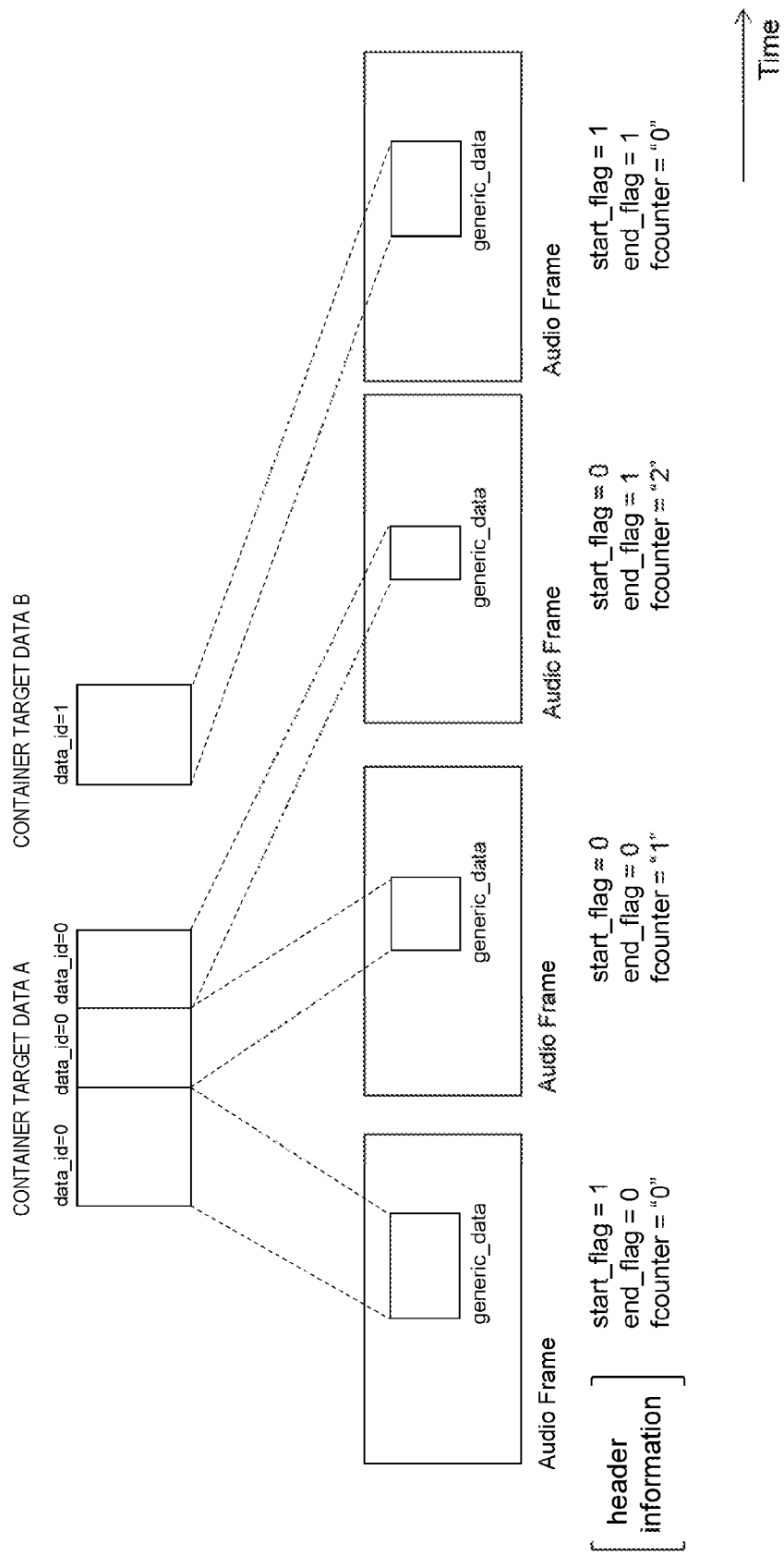
FIG. 21 is a diagram of an example of a case where a plurality of pieces of container target data is transmitted with a plurality of pieces of generic data (generic_data).

FIG. 21 illustrates an example of a case where a plurality of pieces of container target data is transmitted with a plurality of pieces of generic data (generic_data). The illustrated example indicates an example of a case where two pieces of container target data including container target data A indicated by "0" in "data_id" and container target data B indicated by "1" in "data_id" is transmitted.

In this case, the container target data A is divided into three divided portions, and the three divided portions are respectively allocated to three pieces of generic data and inserted into the fields of "data_payload_byte". Here, "start_flag" corresponding to the first divided portion is set to "1", which indicates the first divided portion. Furthermore, "fcounter" corresponding to the first divided portion is set to "0". Furthermore, in correspondence with the first divided portion, the field of "target_data_size" exists and indicates the overall size of the container target data.

The field of "start_flag" corresponding to the second divided portion is set to "0", which indicates that the divided portion is not the first divided portion. Furthermore, the field of "end_flag" corresponding to the second divided portion is set to "0", which indicates that the divided portion is not the final divided portion. Furthermore, the field of "fcounter" corresponding to the second divided portion is set to "1". Furthermore, the field of "end_flag" corresponding to the third divided portion is set to "1", which indicates that the divided portion is the final divided portion. Furthermore, the field of "fcounter" corresponding to the final divided portion is set to "2".

Furthermore, the container target data B is not divided and is inserted into the field of "data_payload_byte" of the single piece of generic data. Here, "start_flag" is set to "1", which indicates the first divided portion. Furthermore, "end_flag" is set to "1", which indicates the final divided portion. Therefore, these information indicates that the container target data is not divided. Furthermore, in correspondence with the divided portion, the field of "target_data_size" exists and indicates the overall size of the container target data.

[Synchronization Management of Container Target Data (Predetermined Information)]

Figure 22:
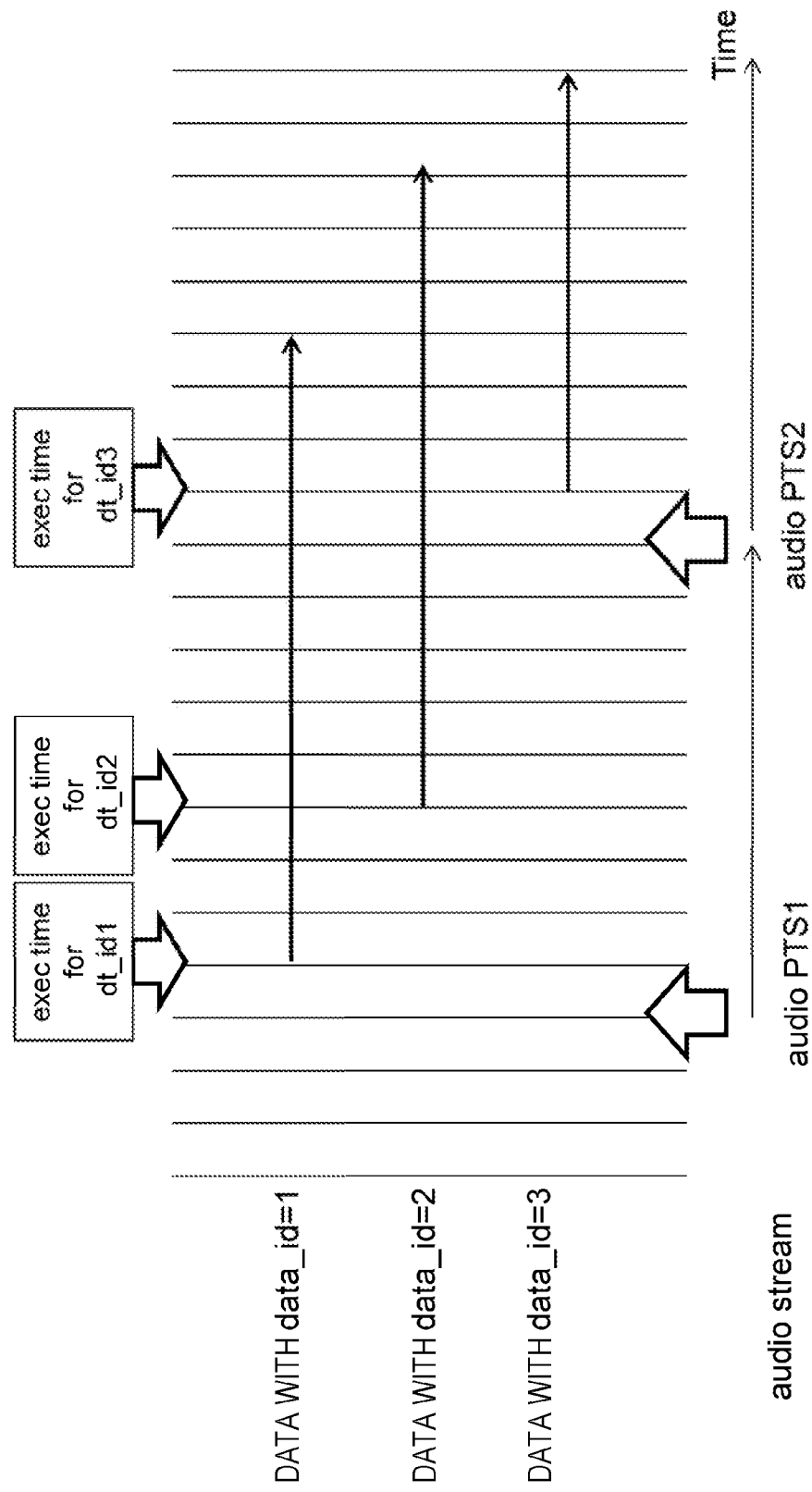
FIG. 22 is a diagram of an example in which execution of the plurality of pieces of container target data is managed independently from an audio PTS on the basis of time information added to the container target data.

Synchronization management of the container target data (predetermined information) will be described. FIG. 22 illustrates an example in which execution of the plurality of pieces of container target data is managed independently from an audio PTS on the basis of time information added to the container target data.

In this example, execution of container target data in which "data_id" is "1" is started at a timing of an execution time (exec_time) corresponding to "1", execution of container target data in which "data_id" is "2" is started at a timing of an execution time corresponding to "2", and in addition, execution of container target data in which "data_id" is "3" is started at a timing of an execution time corresponding to "3".

Figure 23:
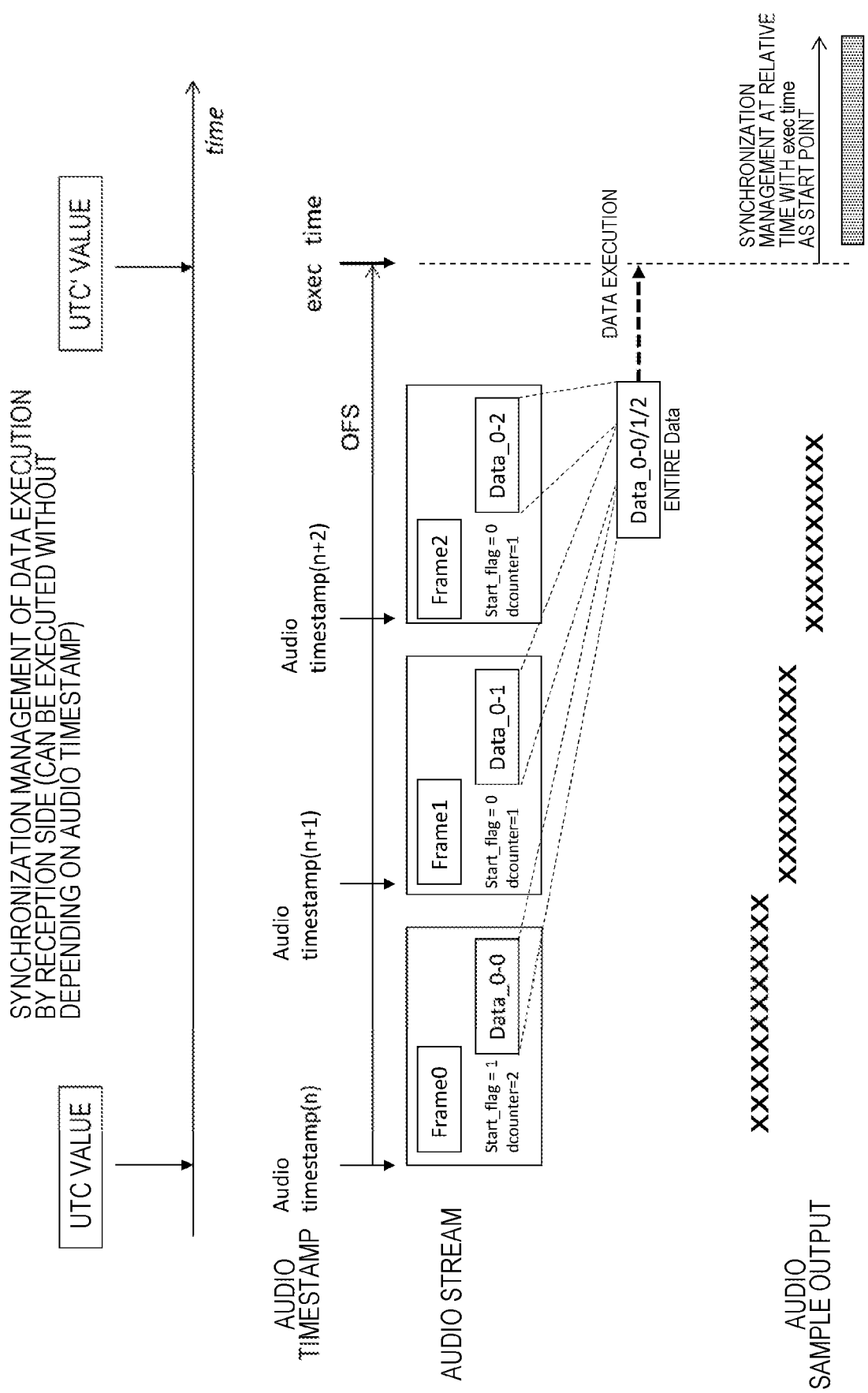
FIG. 23 is a diagram illustrating that container target data (predetermined information) is executed by a reception side without depending on an audio timestamp.

FIG. 23 illustrates that the container target data (predetermined information) is executed by a reception side without depending on an audio timestamp. In this example, the container target data is divided into three (Data_0-0, Data_0-1, and Data_0-2), and the three portions are allocated and inserted into three audio frames.

Furthermore, this example indicates a case where the execution time of the container target data is applied by a difference value OFS from the reference time and the reference time coincides with "Audio timestamp(n)". "Audio timestamp(n)" indicates the timing at which an output of audio data (audio sample) obtained by decoding an audio frame 0 (Frame 0) is started. "Audio timestamp (n)" corresponds to the "UTC value".

Execution of the container target data that is divided and inserted into three audio frames and is transmitted is started at the execution time (exec time) that is a time obtained by adding the difference value OFS to the reference time. That is, the container target data is executed without depending on the audio timestamp.

Here, in a case where the container target data includes a relative timestamp, synchronization management with a relative time having the execution time as a base point is performed. For example, in a case where the container target data is a media file such as MP3 having no concept of time, reproduction of the container target data is immediately started from the execution time. Furthermore, for example, in a case where the container target is a media file such as MP4 having a relative timestamp, the reproduction is synchronously managed with the execution time as a base point.

Note that, in the example in FIG. 23, a case where the execution time of the container target data is applied by the difference value OFS from the reference time. However, the example similarly applies to a case where the execution time of the container target data is applied by the UTC absolute time "UTC' value" indicating the execution time (exec time). That is, as the time information indicating the execution time to be applied to the container target data, the UTC absolute time or the difference value from the reference time is considered as described above.

Figure 24:
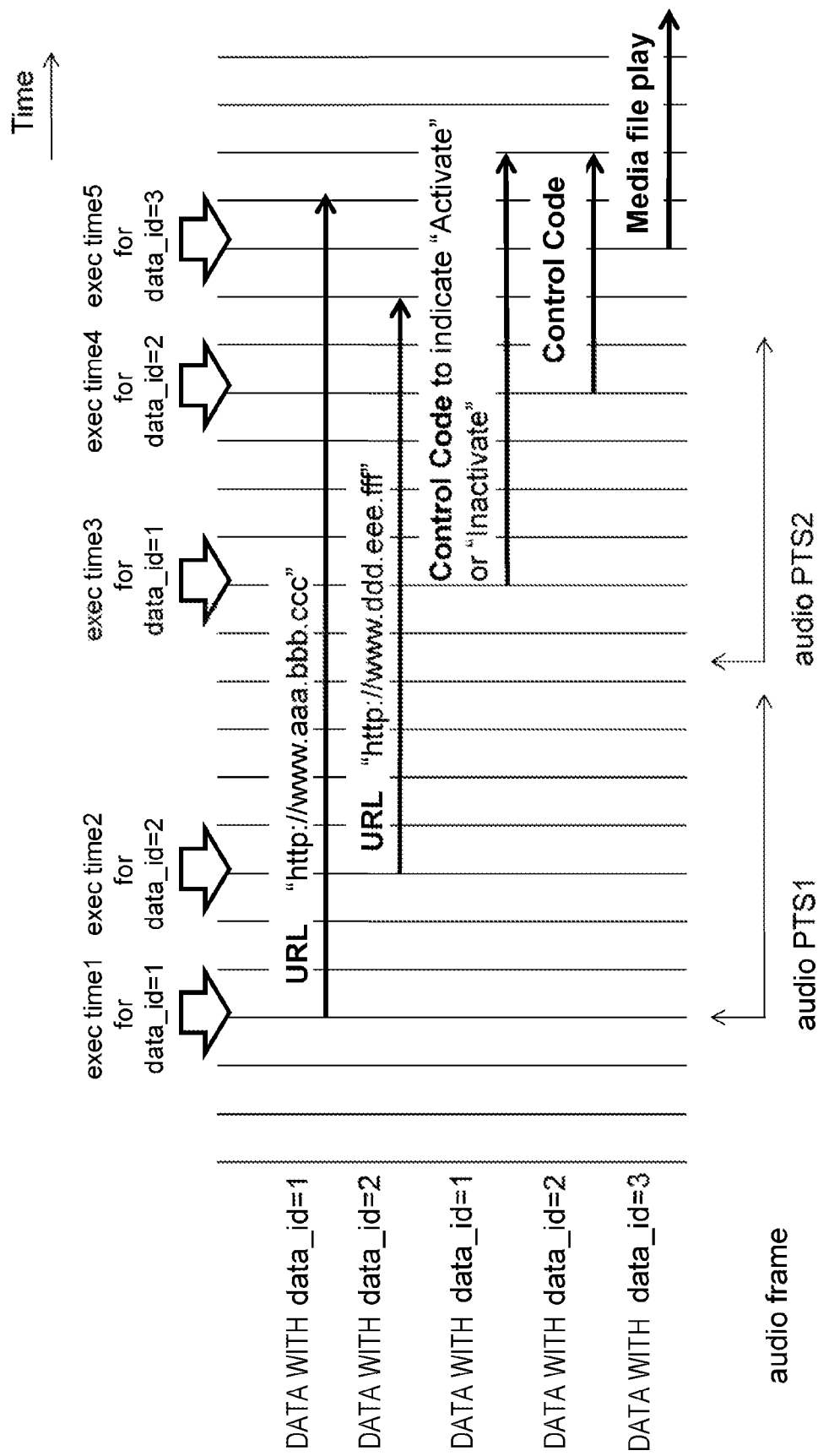
FIG. 24 is a diagram of a specific example in which the plurality of pieces of container target data is synchronously managed on the basis of the time information added to the container target data.

FIG. 24 illustrates a specific example in which the plurality of pieces of container target data is synchronously managed on the basis of the time information added to the container target data. In this example, as the container target data in which "data_id" is "1", URL information to be connected to a link server and a control code group for performing control such as "Activate" or "Inactivate" on link servers are transmitted.

In this case, the connection to the link server is performed with the URL at the execution time "exec time1", and after that, the control such as "Activate" or "Inactivate" on the link server is performed with the control code group from the execution time "exec time3", and the link server starts or ends media reproduction, for example.

Furthermore, in this example, as the container target data in which "data_id" is "2", the URL information to be connected to the link server and the control code group for performing the control such as "Activate" or "Inactivate" on the link servers are transmitted.

In this case, the connection to the link server is performed with the URL at the execution time "exec time2", and after that, the control such as "Activate" or "Inactivate" on the link server is performed with the control code group from the execution time "exec time4", and the link server starts or ends media reproduction, for example.

Furthermore, in this example, the media file is transmitted as the container target data in which "data_id" is "3". From an execution time of "exec time5", the reproduction of the media file is started.

[Exemplary Structure of Transport Stream TS]

Figure 25:
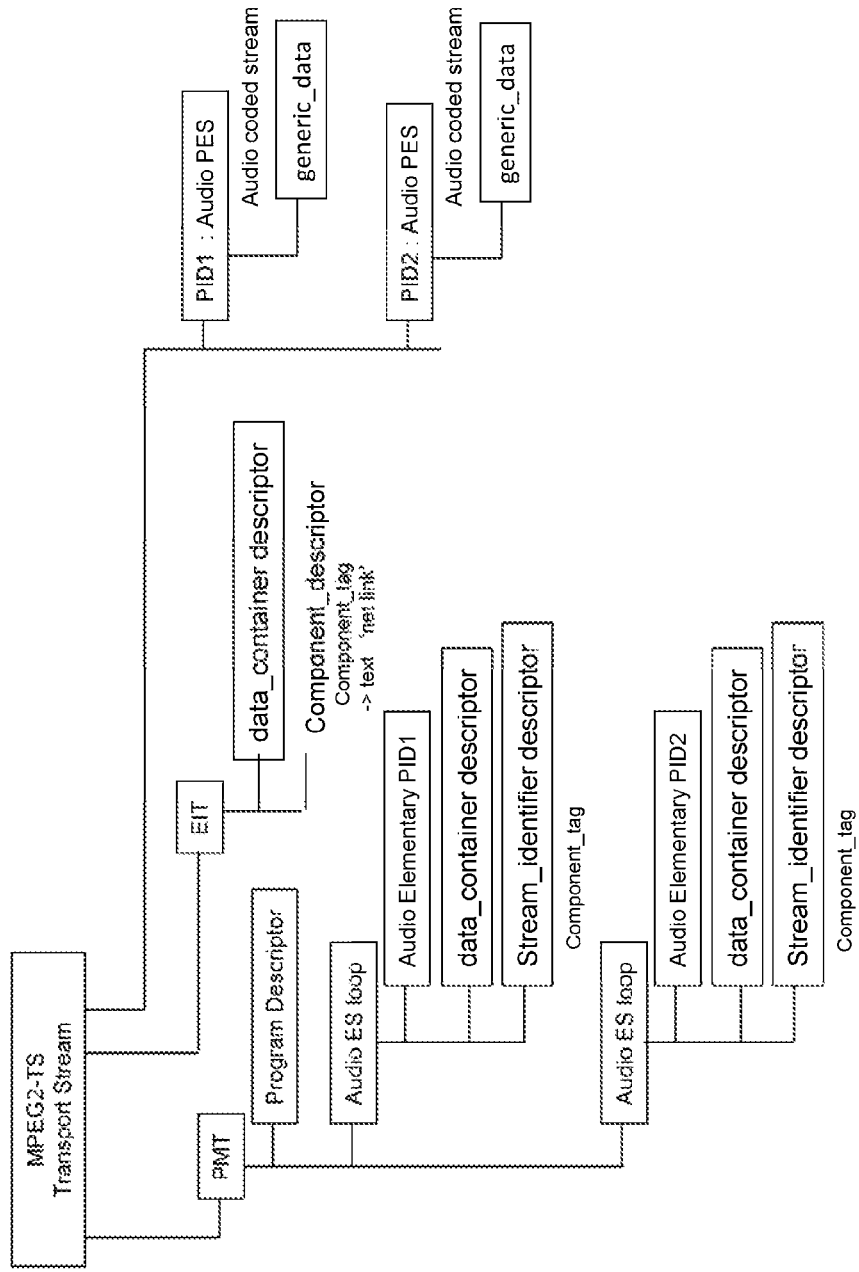
FIG. 25 is a diagram of an exemplary structure of a transport stream TS.

FIG. 25 illustrates an exemplary structure of the transport stream TS. The exemplary structure is an example in a case where two audio streams exist and the two audio streams contain the predetermined information (refer to FIG. 16). In the exemplary structure, a part regarding the video stream is omitted.

In the exemplary structure, a PES packet "Audio PES" of an audio stream identified by PID1 exists, and a PES packet "Audio PES" of an audio stream identified by PID2 exists. An audio stream (Audio coded stream) is inserted into each PES packet. Generic data (generic_data) (refer to FIG. 10) including each divided portion of the predetermined information is inserted into each of the predetermined number (including one) of audio frames of the audio stream.

In addition, the transport stream TS includes a Program Map Table (PMT) as Program Specific Information (PSI). The PSI is information describing a program to which each elementary stream included in the transport stream belongs. In the PMT, there is a program loop (Program loop) describing information related to the entire program.

Furthermore, in the PMT, there is an elementary stream loop having information related to each elementary stream. In the exemplary structure, audio elementary stream loops (Audio ES loop) exist in correspondence with the two audio streams.

In each audio elementary stream loop (Audio ES loop), information such as a packet identifier (PID) is arranged in correspondence with each stream, and a descriptor in which information related to the stream is written is arranged. As one of the descriptors, the data container descriptor (data_container descriptor) (refer to FIG. 14) described above is arranged.

Furthermore, in the audio elementary stream loop, a stream identifier descriptor (Stream_identifier descriptor) having information of "Component_tag" is arranged as one of the descriptors. Furthermore, a component descriptor (Component_descriptor) is arranged under an Event Information Table (EIT). The data container descriptor (data_container descriptor) described above may be arranged in the EIT. That case means that identification information is provided when insertion of metadata is described on a display of a receiver EPG.

The component descriptor is associated with the audio elementary stream loop under the PMT with "Component_tag". With this association, it can be found that the predetermined information, for example, internet access information is inserted into an audio stream of a certain program, and it is possible to notify a TV viewer that the program is capable of accessing the internet by a display such as "net link" in a portion of the certain program at the time of displaying the program guide such as EPG.

[Exemplary Configuration of Set Top Box]

Figure 26:
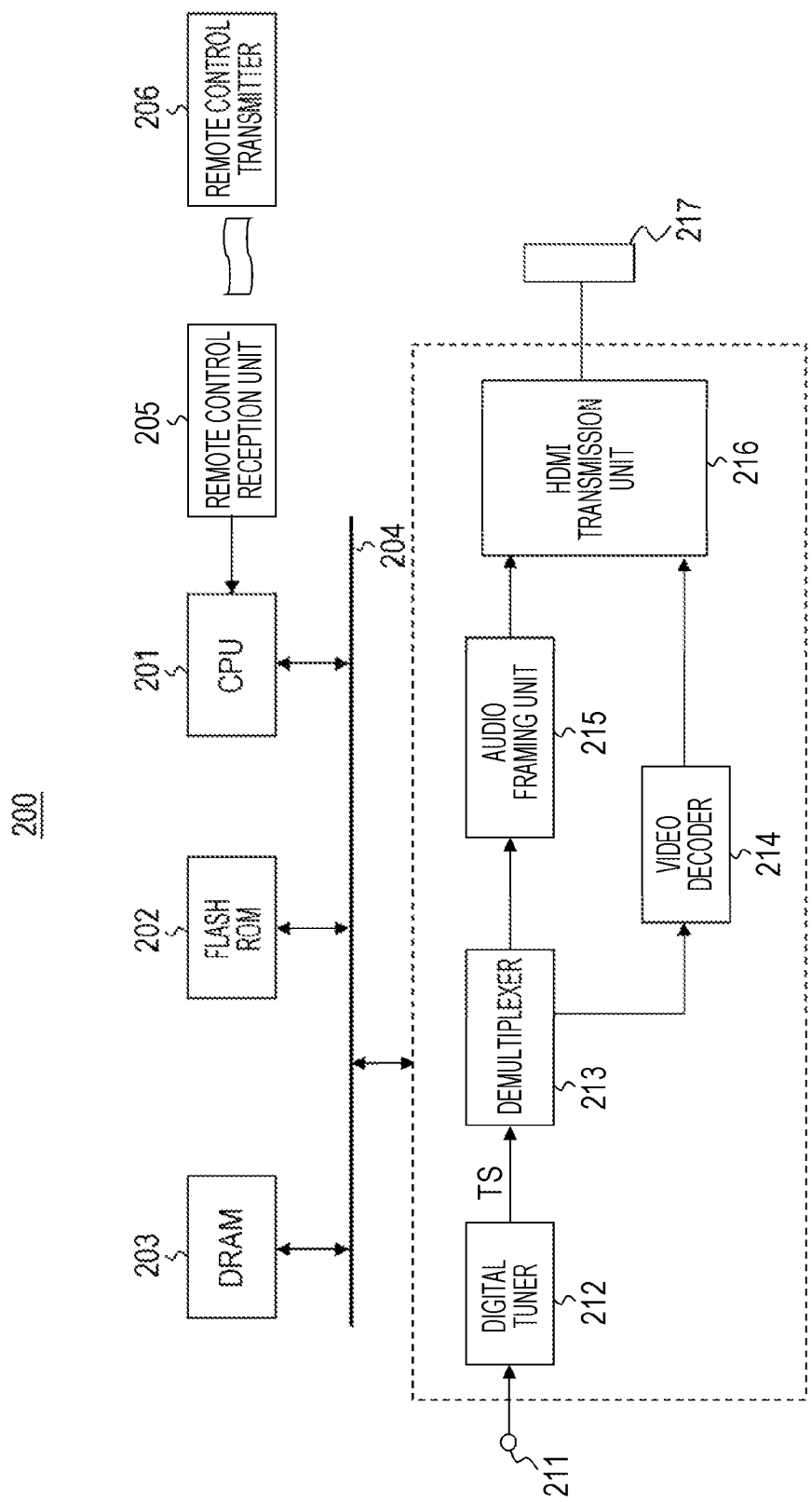
FIG. 26 is a block diagram of an exemplary configuration of a set top box.

FIG. 26 illustrates an exemplary configuration of the set top box 200. The set top box 200 includes a CPU 201, a flash ROM 202, a DRAM 203, an internal bus 204, a remote control reception unit 205, and a remote control transmitter 206. In addition, the set top box 200 includes an antenna terminal 211, a digital tuner 212, a demultiplexer 213, a video decoder 214, an audio framing unit 215, an HDMI transmission unit 216, and an HDMI terminal 217.

The CPU 201 controls an operation of each unit of the set top box 200. The flash ROM 202 contains control software and stores data. The DRAM 203 configures a work area of the CPU 201. The CPU 201 develops the software and the data read from the flash ROM 202 on the DRAM 203, activates the software, and controls each unit of the set top box 200.

The remote control reception unit 205 receives a remote control signal (remote control code) transmitted from the remote control transmitter 206 and supplies the signal to the CPU 201. The CPU 201 controls each unit of the set top box 200 on the basis of the remote control code. The CPU 201, the flash ROM 202, and the DRAM 203 are connected to the internal bus 204.

The antenna terminal 211 receives a television broadcast signal received by a reception antenna (not shown). The digital tuner 212 processes the television broadcast signal input to the antenna terminal 211 and outputs a transport stream TS corresponding to a user's selection channel.

The demultiplexer 213 extracts a packet of a video stream from the transport stream TS and transmits the packet to the video decoder 214. The video decoder 214 reconstructs a video stream from the packet of the video extracted by the demultiplexer 213 and performs decoding processing to obtain uncompressed video data (image data).

Furthermore, the demultiplexer 213 extracts packets of one or two audio streams of the transport stream TS and reconstructs the audio stream. The audio framing unit 215 performs framing on the reconstructed audio stream. As described about the stream generation units 110A and 110B (refer to FIGS. 2 and 16), the predetermined information (container target data=inserted data DT) is inserted into the audio stream.

Furthermore, the demultiplexer 213 extracts various information such as descriptor information from the transport stream TS and transmits the extracted information to the CPU 201. The various information includes information regarding the data container descriptor (data_container descriptor) (refer to FIG. 14).

The CPU 201 recognizes from the data container descriptor that the predetermined information is inserted into the corresponding audio stream. Furthermore, the CPU 201 recognizes from the data container descriptor that the predetermined information is inserted to the other streams in addition to the corresponding audio stream. For example, in a case where the number of audio streams is one and the predetermined information is inserted into the single audio stream, it is recognized from the data container descriptor that the predetermined information is not inserted to the other streams. Furthermore, for example, in a case where the number of audio streams is two and the predetermined information is inserted into two audio streams, it is recognized from the data container descriptor that the predetermined information is inserted into the other streams.

The HDMI transmission unit 216 transmits the uncompressed video data obtained by the video decoder 214 and the audio stream, to which framing is performed by the audio framing unit 215, from the HDMI terminal 217 through communication conforming to the HDMI. For transmission through a TMDS channel of the HDMI, the HDMI transmission unit 216 packs the video data and the audio stream and outputs the packed data to the HDMI terminal 217. The HDMI transmission unit 216 will be described in detail below.

An operation of the set top box 200 will be briefly described. The television broadcast signal input to the antenna terminal 211 is supplied to the digital tuner 212. The digital tuner 212 processes the television broadcast signal and outputs a transport stream TS corresponding to the user's selection channel.

The transport stream TS output from the digital tuner 212 is supplied to the demultiplexer 213. The demultiplexer 213 extracts a packet of an elementary stream of a video from the transport stream TS and transmits the packet to the video decoder 214.

After reconstructing the video stream from the packet of the video extracted from the demultiplexer 213, the video decoder 214 performs decode processing on the video stream and obtains uncompressed video data. The uncompressed video data is supplied to the HDMI transmission unit 216.

Furthermore, the demultiplexer 213 extracts packets of one or two audio streams from the transport stream TS and reconstructs the audio stream into which the predetermined information is inserted. After the audio framing unit 215 performs framing on the audio stream, the audio stream is supplied to the HDMI transmission unit 216. Then, in the HDMI transmission unit 216, the uncompressed video data and the audio stream are packed and are transmitted from the HDMI terminal 217 to an audio amplifier 300 via a HDMI cable 610.

Furthermore, the demultiplexer 213 extracts various information such as descriptor information from the transport stream TS and transmits the extracted information to the CPU 201. The various information includes information regarding the data container descriptor (data_container descriptor) (refer to FIG. 14). With the above processing, the CPU 201 recognizes that the predetermined information is inserted into the audio stream, for example.

[Exemplary Configuration of Television Receiver]

Figure 27:
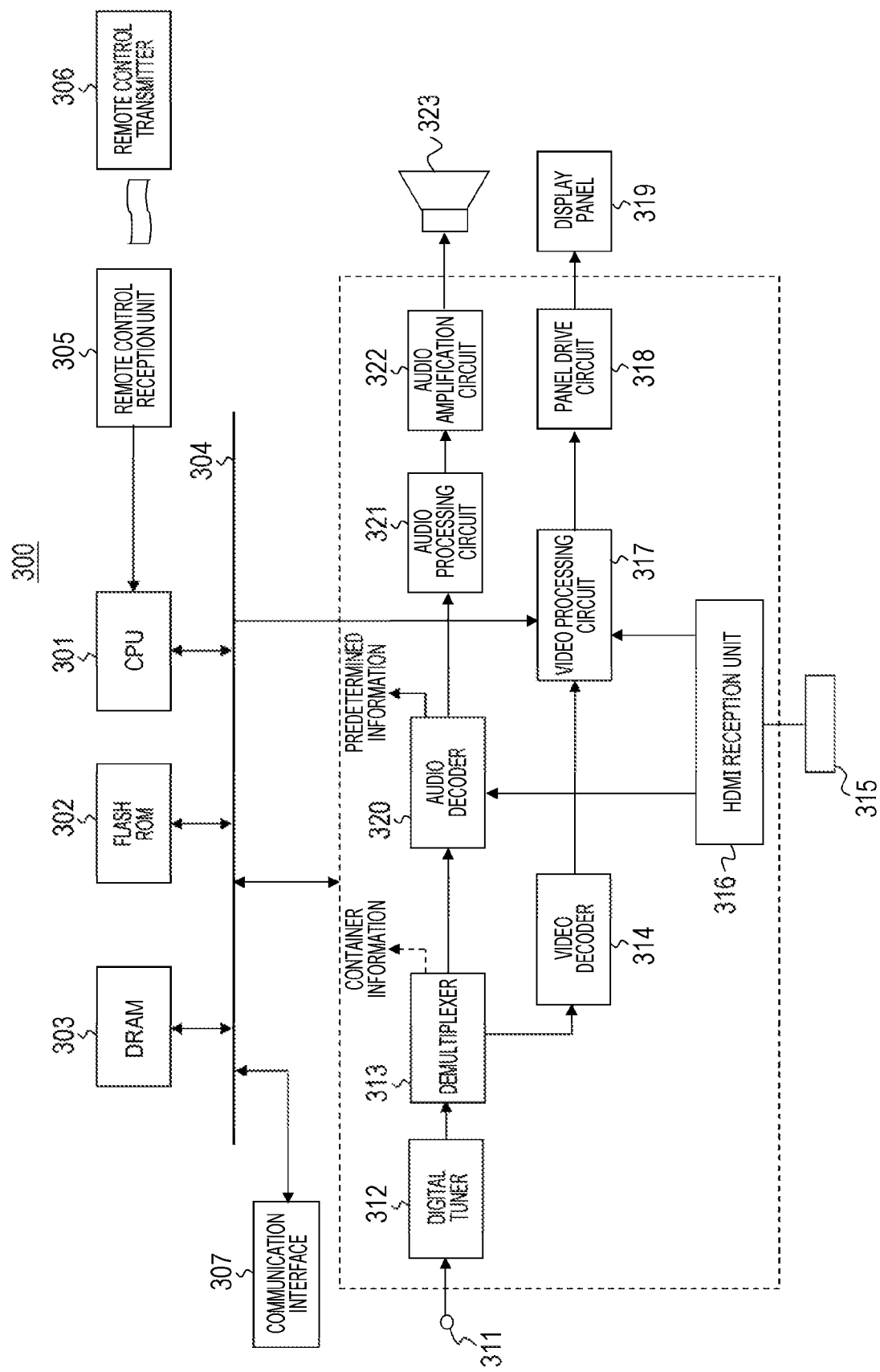
FIG. 27 is a block diagram of an exemplary configuration of a television receiver.

FIG. 27 illustrates an exemplary configuration of the television receiver 300. The television receiver 300 includes a CPU 301, a flash ROM 302, a DRAM 303, an internal bus 304, a remote control reception unit 305, a remote control transmitter 306, and a communication interface 307.

Furthermore, the television receiver 300 includes an antenna terminal 311, a digital tuner 312, a demultiplexer 313, a video decoder 314, an HDMI terminal 315, and an HDMI reception unit 316. In addition, the television receiver 300 includes a video processing circuit 317, a panel drive circuit 318, a display panel 319, an audio decoder 320, an audio processing circuit 321, an audio amplification circuit 322, and a speaker 323.

The CPU 301 controls an operation of each unit of the television receiver 300. The flash ROM 302 contains control software and stores data. The DRAM 303 configures a work area of the CPU 301. The CPU 301 develops software and data read from the flash ROM 302 on the DRAM 303 to activate the software and controls each unit of the television receiver 300.

The remote control reception unit 305 receives a remote control signal (remote control code) transmitted from the remote control transmitter 306 and supplies the signal to the CPU 301. The CPU 301 controls each unit of the television receiver 300 on the basis of the remote control code. The CPU 301, the flash ROM 302, and the DRAM 303 are connected to the internal bus 304.

The communication interface 307 communicates with a server on a network such as the Internet under the control by the CPU 301. The communication interface 307 is connected to the internal bus 304.

The antenna terminal 311 receives a television broadcast signal received by a reception antenna (not shown). The digital tuner 312 processes the television broadcast signal input to the antenna terminal 311 and outputs a transport stream TS corresponding to a user's selection channel.

The demultiplexer 313 extracts a video stream from the transport stream TS and transmits the extracted video stream to the video decoder 314. The video decoder 314 decodes the video stream and obtains uncompressed video data (image data).

Furthermore, the demultiplexer 313 extracts one or two audio streams from the transport stream TS and transmits the extracted stream to the audio decoder 320. As described about the stream generation units 110A and 110B (refer to FIGS. 2 and 16), the predetermined information is inserted into the audio stream.

Furthermore, the demultiplexer 213 extracts various information such as descriptor information from the transport stream TS and transmits the extracted information to the CPU 301. The various information includes information regarding the data container descriptor (data_container descriptor) (refer to FIG. 14). The CPU 301 recognizes from the data container descriptor that the predetermined information is inserted into the corresponding audio stream.

Furthermore, the CPU 201 recognizes from the data container descriptor that the predetermined information is inserted to the other streams in addition to the corresponding audio stream.

The HDMI reception unit 316 receives the uncompressed video data and the audio stream supplied to the HDMI terminal 315 via an HDMI cable 400 through communication conforming to the HDMI. As described about the set top box 200 (refer to FIG. 26), the predetermined information is inserted into the audio stream. The HDMI reception unit 316 will be described in detail below.

The video processing circuit 317 performs scaling processing, synthesis processing, and the like on the video data and the like obtained by the video decoder 314 or the HDMI reception unit 316, the video data received from the server on the internet by the communication interface 307 and obtains video data for display.

The panel drive circuit 318 drives the display panel 319 on the basis of the image data for display obtained by the video processing circuit 317. The display panel 319 includes, for example, a Liquid Crystal Display (LCD), an organic electroluminescence (EL) display, and the like.

The audio decoder 320 decodes the audio stream obtained by the demultiplexer 313 or the HDMI reception unit 316 and obtains uncompressed audio data (sound data). Furthermore, the audio decoder 320 extracts divided portions of the predetermined information sequentially inserted into a predetermined number of audio frames of an audio stream, reconstructs the predetermined information on the basis of sequential information added to the divided portion, and transmits the reconstructed predetermined information to the CPU 301. The CPU 301 appropriately controls each unit of the television receiver 300 so that processing using this predetermined information is performed.

In this case, identification information used to identify whether the divided portion is inserted into the other media encoded stream is added to the respective divided portions to be inserted into the predetermined number of audio frames of each audio stream. Therefore, on the basis of the identification information, the audio decoder 320 can easily recognize whether the divided portion is inserted into the other media encoded stream and can efficiently and accurately extract all the divided portions of the predetermined information from all the audio streams into which the divided portions of the predetermined information are respectively inserted.

Figure 28:
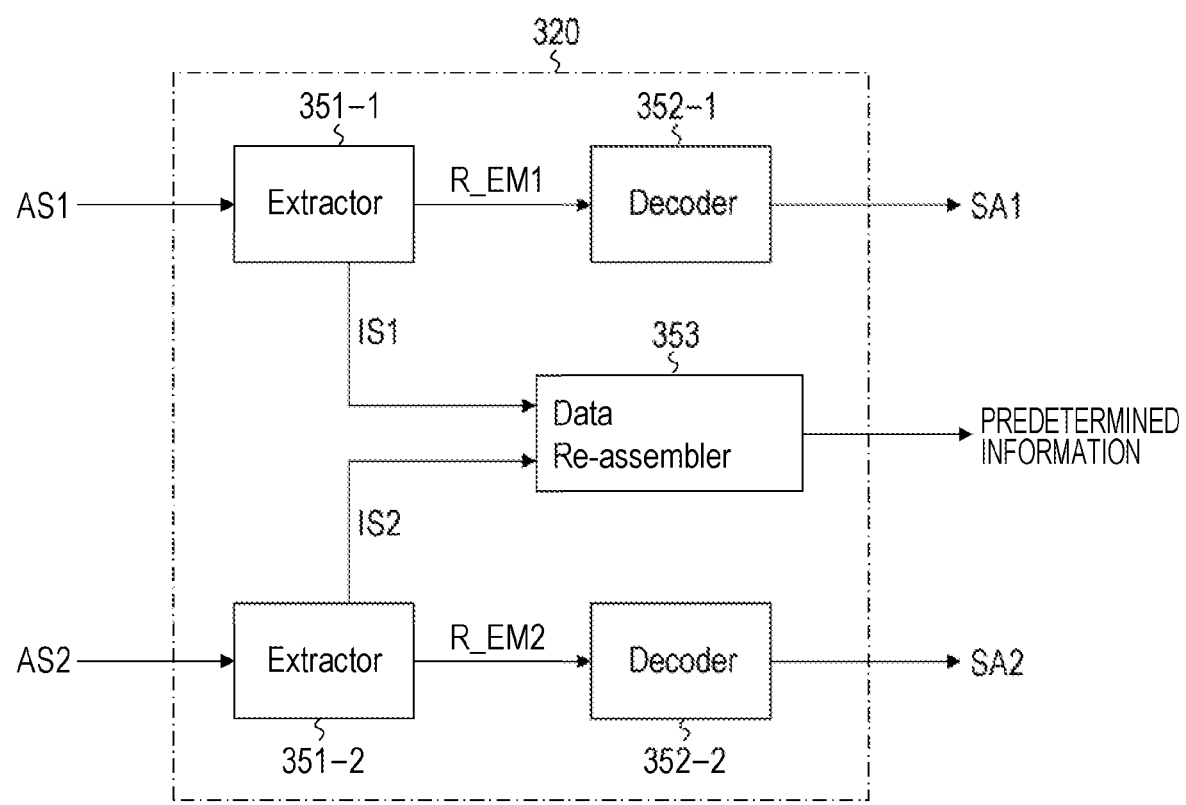
FIG. 28 is a block diagram of an exemplary configuration of an audio decoder.

FIG. 28 illustrates an exemplary configuration of the audio decoder 320. The audio decoder 320 includes extractors 351-1 and 351-2, decoders 352-1 and 352-2, and a data reassembler 353.

The extractor 351-1 extracts a divided portion IS1 of predetermined information, which is inserted into an audio frame, from a predetermined number of audio frames of an audio stream AS1 (R_EM1+IS1) and outputs the audio stream R_EM1. The decoder 352-1 decodes the audio stream R_EM1 and outputs audio data SA1.

The extractor 351-2 extracts a divided portion IS2 of predetermined information, which is inserted into an audio frame, from a predetermined number of audio frames of an audio stream AS2 (R_EM2+IS2) and outputs the audio stream R_EM2. The decoder 352-2 decodes the audio stream R_EM2 and outputs audio data SA2.

The data reassembler 353 reconstructs the predetermined information from the divided portions IS1 and IS2 extracted by the extractors 351-1 and 351-2 on the basis of the sequential information added to the divided portions and outputs the reconstructed predetermined information.

Note that, in the illustrated example, it is possible to cope with a case where the two audio streams AS1 and AS2 are obtained from the demultiplexer 313. In a case where only the single audio stream AS1 is obtained from the demultiplexer 313, the extractor 351-2 and the decoder 352-2 are not used.

Figure 29:
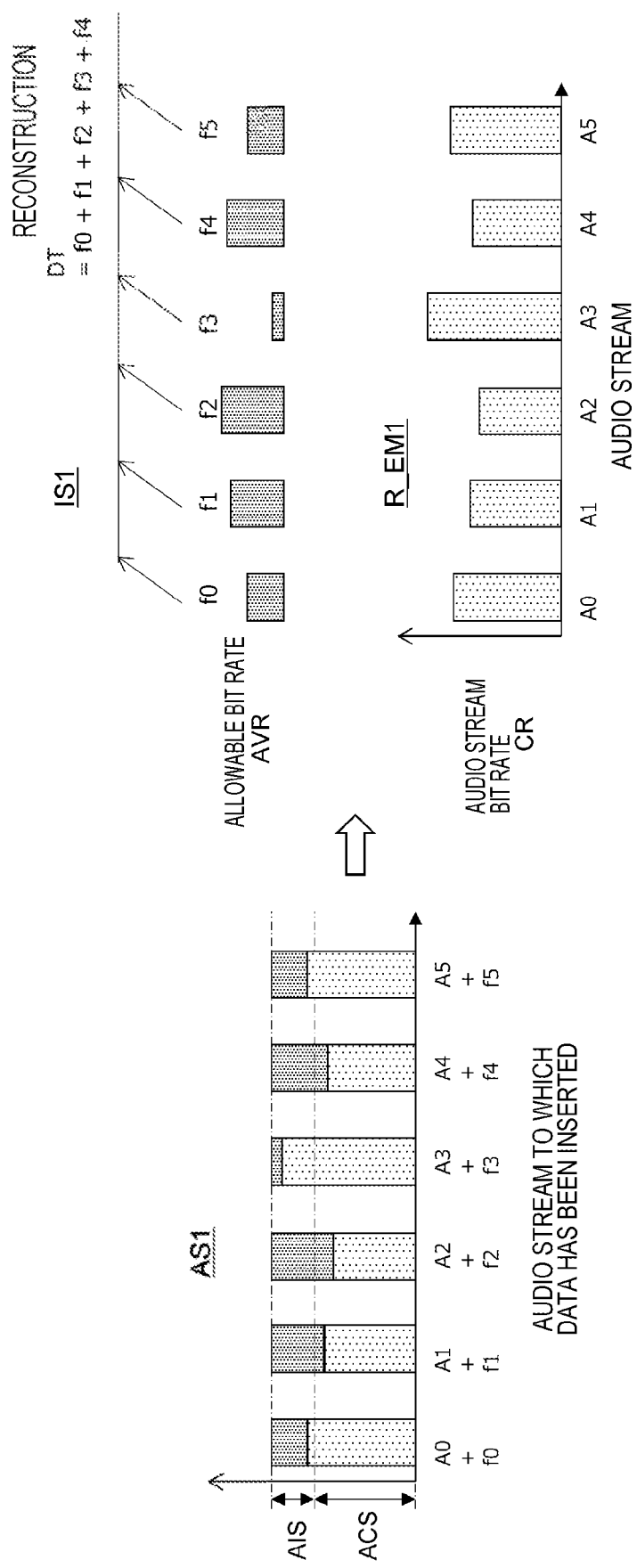
FIG. 29 is a diagram schematically illustrating exemplary processing by an extractor relative to a single audio stream AS1.

FIG. 29 schematically illustrates exemplary processing of the extractor 351-1 in a case where only the single audio stream AS1 is obtained from the demultiplexer 313. In this example, a case is illustrated where the predetermined information (inserted data DT) is divided into six divided portions f0, f1, f2, f3, f4, and f5 by the method of (2) (refer to FIG. 6). However, the same applies to a case where the predetermined information is divided by the method of (1). The extractor 351-1 extracts the six divided portions f0, f1, f2, f3, f4, and f5 included in six audio frames of the audio stream AS1 and transmits the extracted divided portions to the data reassembler 353.

Figure 30:
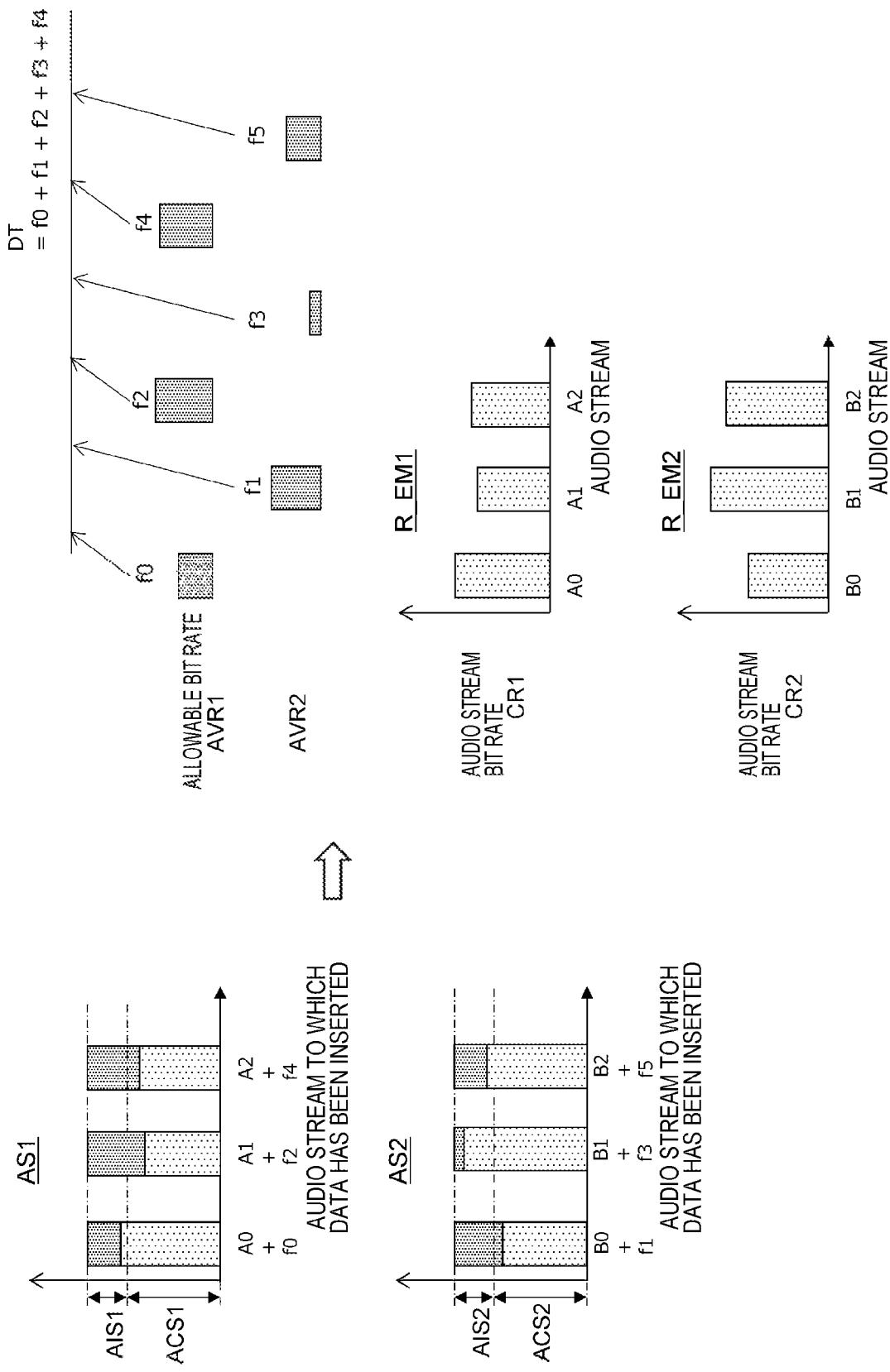
FIG. 30 is a diagram schematically illustrating exemplary processing by the extractor relative to two audio streams AS1 and AS2.

FIG. 30 schematically illustrates exemplary processing of the extractors 351-1 and 351-2 in a case where the two single audio streams AS1 and AS2 are obtained from the demultiplexer 313. In this example, a case is illustrated where the predetermined information (inserted data DT) is divided into six divided portions f0, f1, f2, f3, f4, and f5 by the method of (2) (refer to FIG. 17). However, the same applies to a case where the predetermined information is divided by the method of (1).

The extractor 351-1 extracts three divided portions f0, f2, and f4 included in three audio frames of the audio stream AS1 and transmits the extracted divided portions to the data reassembler 353. Furthermore, the extractor 351-2 extracts three divided portions f1, f3, and f5 included in three audio frames of the audio stream AS2 and transmits the extracted divided portions to the data reassembler 353.

Returning to FIG. 27, the audio processing circuit 521 performs processing such as D/A conversion on the audio data obtained by the audio decoder 320. The processing includes rendering processing on object data, synthesis processing on channel data, number of channels conversion processing, and the like as necessary. The audio amplification circuit 322 amplifies a sound signal of each channel output from the audio processing circuit 321 and supplies the amplified sound signal to the speaker 323 of each channel.

An operation of the television receiver 300 illustrated in FIG. 27 will be briefly described. The television broadcast signal input to the antenna terminal 311 is supplied to the digital tuner 312. The digital tuner 312 processes the television broadcast signal and obtains a transport stream TS corresponding to the user's selection channel.

The transport stream TS obtained from the digital tuner 312 is supplied to the demultiplexer 313. The demultiplexer 313 extracts a video stream from the transport stream TS and supplies the video stream to the video decoder 314. The video decoder 314 decodes the video stream and obtains uncompressed video data. The uncompressed video data is supplied to the video processing circuit 317. Furthermore, the demultiplexer 313 extracts one or two audio streams from the transport stream TS and supplies the extracted stream to the audio decoder 320.

Furthermore, the demultiplexer 313 extracts various information such as descriptor information from the transport stream TS and transmits the extracted information to the CPU 301. The various information includes information regarding the data container descriptor (data_container descriptor) (refer to FIG. 14). The CPU 301 recognizes from the data container descriptor that the predetermined information is inserted into the corresponding audio stream. Furthermore, the CPU 301 recognizes from the data container descriptor that the predetermined information is inserted into the other streams in addition to the corresponding audio stream.

The HDMI reception unit 316 receives the uncompressed video data supplied to the HDMI terminal 315 via the HDMI cable 400 and one or two audio streams through communication conforming to the HDMI. The uncompressed video data is supplied to the video processing circuit 317. Furthermore, the audio stream is supplied to the audio decoder 320.

The video processing circuit 317 performs scaling processing, synthesis processing, and the like on the video data and the like obtained by the video decoder 314 or the HDMI reception unit 316, the video data received from the server on the internet by the communication interface 307 and obtains video data for display.

The video data for display obtained by the video processing circuit 317 is supplied to the panel drive circuit 318. The panel drive circuit 318 drives the display panel 319 on the basis of video data for display. With this operation, an image corresponding to the video data for display is displayed on the display panel 319.

The audio decoder 320 decodes the audio stream obtained by the demultiplexer 313 or the HDMI reception unit 316 and obtains uncompressed audio data (sound data). Furthermore, the audio decoder 320 extracts divided portions of predetermined information sequentially inserted into a predetermined number of audio frames of an audio stream and reconstructs the predetermined information on the basis of sequential information added to the divided portions. The predetermined information reconstructed in this way is transmitted to the CPU 301. The CPU 301 appropriately controls each unit of the television receiver 300 so that processing using this predetermined information is performed.

The audio data obtained by the audio decoder 320 is supplied to the audio processing circuit 321. The audio processing circuit 321 performs necessary processing such as D/A conversion on the audio data. After being amplified by the audio amplification circuit 322, the audio data is supplied to the speaker 323. Therefore, the speaker 323 outputs sounds corresponding to a display image on the display panel 319.

[Exemplary Configuration of HDMI Transmission Unit and HDMI Reception Unit]

Figure 31:
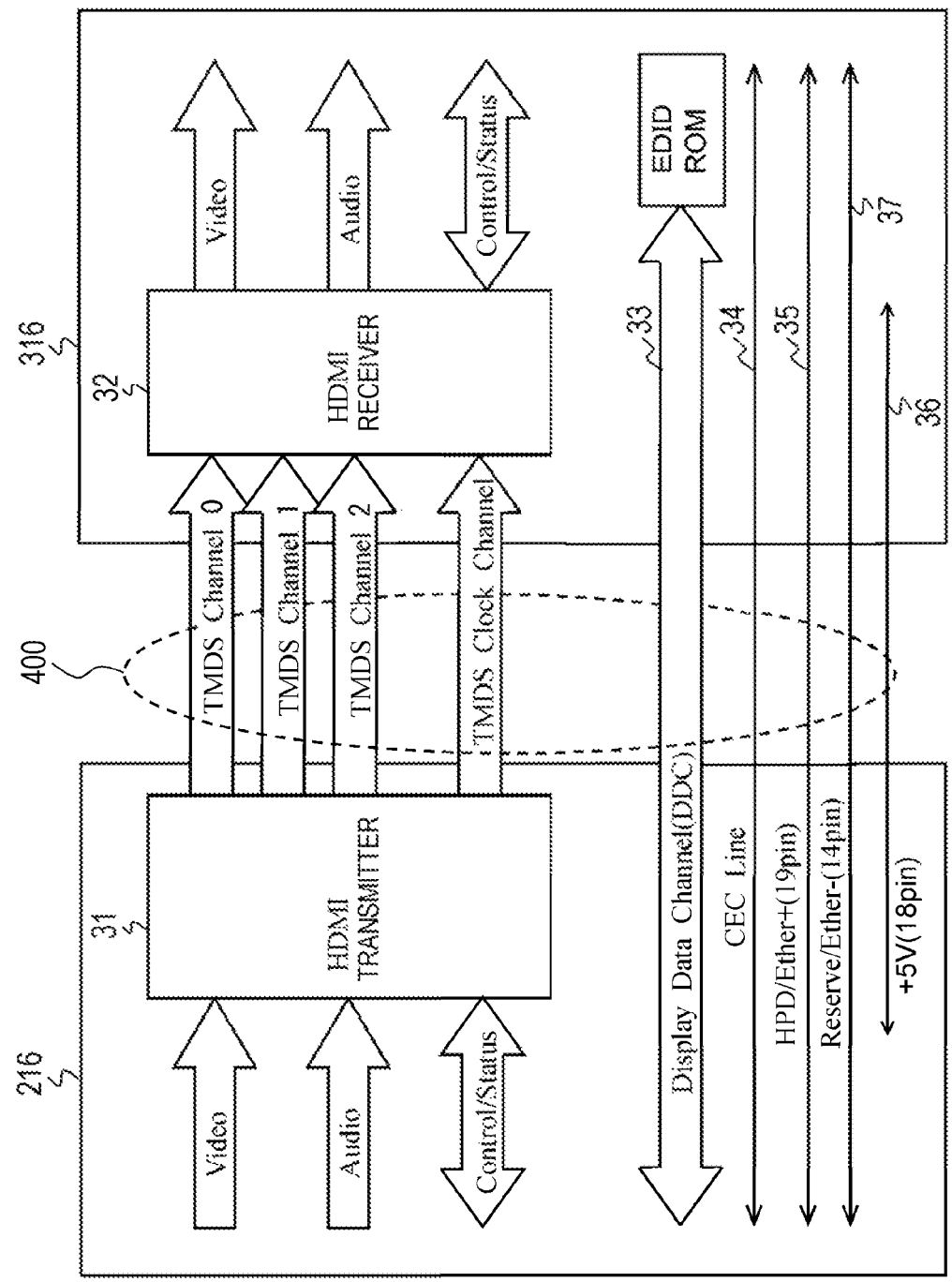
FIG. 31 is a block diagram of an exemplary configuration of an HDMI transmission unit of the set top box and an HDM reception unit of the television receiver.

FIG. 31 illustrates an exemplary configuration of the HDMI transmission unit 216 of the set top box 200 (refer to FIG. 26) and the HDM reception unit 316 of the television receiver 300 (refer to FIG. 27).

The HDMI transmission unit 216 transmits differential signals corresponding to uncompressed pixel data of an image for one screen to the HDMI reception unit 316 in one direction through a plurality of channels in an effective image section 21 (appropriately referred to as "active video period" below) that is defined by removing a horizontal blanking interval 22 and a vertical blanking interval 23 from a section between one vertical synchronization signal to a next vertical synchronization signal (refer to FIG. 32). Furthermore, the HDMI transmission unit 216 transmits the differential signals corresponding to at least sound data, control data, other auxiliary data, and the like associated with an image to the HDMI reception unit 316 in one direction through the plurality of channels in the horizontal blanking interval 22 and the vertical blanking interval 23.

That is, the HDMI transmission unit 216 includes an HDMI transmitter 31. For example, the transmitter 31 converts the pixel data of the uncompressed image into corresponding differential signals and serially transmits the signals to the HDMI reception unit 316 in one direction through three Transition Minimized Differential Signaling (TMDS) channels #0, #1, and #2 that are the plurality of channels.

Furthermore, the transmitter 31 converts the sound data associated with the uncompressed image, necessary control data, the other auxiliary data, and the like and serially transmits the differential signals to the HDMI reception unit 316 in one direction through the three TMDS channels #0, #1, and #2.

Figure 32:
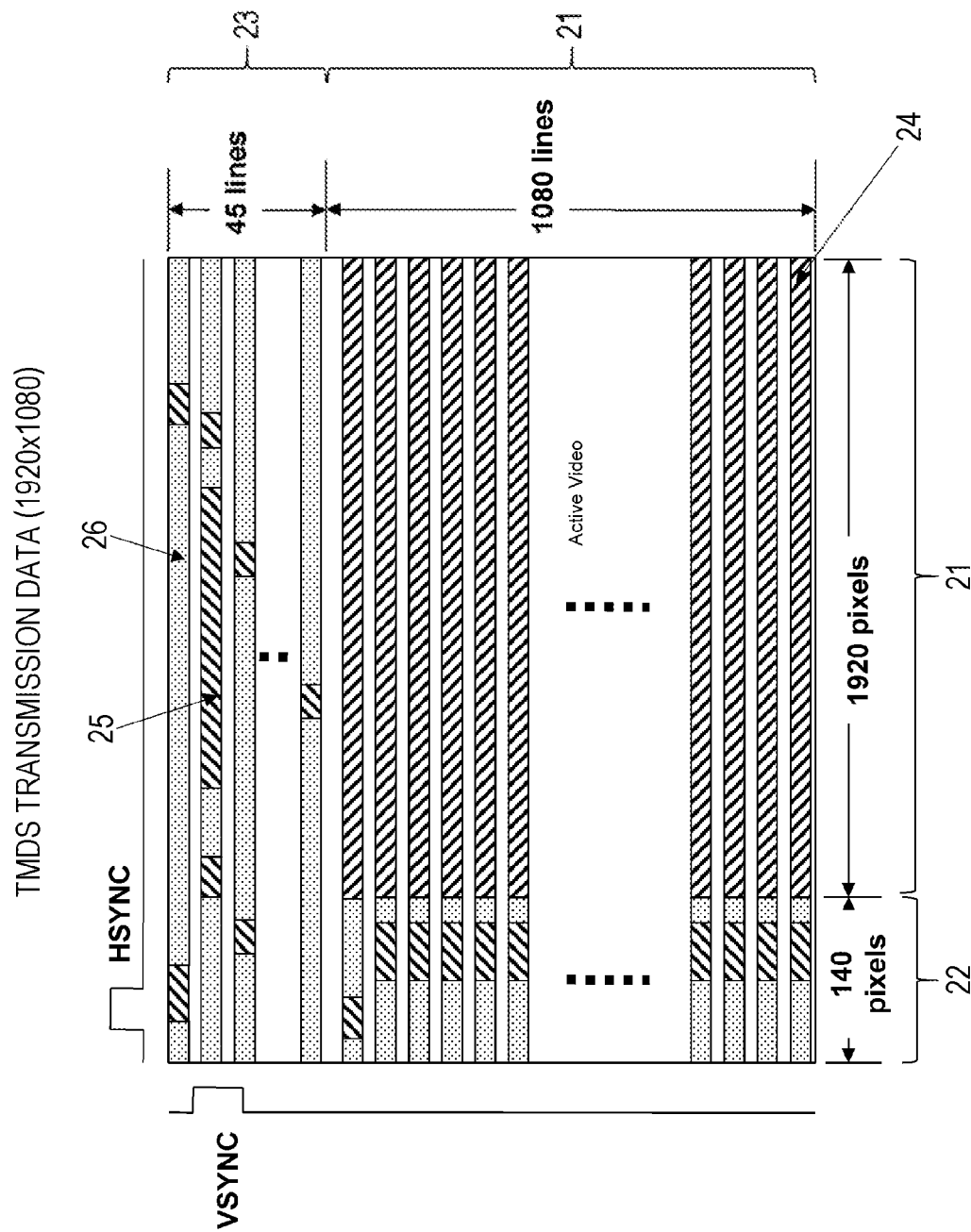
FIG. 32 is a diagram of a period of various transmission data in a case where image data having a size of 1920 pixels×1080 lines is transmitted in a TMDS channel.

The HDMI reception unit 316 receives the differential signals corresponding to the pixel data transmitted from the HDMI transmission unit 216 in one direction through the plurality of channels in the active video period 21 (refer to FIG. 32). In addition, the HDMI reception unit 316 receives the differential signals corresponding to the sound data and the control data transmitted from the HDMI transmission unit 216 in one direction through the plurality of channels in the horizontal blanking interval 22 (refer to FIG. 32) or the vertical blanking interval 23 (refer to FIG. 21).

Transmission channels of an HDMI system including the HDMI transmission unit 216 and the HDMI reception unit 316 includes channels called as a Display Data Channel (DDC) 33 and a Consumer Electronics Control (CEC) line 34 in addition to the three TMDS channels #0 to #2 as transmission channels for transmitting the pixel data and the sound data and a TMDS clock channel as a transmission channel for transmitting a pixel clock.

The DDC 33 includes two signal lines included in the HDMI cable 400 and is used by the HDMI transmission unit 216 to read Extended Display Identification Data (EDID) from the HDMI reception unit 316 connected via the HDMI cable 400. That is, in addition to the HDMI receiver 32, the HDMI reception unit 316 includes an EDID ROM for storing the EDID that is capability information regarding Configuration Capability. By reading the EDID by the HDMI transmission unit 216, decoding capability information of a reception side is transmitted to a transmission side.

The HDMI transmission unit 216 reads the EDID from the HDMI reception unit 316, which is connected via the HDMI cable 400, via the DDC 33. Then, the CPU 201 of the set top box 200 recognizes capability of the television receiver 300 including the HDMI reception unit 316 on the basis of the EDID.

The CEC line 34 includes a single signal line included in the HDMI cable 400 and is used to bidirectionally transmit control data between the HDMI transmission unit 216 and the HDMI reception unit 316. Furthermore, the HDMI cable 400 includes an HPD line 35 connected to a pin called as a Hot Plug Detect (HPD).

A source device can detect connection with a sink device (destination device) by a DC bias potential by using the HPD line 35. In this case, when viewed from the source device, the HPD line 35 has a function for receiving a notification regarding a connection state from the sink device with the DC bias potential. On the other hand, when viewed from the sink device, the HPD line has a function for notifying the connection state to the source device with the DC bias potential. Furthermore, the HDMI cable 400 includes a power supply line 36 used to supply power from the source device to the sink device.

In addition, the HDMI cable 400 includes a reserve line 37. There is an HDMI Ethernet Channel (HEC) that transmits an Ethernet signal using the HPD line 35 and the reserve line 37. Furthermore, there is an Audio Return Channel (ARC) that transmits audio data from the destination device (sink device) to the source device using both of the HPD line 35 and the reserve line 37 or only the HPD line 35. Note that the "Ethernet" is a registered trademark.

FIG. 32 illustrates a period of various transmission data in a case where image data having a size of 1920 pixels×1080 lines is transmitted in a TMDS channel. In a video field (Video Field) in which the transmission data is transmitted through the three TMDS channels of the HDMI, three kinds of periods exist according to the kind of the transmission data, i.e., a video data period (Video Data Period) 24, a data island period (Data Island Period) 25, and a control period (Control Period) 26.

Here, a video field period is a period from a rising edge (Active Edge) of a certain vertical synchronization signal to a rising edge of a next vertical synchronization signal and is divided into the horizontal blanking interval 22 (Horizontal Blanking), the vertical blanking interval 23 (Vertical Blanking), and the effective pixel section 21 (Active Video) defined by removing the horizontal blanking interval and the vertical blanking interval from the video field section.

The video data period 24 is allocated to the effective pixel section 21. In the video data period 24, data of an active pixel of 1920 pixels (pixel)×1080 lines for forming uncompressed image data for one screen is transmitted. The data island period 25 and the control period 26 are allocated to the horizontal blanking interval 22 and the vertical blanking interval 23. In the data island period 25 and the control period 26, auxiliary data (Auxiliary Data) is transmitted.

That is, the data island period 25 is allocated to a part of the horizontal blanking interval 22 and the vertical blanking interval 23. In the data island period 25, for example, a packet of sound data and the like, which does not relate to the control, of the auxiliary data is transmitted. The control period 26 is allocated to other parts of the horizontal blanking interval 22 and the vertical blanking interval 23. In the control period 26, for example, a vertical synchronization signal, a horizontal synchronization signal, a control packet, and the like which relate to the control of the auxiliary data are transmitted.

"Example of Communication Between Set Top Box and Television Receiver"

For example, the CPU 201 of the set top box 200 can negotiate with the CPU 301 of the television receiver 300 through communication, for example, using a CEC line, recognize an audio stream necessary for the television receiver 300, and transmit only the audio stream.

Figure 33:
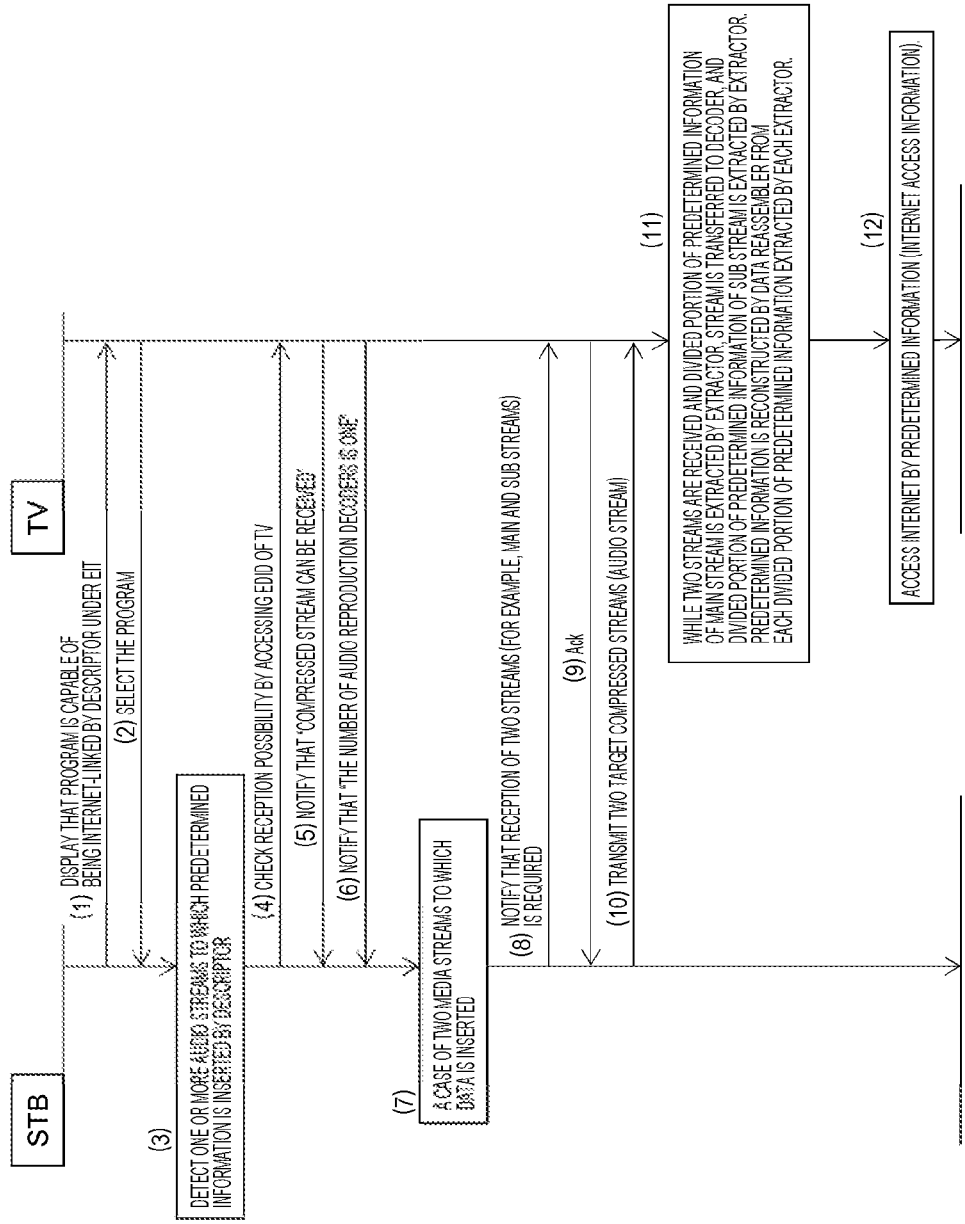
FIG. 33 is a diagram of exemplary operations of the set top box and the television receiver with negotiation.

FIG. 33 illustrates exemplary operations of the set top box 200 and the television receiver 300 with negotiation.

(1) On the basis of the component descriptor (Component_descriptor) or the data container descriptor (data_container_descriptor) under the EIT, the set top box 200 transmits a display signal of a program guide clearly indicating a program that can be linked to the internet to the television receiver 300 and displays the program guide on a display screen of the television receiver 300.

(2) The television receiver 300 selects the program that can be linked to the internet by using the program guide displayed on the display screen and transmits a program selection signal to the set top box 200.

(3) The set top box 200 receives the program on the basis of the program selection signal from the television receiver 300. Then, the set top box 200 detects an audio stream into which the predetermined information (inserted data) is inserted on the basis of the data container descriptor (Data_container descriptor).

(4) The set top box 200 accesses the EDID of the television receiver 300 to check a reception possibility.

(5) The television receiver 300 notifies the set top box 200 that the audio stream (compressed stream) can be received by the EDID. (6) The television receiver 300 notifies the set top box 200 that the number of audio reproduction decoders is one by the EDID.

(7) In a case where the number of audio streams into which the predetermined information is inserted is two, the set top box 200 (8) notifies the television receiver 300 that it is necessary to receive two audio streams (for example, two streams, i.e., main stream and substream).

(9) Correspondingly, the television receiver 300 transmits an acknowledge (ACK) signal to the set top box 200. (10) Although the television receiver 300 has the single audio reproduction decoder, the set top box 200 transmits two audio streams.

(11) The television receiver 300 receives the two streams. Then, regarding the main stream, while the inserted divided portion of the predetermined information is extracted by the extractor, and the main stream is transferred to the decoder to be decoded. On the other hand, regarding the substream, the inserted divided portion of the predetermined information is extracted by the extractor. Then, the television receiver 300 reconstructs the predetermined information from the divided portions of the predetermined information extracted by each extractor by the data reassembler. (12) The television receiver 300 accesses the internet using the reconstructed predetermined information, here, internet access information and obtains and displays predetermined information, for example.

As described above, in the transmission/reception system 10 illustrated in FIG. 1, the broadcast transmission device 100 inserts the divided portions obtained by dividing the predetermined information so that the bit rate falls within a predetermined bit rate to the predetermined number of audio frames of the audio stream and transmits the audio frame. Therefore, the overall bit rate including the audio stream can be suppressed to the target bit rate, and it is possible to satisfactorily insert the predetermined information into the audio stream and transmit the audio stream.

Furthermore, in the transmission/reception system 10 illustrated in FIG. 1, the broadcast transmission device 100 inserts the divided portions obtained by dividing the predetermined information into the predetermined number of audio frames of one or more, for example, two audio streams and transmits the audio streams. Therefore, a time required for transmitting the entire predetermined information can be shortened.

2. Modification

Note that, in the embodiment, the broadcast transmission device 100 inserts the predetermined information into the audio stream and transmits the audio stream. However, it is considered that the broadcast transmission device 100 inserts the predetermined information into the other media encoded streams such as a video stream and transmits the other stream.

Figure 34:
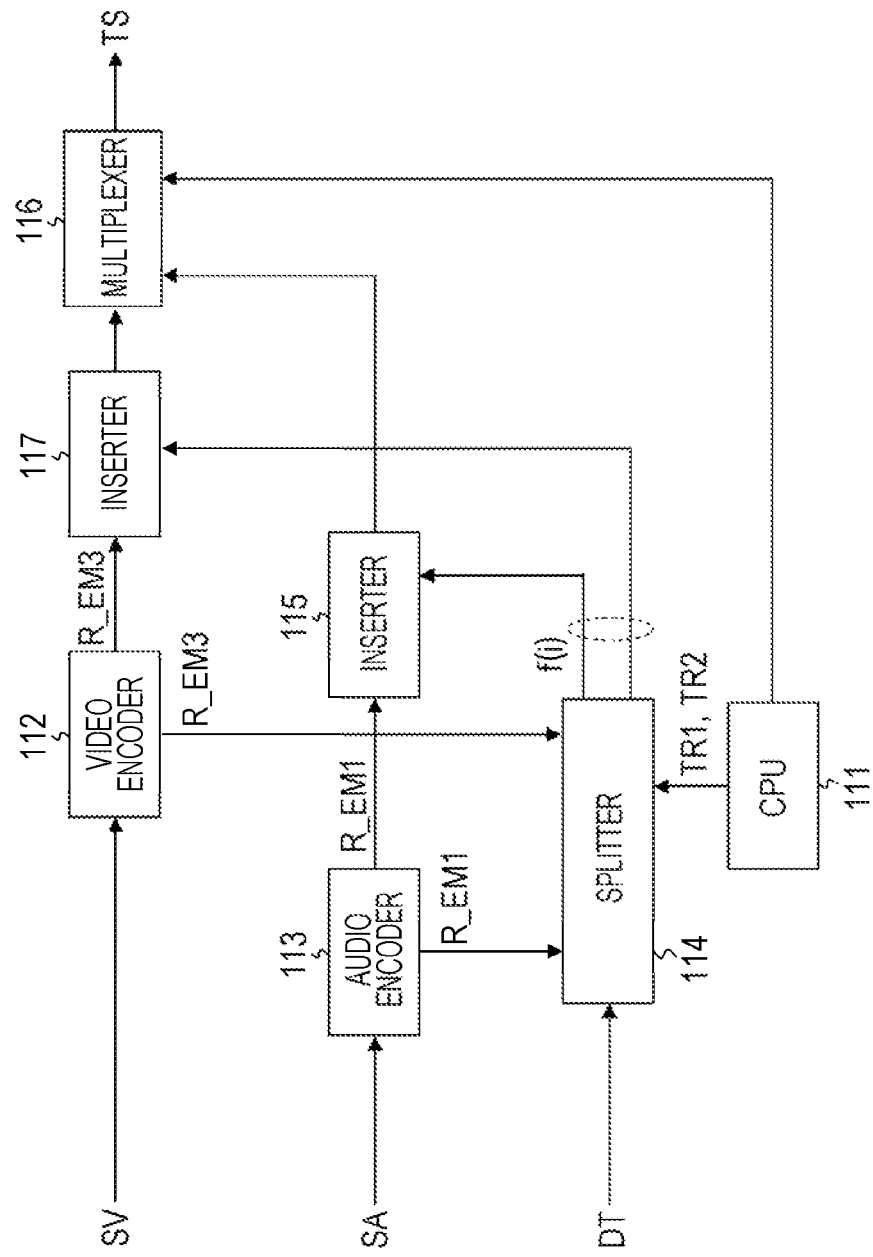
FIG. 34 is a block diagram of still another exemplary configuration of the stream generation unit included in the broadcast transmission device.

FIG. 34 illustrates an exemplary configuration of a stream generation unit 110C included in the broadcast transmission device 100 in that case. In FIG. 34, components corresponding to those in FIG. 2 are denoted with the same reference numerals, and detailed description thereof will be omitted.

The stream generation unit 110C includes a control unit 111, a video encoder 112, an audio encoder 113, a splitter 114, inserters 115 and 117, and a multiplexer 116.

The CPU 111 controls each unit of the stream generation unit 110C. The video encoder 112 performs encoding such as MPEG2, H.264/AVC, and H.265/HEVC on video data (image data) SV to generate a video stream (video elementary stream). The audio encoder 113 encodes the audio data (sound data) SA with an MPEG-H 3D Audio compression format to generate an audio stream (audio elementary stream).

Although detailed description of the splitter 114 is omitted, similarly to the splitter 114 of the stream generation unit 110A in FIG. 2, the inserted data DT included in the predetermined information is divided, and the predetermined number of divided portions f(i) are obtained. In this case, the predetermined information is divided by the method of (1) or (2) so that the bit rate of the inserted data DT to be inserted into each of the video stream and the audio stream falls within an allowable bit rate.

The inserter 117 sequentially inserts the predetermined number of divided portions f(i) obtained by division by the splitter 114 into a predetermined number of access units (picture) of a video stream R_EM3 generated by the video encoder 112 as adding sequential information for reconstruction. In this case, generic data (generic_data) having the divided portion f(i) (refer to FIG. 10) is arranged in a SEI NAL unit, for example, using an entry indicating the exemplary structure in FIG. 9.

Furthermore, although detailed description of the inserter 115 is omitted, similarly to the inserter 115 of the stream generation unit 100A in FIG. 2, the predetermined number of divided portions f(i) obtained by dividing the inserted data DT by the splitter 114 are sequentially inserted into the predetermined number of audio frames of the audio stream R_EM1 generated by the audio encoder 113 as adding the sequential information for reconstruction.

The multiplexer 116 PES packetizes and transport packetizes the video stream, into which each divided portion of the predetermined information (inserted data DT) is inserted, output from the inserter 117 and the audio stream, into which each divided portion of the predetermined information (inserted data DT) is inserted, output from the inserter 115 to multiplex the video stream and the audio stream and obtains a transport stream TS as a multiplexed stream.

In addition, the multiplexer 116 inserts identification information indicating that the predetermined information is inserted into the transport stream TS in correspondence with the video stream and the audio stream, for example. Specifically, the data container descriptors (refer to FIG. 14) are inserted into a video elementary stream loop and an audio elementary stream loop under a program map table (PMT).

Figure 35:
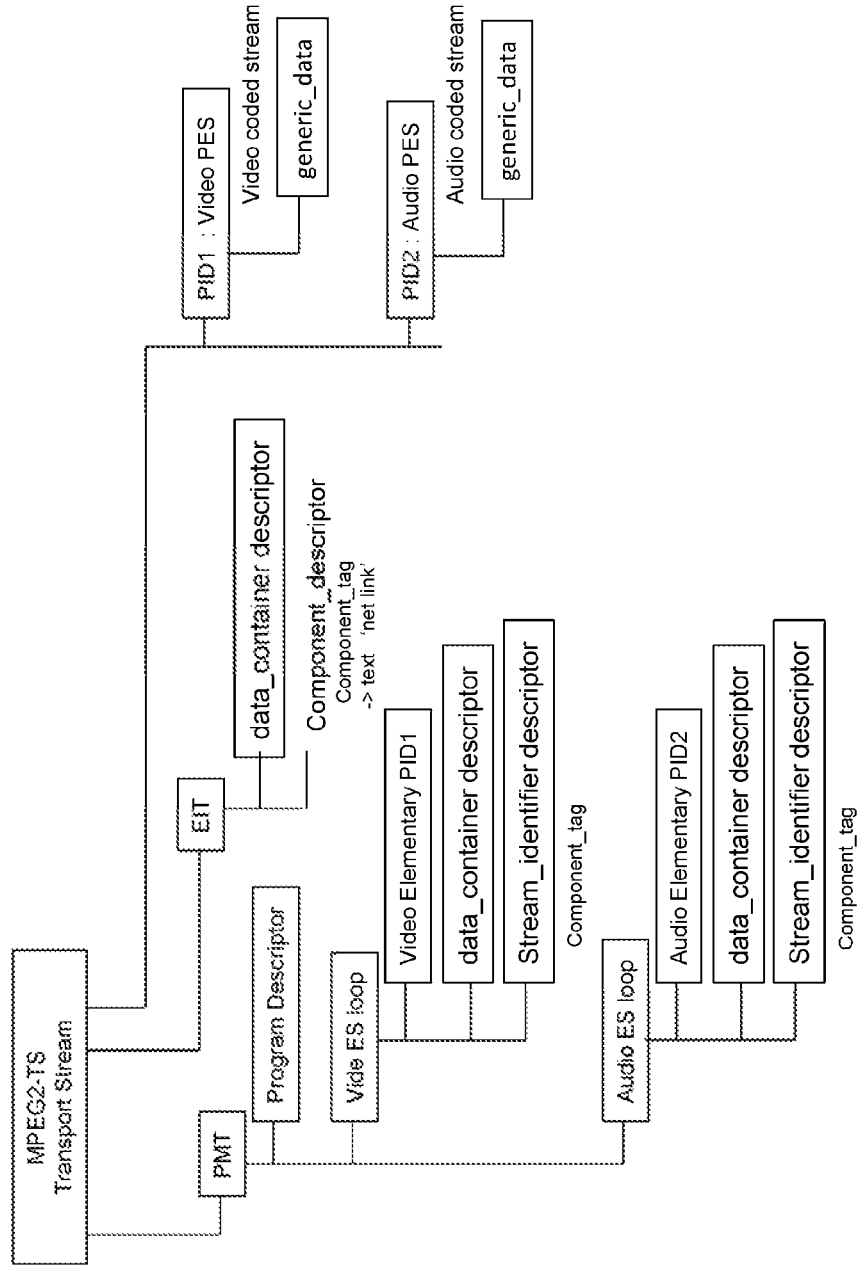
FIG. 35 is a diagram of another exemplary structure of the transport stream TS.

FIG. 35 illustrates an exemplary structure of the transport stream TS. The exemplary structure is an example in a case where the two streams, i.e., the video stream and the audio stream contain the predetermined information (refer to FIG. 34).

In the exemplary structure, a PES packet "Video PES" of a video stream identified by PID1 exists, and a PES packet "Audio PES" of an audio stream identified by PID2 exists.

A video stream (Video coded stream) is inserted into the PES packet of the video stream. Generic data (generic_data) (refer to FIG. 10) including each divided portion of the predetermined information is inserted into a predetermined number (including one) of access units (picture) of the video stream. In addition, an audio stream (Audio coded stream) is inserted into the PES packet of the audio stream. The generic data (generic_data) (refer to FIG. 10) including each divided portion of the predetermined information is inserted into the predetermined number (including one) of audio frames of the audio stream.

In addition, the transport stream TS includes a Program Map Table (PMT) as Program Specific Information (PSI). The PSI is information describing a program to which each elementary stream included in the transport stream belongs. In the PMT, there is a program loop (Program loop) describing information related to the entire program.

Furthermore, in the PMT, there is an elementary stream loop having information related to each elementary stream. In the exemplary structure, a video elementary stream loop (Video ES loop) exists in correspondence with the video stream, and an audio elementary stream loop (Audio ES loop) exists in correspondence with the audio stream.

In each elementary stream loop (ES loop), information such as a packet identifier (PID) is arranged in correspondence with each stream, and a descriptor in which information related to the stream is described is arranged. As one of the descriptors, the data container descriptor (data_container descriptor) (refer to FIG. 14) described above is arranged.

In addition, in each elementary stream loop, a stream identifier descriptor (Stream_identifier descriptor) having information of "Component_tag" is arranged as one of the descriptors. Furthermore, a component descriptor (Component_descriptor) is arranged under an Event Information Table (EIT). Furthermore, the data container descriptor (data_container descriptor) described above may be arranged in the EIT. That case means that identification information is provided when insertion of metadata is described on a display of a receiver EPG.

The component descriptor is associated with each elementary stream loop under the PMT with "Component_tag".

With this configuration, it can be found that the predetermined information, for example, internet access information is inserted into a video stream and an audio stream of a certain program, and it is possible to notify a TV viewer that the program is capable of accessing the internet by a display such as "net link" in a portion of the certain program at the time of displaying the program guide such as EPG.

The set top box 200 illustrated in FIG. 26 transmits the uncompressed video data obtained by decoding the received video stream to the television receiver 300 via the HDMI cable 400. However, in a case where the predetermined information is inserted into the video stream and transmitted as described above, the received video stream is transmitted to the television receiver 300 via the HDMI cable 400 without decoding the video stream. In this case, the video stream is decoded by the television receiver 300.

Note that the stream generation unit 110C in FIG. 34 inserts the predetermined information into both of the video stream and the audio stream and transmits the streams. Although detailed description is omitted, a configuration in which the predetermined information is inserted only into the video stream and transmitted is considered.

Furthermore, in the embodiment described above, an example has been described in which the audio compression format is MPEG-H 3D Audio. However, the present technology can be similarly applied to a case where the audio compression format is other audio compression formats such as AAC, AC3, and AC4.

Figure 36:
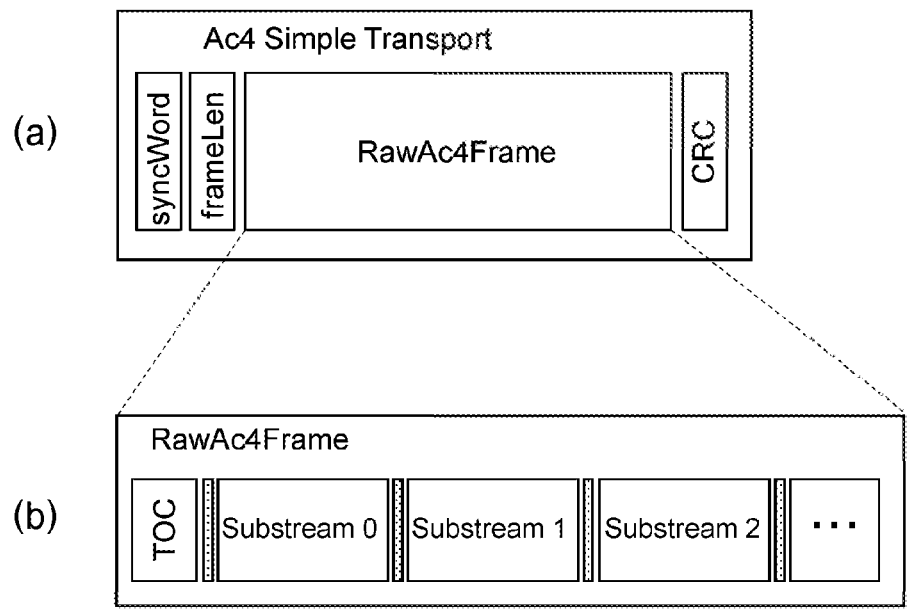
FIG. 36 is a diagram of a structure of a layer of AC4 simple transport (Simple Transport).

FIG. 36(a) illustrates a structure of a layer of AC4 simple transport (Simple Transport). A field of sync word (sync word), a field of frame length (frame length), a field of "RawAc4Frame" as a field of encoded data, and a CRC field exist. As illustrated in FIG. 36(b), in the field of "RawAc4Frame", a field of Table Of Content (TOC) exists at the head, and subsequently, a predetermined number of fields of substream (Substream) exist.

Figure 37:
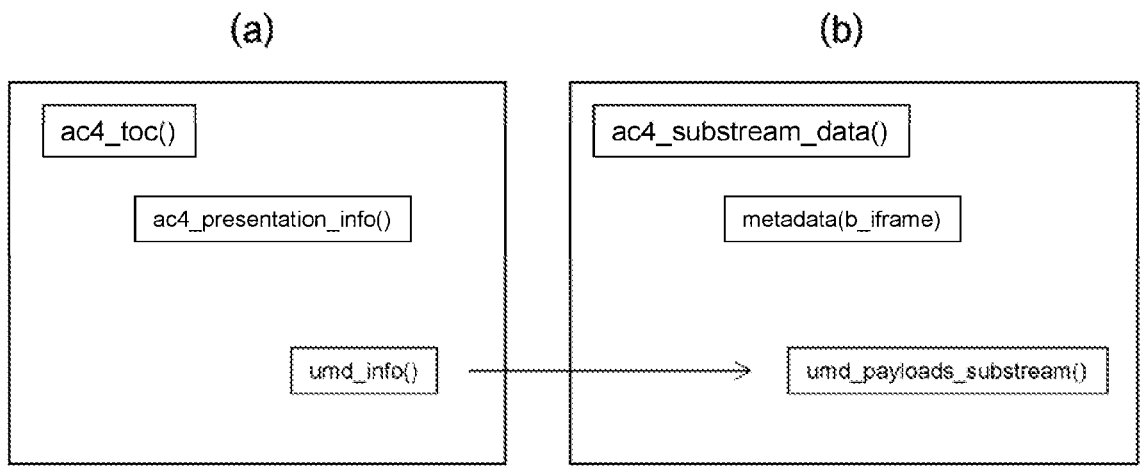
FIG. 37 is a diagram of a schematic configuration of a TOC (ac4_toc( )) and a substream (ac4_substream_data( )).

As illustrated in FIG. 37(b), a metadata region (metadata) exists in the substream (ac4_substream_data( )), and a field of "umd_payloads_substream( )" is provided in the metadata region. The generic data (generic_data) (refer to FIG. 10) including the divided portion of the predetermined information is arranged in a field of "umd_payload_byte" in the field of "umd_payloads_substream( )", for example, by using an entry illustrated in the exemplary structure in FIG. 9.

Note that, as illustrated in FIG. 37(a), a field of "ac4_presentation_info( )" exists in TOC(ac4_toc( )), and in addition, a field of "umd_info( )" exists therein. In the field of "umd_info( )", it is indicated that metadata is inserted into the field of "umd_payloads_substream( ))".

Furthermore, in the embodiment described above, an example has been described in which the container stream (multiplexed stream) is an MPEG-2 transport stream (transport stream TS). However, the present technology can be similarly applied to a system distributed by a container stream of MP4 or other format. For example, the system is an MPEG-DASH based stream distribution system, a transmission/reception system using an MPEG Media Transport (MMT) structure transmission stream, or the like.

Figure 38:
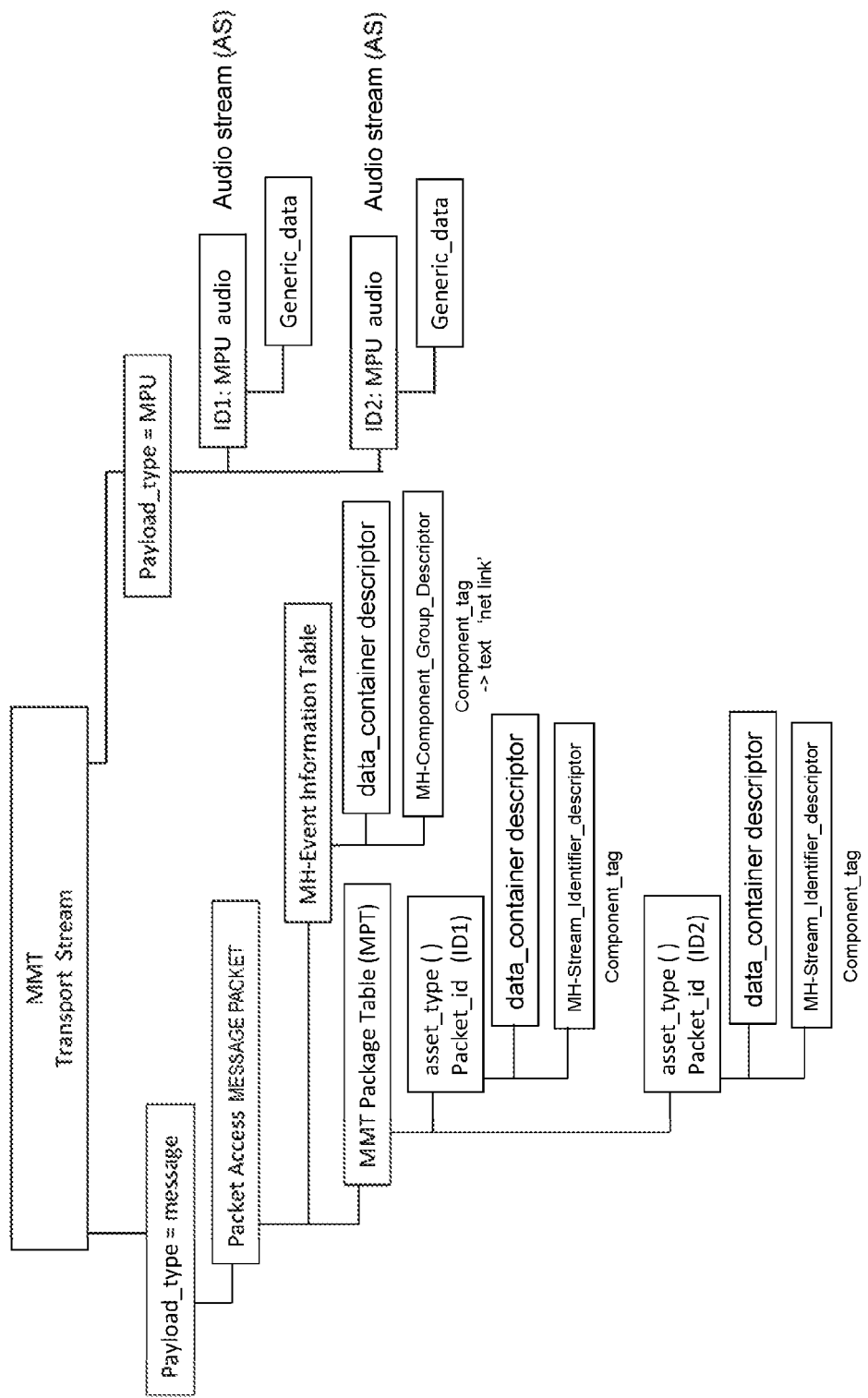
FIG. 38 is a diagram of an exemplary structure of an MMT transport stream.

FIG. 38 illustrates an exemplary structure of an MMT transport stream. The exemplary structure is an example in a case where two audio streams exist and the two audio streams contain the predetermined information (refer to FIG. 16). In the exemplary structure, a part regarding the video stream is omitted.

In a case where a packet type is "MPU", in the MMT transport stream, an MPU packet "MPU audio" of an audio stream AS identified by ID1 and an MPU packet "MPU audio" of the audio stream AS identified by ID2 are arranged. Audio streams (Audio coded stream) are inserted into these MPU packets. The generic data (generic_data) (refer to FIG. 10) including each divided portion of the predetermined information is inserted into the predetermined number (including one) of audio frames of the audio stream.

Furthermore, in a case where the packet type is "message", various message packets are arranged in the MMT transport stream. A Packet Access (PA) message packet is one of the message packets. The PA message packet includes a table such as MPT.

In the MPT, information such as an asset type (Asset_type), a packet ID (Packet_id), and the like is arranged in correspondence with each stream as an asset, and a descriptor describing information related to the stream is arranged. As one of the descriptors, the data container descriptor (data_container descriptor) (refer to FIG. 14) described above is arranged.

In addition, as one of the descriptors, an MH stream identifier descriptor (MH-Stream_identifier descriptor) having information of "Component_tag" is arranged. Furthermore, an MH component group descriptor (MH-Component_Group_Descriptor) is arranged under an MH-Event Information Table (MH-EIT). Furthermore, the data container descriptor (data_container descriptor) may be arranged in the MH-EIT.

That case means that identification information is provided when insertion of metadata is described on a display of a receiver EPG.

The MH component group descriptor is associated with information of each asset (audio stream) under the MPT with "Component_tag". With this configuration, it can be found that the predetermined information, for example, internet access information is inserted into an audio stream of a certain program, and it is possible to notify a TV viewer that the program is capable of accessing the internet by a display such as "net link" in a portion of the certain program at the time of displaying the program guide such as EPG.

Figure 39:
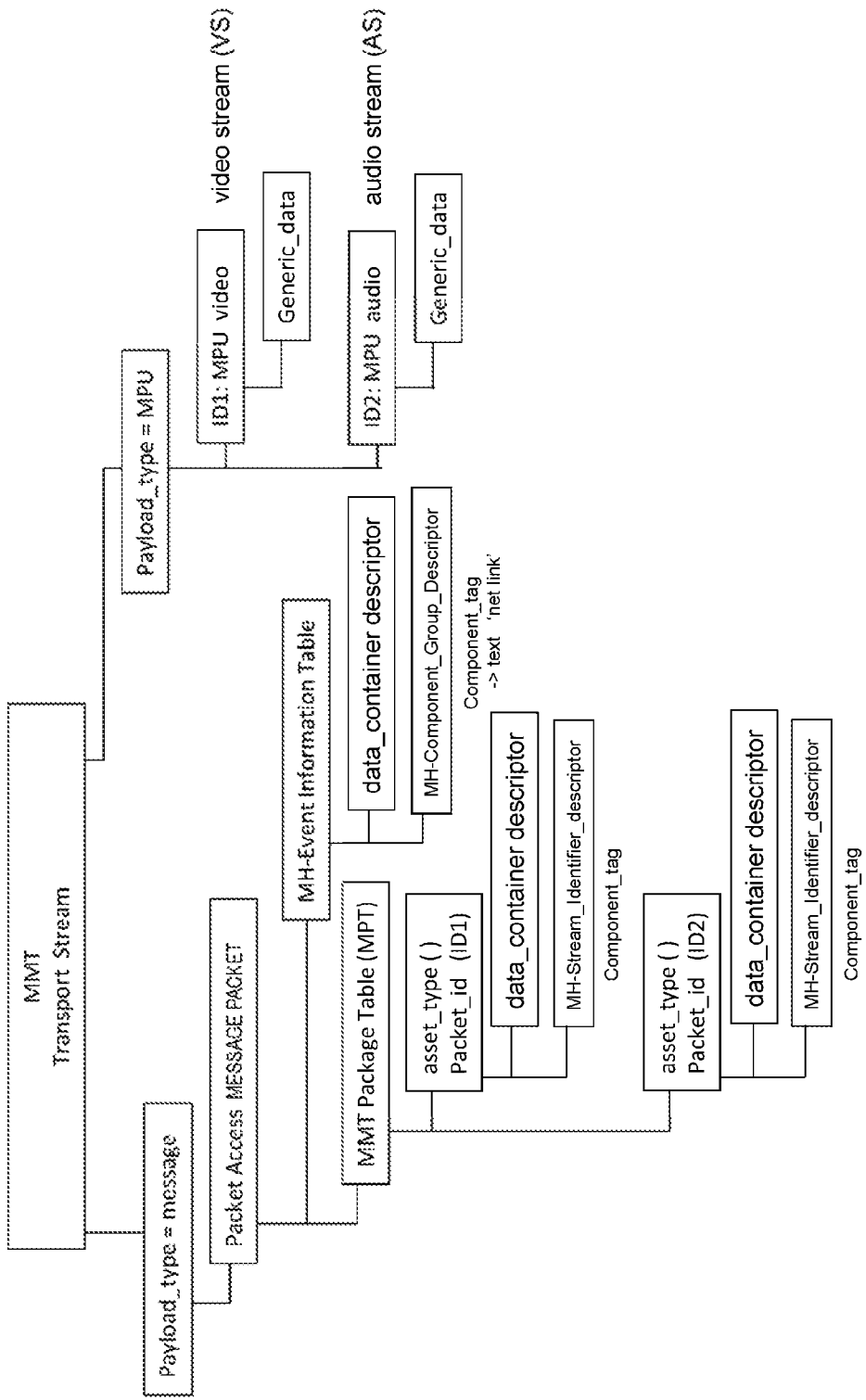
FIG. 39 is a diagram of another exemplary structure of the MMT transport stream.

FIG. 39 illustrates another exemplary structure of the MMT transport stream. The exemplary structure is an example in a case where the two streams, i.e., the video stream and the audio stream contain the predetermined information (refer to FIG. 34).

In a case where a packet type is "MPU", in the MMT transport stream, an MPU packet "MPU video" of a video stream VS identified by ID1 and an MPU packet "MPU audio" of an audio stream AS identified by ID2 are arranged.

A video stream (Video coded stream) is inserted into the MPU packet of the video stream. Generic data (generic_data) (refer to FIG. 10) including each divided portion of the predetermined information is inserted into a predetermined number (including one) of access units (picture) of the video stream. Furthermore, an audio stream (Audio coded stream) is inserted into the MPU packet of the audio stream. The generic data (generic_data) (refer to FIG. 10) including each divided portion of the predetermined information is inserted into the predetermined number (including one) of audio frames of the audio stream.

Furthermore, in a case where the packet type is "message", various message packets are arranged in the MMT transport stream. A Packet Access (PA) message packet is one of the message packets. The PA message packet includes a table such as MPT.

In the MPT, information such as an asset type (Asset_type), a packet ID (Packet_id), and the like is arranged in correspondence with each stream as an asset, and a descriptor describing information related to the stream is arranged. As one of the descriptors, the data container descriptor (data_container descriptor) (refer to FIG. 14) described above is arranged.

In addition, as one of the descriptors, an MH stream identifier descriptor (MH-Stream_identifier descriptor) having information of "Component_tag" is arranged. Furthermore, an MH component group descriptor (MH-Component_Group_Descriptor) is arranged under an MH-Event Information Table (MH-EIT). The data container descriptor (data_container descriptor) described above may be arranged in the MH-EIT. That case means that identification information is provided when insertion of metadata is described on a display of a receiver EPG.

The MH component group descriptor is associated with information of each asset (video stream and audio stream) under the MPT with "Component_tag". With this configuration, it can be found that the predetermined information, for example, internet access information is inserted into a video stream and an audio stream of a certain program, and it is possible to notify a TV viewer that the program is capable of accessing the internet by a display such as "net link" in a portion of the certain program at the time of displaying the program guide such as EPG.

Figure 40:
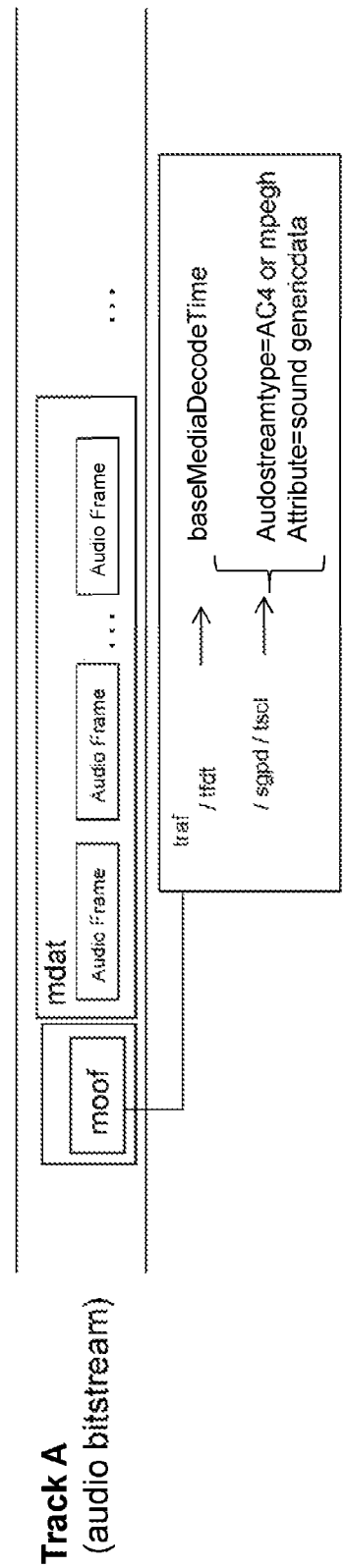
FIG. 40 is a diagram of an exemplary configuration of an MP4 stream (file) including data of an audio track (track A) in a case where an audio compression format is MPEG-H 3D Audio or AC4.

FIG. 40 illustrates an exemplary configuration of an MP4 stream (file) including data of an audio track (track A) in a case where an audio compression format is MPEG-H 3D Audio or AC4. The illustrated example is an example in a case of a fragmented MP4 (Fragmented MP4). A predetermined number of movie fragments (Movie Fragments) including a "moof" box containing control information and a "mdat" box containing a media data body are arranged in the MP4 stream. Since fragments obtained by fragmenting track data are contained in the "mdat" box, the control information contained in the "moof" box is control information regarding the fragments.

In an MP4 stream "audio bit stream" corresponding to the audio track, a predetermined number of audio frames (access unit frame) are arranged in the "mdat" box of each movie fragment. Furthermore, in the MP4 stream "audio bitstream", a "traf" box exists in the "moof" box of each movie fragment, and a "tfdt" box exists in the "traf" box. In the "tfdt" box, a decode time "baseMediaDecodeTime" of a first access unit subsequent to the "moof" box is described.

Furthermore, the "tfdt" box exists in the "moof" box, a "sgpd" box exists in the "tfdt" box, and in addition, a "tscl" box exists in the "sgpd" box. Parameters of "Audiostreamtype" and "Attribute" are described in the "tscl" box. "Audiostreamtype=AC4 or mpegh" indicates that the audio compression format is AC4 or MPEG-H 3D Audio. "Attribute=sound genericdata" indicates that the generic data is inserted into the audio track. Specifically, for example, a content of the data container descriptor (dat_cintainer descriptor) illustrated in FIG. 14 is described as "sound genericdata".

FIG. 41 illustrates an exemplary description in an MPD file in a case where a data insertion stream includes two audio streams. Furthermore, FIG. 42 illustrates an exemplary description in an MPD file in a case where a data insertion stream includes an audio stream and a video stream. In addition, FIG. 43 illustrates a content of main information in the exemplary descriptions. As well known in the art, in the MPEG-DASH based stream distribution system, a media stream (MP4 stream) and an MPD file as a meta file are transmitted to the reception side through a communication network transmission path.

First, the exemplary description in the MPD file in FIG. 41 will be described. Here, for easy description, an example is illustrated in which only information regarding the audio stream is described. However, information regarding the video stream is actually described. In the MPD file, adaptation sets (AdaptationSet) respectively corresponding to first and second audio streams exist.

The description of "<AdaptationSet mimeType="audio/mp4" group="1">" indicates that an adaptation set (AdaptationSet) relative to a first audio stream exists, the audio stream is supplied with the MP4 file structure, and a group 1 is allocated.

In addition, the description of "<SupplementaryDescriptor schemeIdUri="urn:brdcst:codecType" value="AC4 or mpegh"/>" indicates that the codec of the audio stream is AC4 or MPEG-H 3D Audio. "schemeIdUri="urn:brdcst:codecType"" indicates a kind of codec. For example, "value" is set to "mpegh", "AAC", "AC3", "AC4", and the like.

Furthermore, the description of "<SupplementaryDescriptor schemeIdUri="urn:brdcst:genericdatacContained" value="true"/>" indicates that the audio stream includes the generic data (generic_data). For example, when "value" is "true", this indicates that the generic data is included. When "value" is "false", this indicates that the generic data is not included.

Furthermore, "schemeIdUri=="urn:brdcst:jointstreamdelivery"" indicates whether information necessary for internet connection is cooperatively supplied between a plurality of media streams. For example, when "value" is "true", this indicates that the internet connection information is cooperatively supplied with a stream of other adaptation set.

When "value" is "false", this indicates that the internet connection information is supplied only in the stream of this adaptation set.

Furthermore, the description of "<SupplementaryDescriptor schemeIdUri="urn:brdcst:metaInsertionFrequency" value="1"/>" indicates that a frequency of supply of meta information per access unit is "1". "SchemeIdUri="urn: brdcst:metaInsertionFrequency"" indicates the frequency with which meta information is supplied per access unit. For example, "1" indicates that a single user data entry is created in a single access unit. The number "2" indicates that one or more user data entries are created in the single access unit. The number "3" indicates that one or more user data entries are created in a period divided by random access points.

In addition, the description of "<SupplementaryDescriptor schemeIdUri="urn:brdcst:type" value="netlink"/>" indicates that a kind of a service by meta is internet connection.

The description of "schemeIdUri=urn:brdcst:type" indicates the kind of the service by meta. For example, when "value" is "netlink", this indicates that the kind of the service by meta is the internet connection. Then, the description of "<SupplementaryDescriptor schemeIdUri="urn:brdcst:databitrate" value="value"/>" indicates a bitrate(target_bitrate) after inserting the data by a value in unit of 1000 bps. Furthermore, the description of "<SupplementaryDescriptor schemeIdUri="urn:brdcst:datainsertionratio" value="value"/>" indicates a ratio (Ratio) of a bit rate of the inserted data (AVR:inserted_data_bitrate) with a bit rate of the media encoded stream (CR:compressed media_data_bitrate) as a reference. In this case, the ratio is calculated as indicated by the following formula. Ratio=inserted_data_bitrate/compressed media_data_bitrate Furthermore, the description of "<Representation id="11" bandwidth="64000">" indicates that an audio stream with a bit rate of 64 kbps including encoded data in the group 1 "group1" exists in an adaptation set of the group 1 as a representation identified by "Representation id="11"". Then, according to the description of "<baseURL>audio/jp/64.mp4</BaseURL>", a location destination of the audio stream is indicated as "audio/jp/64.mp4".

Furthermore, the description of "<AdaptationSet mimeType="audio/mp4" group="2">" indicates that an adaptation set (AdaptationSet) relative to a second audio stream exists, the audio stream is supplied with the MP4 file structure, and the group 2 is allocated.

In addition, the description of "<SupplementaryDescriptor schemeIdUri="urn:brdcst:codecType" value="AC4 or mpegh"/>" indicates that the codec of the audio stream is AC4 or MPEG-H 3D Audio. Furthermore, the description of "<SupplementaryDescriptor schemeIdUri="urn:brdcst:genericdatacContained" value="true"/>" indicates that the audio stream includes the generic data (generic_data). The description of "schemeIdUri=="urn:brdcst:jointstreamdelivery"" indicates whether information necessary for internet connection is cooperatively supplied between a plurality of media streams.

Furthermore, the description of "<SupplementaryDescriptor schemeIdUri="urn:brdcst:metaInsertionFrequency" value="1"/>" indicates that a frequency of supply of meta information per access unit is "1". In addition, the description of "<SupplementaryDescriptor schemeIdUri="urn:brdcst:type" value="netlink"/>" indicates that a kind of a service by meta is internet connection. Then, the description of "<SupplementaryDescriptor schemeIdUri="urn:brdcst:databitrate" value="value"/>" indicates a bitrate(target_bitrate) after inserting the data by a value in unit of 1000 bps. Furthermore, the description of "<SupplementaryDescriptor schemeIdUri="urn:brdcst:datainsertionratio" value="value"/>" indicates a ratio of the bit rate (AVR) of the inserted data with the bit rate (CR) of the media encoded stream as a reference.

Furthermore, the description of "<Representation id="21" bandwidth="96000">" indicates that an audio stream with a bit rate of 96 kbps including encoded data in the group 2 "group2" exists in an adaptation set of the group 2 as a representation identified by "Representation id="21"". Then, according to the description of "<baseURL>audio/jp/96.mp4</BaseURL>", a location destination of the audio stream is indicated as "audio/jp/96.mp4".

Next, the exemplary description in the MPD file in FIG. 42 will be described. In the MPD file, adaptation sets (AdaptationSet) respectively corresponding to an audio stream and a video stream exist.

The description of "<AdaptationSet mimeType="audio/mp4" group="1">" indicates that an adaptation set (AdaptationSet) relative to an audio stream exists, the audio stream is supplied with the MP4 file structure, and a group 1 is allocated.

In addition, description of "<SupplementaryDescriptor schemeIdUri="urn:brdcst:codecType" value="mpegh"/>" indicates that the codec of the audio stream is MPEG-H 3D Audio. Furthermore, the description of "<SupplementaryDescriptor schemeIdUri="urn:brdcst:genericdatacContained" value="true"/>" indicates that the audio stream includes the generic data (generic_data). The description of "schemeIdUri=="urn:brdcst:jointstreamdelivery"" indicates whether information necessary for internet connection is cooperatively supplied between a plurality of media streams.

Furthermore, the description of "<SupplementaryDescriptor schemeIdUri="urn:brdcst:metaInsertionFrequency" value="1"/>" indicates that a frequency of supply of meta information per access unit is "1". In addition, the description of "<SupplementaryDescriptor schemeIdUri="urn:brdcst:type" value="netlink"/>" indicates that a kind of a service by meta is internet connection. Then, the description of "<SupplementaryDescriptor schemeIdUri="urn:brdcst:databitrate" value="value"/>" indicates a bitrate(target_bitrate) after inserting the data by a value in unit of 1000 bps. Furthermore, the description of "<SupplementaryDescriptor schemeIdUri="urn:brdcst:datainsertionratio" value="value"/>" indicates a ratio of the bit rate (AVR) of the inserted data with the bit rate (CR) of the media encoded stream as a reference.

Furthermore, the description of "<Representation id="11" bandwidth="128000">" indicates that an audio stream with a bit rate of 128 kbps including encoded data in the group 1 "group1" exists in an adaptation set of the group 1 as a representation identified by "Representation id="11"". Then, according to the description of "<baseURL>audio/jp/128.mp4</BaseURL>", a location destination of the audio stream is indicated as "audio/jp/128.mp4".

Furthermore, the description of "<AdaptationSet mimeType="video/mp4" group="2">" indicates that an adaptation set (AdaptationSet) relative to a video stream exists, the video stream is supplied with the MP4 file structure, and a group 2 is allocated.

Furthermore, the description of "<SupplementaryDescriptor schemeIdUri="urn:brdcst:codecType" value="hevc"/>" indicates that a codec of the video stream is HEVC. Furthermore, the description of "<SupplementaryDescriptor schemeIdUri="urn:brdcst:genericdatacContained" value="true"/>" indicates that the audio stream includes the generic data (generic_data). The description of "schemeIdUri="urn:brdcst:jointstreamdelivery"" indicates whether information necessary for internet connection is cooperatively supplied between a plurality of media streams.

Furthermore, the description of "<SupplementaryDescriptor schemeIdUri="urn:brdcst:genericdatacContained" value="true"/>" indicates that the video stream includes the generic data (generic_data). Furthermore, the description of "<SupplementaryDescriptor schemeIdUri="urn:brdcst:metaInsertionFrequency" value="1"/>" indicates that a frequency of supply of meta information per access unit is "1". In addition, the description of "<SupplementaryDescriptor schemeIdUri="urn:brdcst:type" value="netlink"/>" indicates that a kind of a service by meta is internet connection. Then, the description of "<SupplementaryDescriptor schemeIdUri="urn:brdcst:databitrate" value="value"/>" indicates a bitrate(target_bitrate) after inserting the data by a value in unit of 1000 bps. Furthermore, the description of "<SupplementaryDescriptor schemeIdUri="urn:brdcst:datainsertionratio" value="value"/>" indicates a ratio of the bit rate (AVR) of the inserted data with the bit rate (CR) of the media encoded stream as a reference.

Furthermore, the description of "<Representation id="21" bandwidth="20000000">" indicates that a video stream with a bit rate of 20 Mbps including encoded data in the group 2 "group2" exists in an adaptation set of the group 2 as a representation identified by "Representation id="21"". Then, according to the description of "<baseURL>audio/jp/20000.mp4</BaseURL>", a location destination of the audio stream is indicated as "video/jp/20000.mp4".

Furthermore, in the embodiment described above, the transmission/reception system 10 including the set top box 200 and the television receiver 300 has been described. However, a configuration can be considered in which a monitor device, a projector, or the like is arranged instead of the television receiver 300.

Furthermore, a configuration can be considered in which a recorder with a receiving function, a personal computer, or the like is arranged instead of the set top box 200. Furthermore, in the embodiment described above, the set top box 200 and the television receiver 300 are connected by wire with an HDMI digital interface. However, naturally, the present invention can be similarly applied to a case where devices are connected to each other by wire with a digital interface similar to the HDMI, and in addition, a case where the devices are wirelessly connected.

Figure 44:
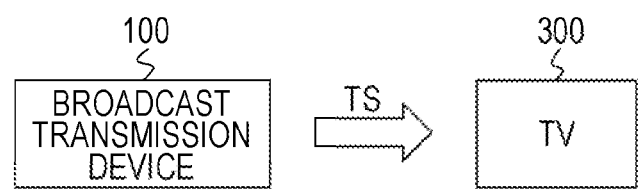
FIG. 44 is a block diagram of another exemplary configuration of the transmission/reception system.

Furthermore, in the embodiment described above, the transmission/reception system 10 has been described which receives the transport stream TS transmitted from the broadcast transmission device 100 on the broadcast wave by the set top box 200. However, as illustrated in FIG. 44, a transmission/reception system 10A can be considered that directly receives the transport stream TS transmitted from the broadcast transmission device 100 on the broadcast wave by the television receiver 300.

Note that, the present technology can have the following configuration.

(1) A transmission device including:
an information insertion unit configured to sequentially insert divided portions obtained by dividing predetermined information into a predetermined number of unit portions of a media encoded stream as adding sequential information for reconstruction; and
a transmission unit configured to transmit a container with a predetermined format including the media encoded stream into which the predetermined information is inserted, in which the information insertion unit divides the predetermined information so that a bit rate of the predetermined information falls within a predetermined bit rate.

(2) The transmission device according to (1), in which
the information insertion unit divides the predetermined information so that a data size of each divided portion is a fixed size.

(3) The transmission device according to (2), in which
the information insertion unit calculates the fixed size by dividing an allowable bit rate obtained by subtracting a bit rate of the media encoded stream from a target bit rate by the number of unit portions generated in one second.

(4) The transmission device according to (1), in which
the information insertion unit divides the predetermined information so that a data size of each unit portion into which the divided portion is inserted is a fixed size.

(5) The transmission device according to (4), in which
the information insertion unit calculates the fixed size by adding a first size obtained by dividing an allowable bit rate obtained by subtracting the bit rate of the media encoded stream from the target bit rate by the number of unit portions generated in one second to a second size obtained by dividing the bit rate of the media encoded stream by the number of unit portions generated in one second.

(6) The transmission device according to any one of (1) to (5), in which
the information insertion unit sequentially inserts the divided portions obtained by dividing the predetermined information into the predetermined number of unit portions of one or more media encoded streams as adding the sequential information for reconstruction, and
adds identification information to identify whether the divided portion is inserted to the other media encoded stream to each of the divided portions to be inserted into the predetermined number of unit portions of the one or more media encoded streams.

(7) The transmission device according to (6), in which
an identification information insertion unit configured to insert identification information indicating that the divided portions of the predetermined information are inserted in correspondence with each of the one or more media encoded streams into the container.

(8) The transmission device according to (7), in which
the identification information insertion unit further inserts identification information indicating whether the other media encoded stream into which the divided portion of the predetermined information is inserted exists in correspondence with each of the one or more media encoded streams, and identification information indicating the other media encoded stream when the media encoded stream exists into the container.

(9) A transmission method including:
an information insertion step of sequentially inserting divided portions obtained by dividing predetermined information into a predetermined number of unit portions of a media encoded stream as adding sequential information for reconstruction; and
a transmission step of transmitting a container with a predetermined format including the media encoded stream into which the predetermined information is inserted by a transmission unit, in which
in the information insertion step, the predetermined information is divided so that a bit rate of the predetermined information falls within a predetermined bit rate.

(10) A transmission device including:
an information insertion unit configured to sequentially insert divided portions obtained by dividing predetermined information into a predetermined number of unit portions of one or more media encoded streams as adding sequential information for reconstruction; and a transmission unit configured to transmit a container with a predetermined format including the one or more media encoded streams into which the divided portions of the predetermined information are inserted.

(11) The transmission device according to (10), in which the information insertion unit adds identification information indicating whether the divided portion is inserted into the other media stream to each divided portion to be inserted into each of the one or more media encoded streams.

(12) The transmission device according to (10) or (11), further including:

an identification information insertion unit configured to insert identification information indicating that the divided portions of the predetermined information are inserted in correspondence with each of the one or more media encoded streams into the container.

(13) The transmission device according to (12), in which the identification information insertion unit further inserts identification information indicating whether the other media encoded stream into which the divided portion of the predetermined information is inserted exists in correspondence with each of the one or more media encoded streams and identification information indicating the other media encoded stream when the media encoded stream exists into the container.

(14) A transmission method including:

an information insertion step of sequentially inserting divided portions obtained by dividing predetermined information into a predetermined number of unit portions of one or more media encoded streams as adding sequential information for reconstruction; and a transmission step of transmitting a container with a predetermined format including the one or more media encoded streams into which the divided portions of the predetermined information are inserted by a transmission unit.

(15) A reception device including:

a stream reception unit configured to receive one or more media encoded streams, in which divided portions obtained by dividing predetermined information are sequentially inserted into a predetermined number of unit portions of the one or more media encoded streams as adding sequential information for reconstruction, and the reception device further includes:

a control unit configured to control processing for extracting the divided portions of the predetermined information from the predetermined number of unit portions of the one or more media encoded streams and reconstructing the predetermined information on the basis of the sequential information and information processing using the reconstructed predetermined information.

(16) The reception device according to (15), in which the stream reception unit receives the one or more media encoded streams from an external device via a digital interface.

(17) The reception device according to (15) or (16), in which identification information to identify whether the divided portion is inserted into the other media encoded stream is added to each of the divided portions inserted into the predetermined number of unit portions of the one or more media encoded streams, and in the processing of reconstructing the predetermined information, each of the divided portions of the predetermined information is extracted from the predetermined number of unit portions of the one or more media encoded streams on the basis of the identification information.

(18) A reception method including:

a stream reception step of receiving one or more media encoded streams by a reception unit, in which divided portions obtained by dividing predetermined information are sequentially inserted into a predetermined number of unit portions of the one or more media encoded streams as adding sequential information for reconstruction, and the reception method further includes:

a data construction step of extracting the divided portions of the predetermined information from the predetermined number of unit portions of the one or more media encoded streams and reconstructing the predetermined information on the basis of the sequential information; and an information processing step of performing information processing using the reconstructed predetermined information.

(19) A reception device including:

a reception unit configured to receive a container with a predetermined format including one or more media encoded streams, in which divided portions obtained by dividing predetermined information are sequentially inserted into a predetermined number of unit portions of the one or more media encoded streams as adding sequential information for reconstruction, identification information indicating that the divided portion of the predetermined information is inserted in correspondence with each of the one or more media encoded streams is inserted into the container, and the reception device further includes:

a transmission unit configured to transmit the one or more media encoded streams into which the divided portions of the predetermined information are inserted to the external device via a digital interface on the basis of the identification information.

The main feature of the present technology is that by inserting divided portions obtained by dividing predetermined information into a predetermined number of unit portions of a media encoded stream so that a bit rate falls within a predetermined bit rate and transmitting them, it is possible to satisfactorily insert the predetermined information into the media encoded stream and transmit the stream (refer to FIGS. 2, 4, and 6).

REFERENCE SIGNS LIST

10, 10A Transmission/reception system
21 Effective pixel section
22 Horizontal blanking interval
23 Vertical blanking interval
24 Video data period
25 Data island period
26 Control period
31 HDMI transmitter
32 HDMI receiver
33 DDC
34 CEC line
35 HPD line
36 Power supply line
37 Reserve line
100 Broadcast transmission device
110A, 110B, 110C Stream generation unit 111 CPU
112 Video encoder
113, 113-1, 113-2 Audio encoder
114 Splitter
115, 115-1, 115-2, 117 Inserter
116 Multiplexer
200 Set top box (STB)
201 CPU
202 Flash ROM
203 DRAM
204 Internal bus
205 Remote control reception unit
206 Remote control transmitter
211 Antenna terminal
212 Digital tuner
213 Demultiplexer
214 Video decoder
215 Audio framing unit
216 HDMI transmission unit
217 HDMI terminal
300 Television receiver (TV)
301 CPU
302 Flash ROM
303 DRAM
304 Internal bus
305 Remote control reception unit
306 Remote control transmitter
307 Communication interface
311 Antenna terminal
312 Digital tuner
313 Demultiplexer
314 Video decoder
315 HDMI terminal
316 HDMI reception unit
317 Video processing circuit
318 Panel drive circuit
319 Display panel
320 Audio decoder
321 Audio processing circuit
322 Audio amplification circuit
323 Speaker
351-1, 351-2 Extractor
352-1, 352-2 Decoder
353 Data reassembler
400 HDMI cable

The invention claimed is:

1. A transmission device comprising:
circuitry configured to:
sequentially insert divided portions obtained by dividing predetermined information into a predetermined number of unit portions of at least a first stream of a plurality of media encoded streams as adding sequential information for reconstruction, wherein the predetermined information is divided so that a bit rate of the predetermined information falls within a predetermined bit rate;
add identification information to each of the divided portions to be inserted into the predetermined number of unit portions of the first stream of the plurality of media encoded streams, wherein the identification information identifies whether one of the divided portions is inserted into a second stream of the plurality of media encoded streams; and
transmit a container with a predetermined format including at least the first stream of the plurality of media encoded streams into which the predetermined information is inserted.

2. The transmission device according to claim 1, wherein the circuitry is further configured to divide the predetermined information so that a data size of each divided portion is a fixed size.

3. The transmission device according to claim 2, wherein the circuitry is further configured to calculate the fixed size by dividing an allowable bit rate obtained by subtracting a bit rate of at least the first stream of the plurality of media encoded streams from a target bit rate by the number of unit portions generated in one second.

4. The transmission device according to claim 1, wherein the circuitry is further configured to divide the predetermined information so that a data size of each unit portion into which the divided portion is inserted is a fixed size.

5. The transmission device according to claim 4, wherein the circuitry is further configured to calculate the fixed size by adding a first size obtained by dividing an allowable bit rate obtained by subtracting the bit rate of at least the first stream of the plurality of media encoded streams from the target bit rate by the number of unit portions generated in one second to a second size obtained by dividing the bit rate of at least the first stream of the plurality of media encoded streams by the number of unit portions generated in one second.

6. The transmission device according to claim 1, wherein the circuitry is further configured to insert identification information indicating that the divided portions of the predetermined information are inserted in correspondence with each of the plurality of media encoded streams into the container.

7. The transmission device according to claim 6, wherein the circuitry is further configured to insert identification information indicating whether the second stream into which the divided portion of the predetermined information is inserted exists in correspondence with each of the plurality of media encoded streams, and identification information indicating the second stream when the media encoded stream exists into the container.

8. The transmission device according to claim 1, wherein the identification information includes a one-bit field of a joint stream delivery flag that indicates whether one of the divided portions is inserted into the second stream of the plurality of media encoded streams, and wherein a first value indicates that one of the divided portions is inserted into the second stream, and a second value indicates that one of the divided portions is not inserted into the second stream.

9. A transmission method comprising:
sequentially inserting divided portions obtained by dividing predetermined information into a predetermined number of unit portions of at least a first stream of a plurality of media encoded streams as adding sequential information for reconstruction, wherein the predetermined information is divided so that a bit rate of the predetermined information falls within a predetermined bit rate;
adding identification information to each of the divided portions to be inserted into the predetermined number of unit portions of the first stream of the plurality of media encoded streams, wherein the identification information identifies whether one of the divided portions is inserted into a second stream of the plurality of media encoded streams; and
transmitting a container with a predetermined format including at least the first stream of the plurality of media encoded streams into which the predetermined information is inserted.

10. A reception device comprising:
circuitry configured to:
  receive at least a first stream of a plurality of media encoded streams, wherein divided portions obtained by dividing predetermined information are sequentially inserted into a predetermined number of unit portions of at least the first stream of the plurality of media encoded streams as adding sequential information for reconstruction, and wherein each of the divided portions inserted into the predetermined number of unit portions of the first stream of the plurality of media encoded streams includes identification information to identify whether one of the divided portions is inserted into a second stream of the plurality of media encoded streams;
  extract the divided portions of the predetermined information from the predetermined number of unit portions of at least the first stream of the plurality of media encoded streams; and
  reconstruct the predetermined information based on the sequential information; and
  perform information processing using the reconstructed predetermined information.

11. The reception device according to claim 10, wherein the circuitry is further configured to receive at least the first stream of the plurality of media encoded streams from an external device via a digital interface.

12. The reception device according to claim 10, wherein each of the divided portions of the predetermined information is extracted from the predetermined number of unit portions of at least the first stream of the plurality of media encoded streams based on the identification information.

13. A reception method comprising:
  receiving at least a first stream of a plurality of media encoded streams by a reception unit, wherein divided portions obtained by dividing predetermined information are sequentially inserted into a predetermined number of unit portions of at least the first stream of the plurality of media encoded streams as adding sequential information for reconstruction, and wherein each of the divided portions inserted into the predetermined number of unit portions of the first stream of the plurality of media encoded streams includes identification information to identify whether one of the divided portions is inserted into a second stream of the plurality of media encoded streams;
  extracting the divided portions of the predetermined information from the predetermined number of unit portions of at least the first stream of the plurality of media encoded streams;
  reconstructing the predetermined information based on the sequential information; and
  performing information processing using the reconstructed predetermined information.

* * * * *